US011108605B2

(12) United States Patent
Zhang et al.

(10) Patent No.: US 11,108,605 B2
(45) Date of Patent: Aug. 31, 2021

(54) PHASE TRACKING REFERENCE SIGNAL PROCESSING METHOD AND APPARATUS

(71) Applicant: Huawei Technologies Co., Ltd., Shenzhen (CN)

(72) Inventors: Xi Zhang, Chengdu (CN); Fengwei Liu, Chengdu (CN); Lei Chen, Shenzhen (CN); Minghui Xu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/659,310

(22) Filed: Oct. 21, 2019

(65) Prior Publication Data

US 2020/0052944 A1 Feb. 13, 2020

Related U.S. Application Data

(63) Continuation of application No. PCT/CN2018/091203, filed on Jun. 14, 2018.

(30) Foreign Application Priority Data

Jun. 16, 2017 (CN) .......................... 201710457990.5
Sep. 30, 2017 (CN) .......................... 201710920338.2

(51) Int. Cl.
*H04L 27/26* (2006.01)
*H04J 13/00* (2011.01)
*H04L 5/00* (2006.01)

(52) U.S. Cl.
CPC ........ *H04L 27/2613* (2013.01); *H04J 13/004* (2013.01); *H04L 5/0007* (2013.01); *H04L 5/0048* (2013.01)

(58) Field of Classification Search
CPC . H04L 27/2613; H04L 5/0007; H04L 5/0048; H04L 5/0021; H04L 5/0094;
(Continued)

(56) References Cited

U.S. PATENT DOCUMENTS

2015/0146640 A1  5/2015  Baldemair et al.
2018/0198667 A1  7/2018  He
2020/0389270 A1* 12/2020  Lee .................. H04W 72/0406

FOREIGN PATENT DOCUMENTS

CN  106664278 A   5/2017
EP    3520304 A1  8/2019
(Continued)

OTHER PUBLICATIONS

Das, Suman, et al. "EV-do revision C: Evolution of the cdma2000* data optimized system to higher spectral efficiencies and enhanced services." Bell Labs Technical Journal 11.4 (2007): 5-24. (Year: 2007).*

(Continued)

*Primary Examiner* — Sharad Rampuria
(74) *Attorney, Agent, or Firm* — Leydig, Voit & Mayer, Ltd.

(57) ABSTRACT

A PTRS processing method and an apparatus. The method includes: receiving, by a terminal, first indication information and second indication information from a network device, where the first indication information is used to indicate a time-domain location at which a PTRS is to be sent by the terminal, and the second indication information is used to indicate an offset of an initial time-domain location to which the PTRS is mapped by the terminal; mapping, by the terminal, the PTRS to one or more DFT-s-OFDM symbols based on the first indication information and the second indication information; and sending, by the terminal, the one or more DFT-s-OFDM symbols. In this way, the PTRS mapped to the DFT-s-OFDM symbol is offset (Continued)

at a DFT-s-OFDM symbol level, so that PTRS collision between terminals can be avoided to an extent, thereby improving phase tracking precision.

20 Claims, 8 Drawing Sheets

(58) Field of Classification Search
CPC ............ H04L 27/2636; H04L 27/2611; H04L 27/2691; H04L 27/2695; H04L 5/26; H04J 13/004; H04J 4/00; H04W 72/04; H04B 7/2615
See application file for complete search history.

(56) References Cited

FOREIGN PATENT DOCUMENTS

| WO | 2017028673 A1 | 2/2017 |
|---|---|---|
| WO | 2018064313 A1 | 4/2018 |

OTHER PUBLICATIONS

"PTRS for DFT-s-OFDM," 3GPP TSG RAN WG1 Meeting #89, Hangzhou, China, R1-1708142, pp. 1-4, 3rd Generation Partnership Project, Valbonne, France (May 15-19, 2017).
"3rd Generation Partnership Project;Technical Specification Group Radio Access Network; NR; Physical channels and modulation(Release 15)," 3GPP TS 38.211 V0.0.0, pp. 1-10, 3rd Generation Partnership Project, Valbonne, France (May 2017).
"On PTRS for DFT-s-OFDM," 3GPP TSG RAN WG1 #89, Hangzhou, China, R1-1707977, pp. 1-5, 3rd Generation Partnership Project, Valbonne, France (May 15-19, 2017).
"WF on PT-RS," 3GPP TSG RAN WG1 Meeting #89, R1-1709286, Hangzhou, P. R. China, 3rd Generation Partnership Project, Valbonne, France (May 15-19, 2017).
"Verizon 5G TF; Air Interface Working Group; Verizon 5th Generation Radio Access; Physical channels and modulation(Release 1)," TS V5G.211 V1.7, pp. 1-83 (Oct. 2016).
"Verizon 5G TF; Air Interface Working Group; Verizon 5th Generation Radio Access; Multiplexing and channel coding (Release 1)," TS V5G.212 V1.5, pp. 1-62 (Sep. 2016).
"Verizon 5G TF; Air Interface Working Group; Verizon 5th Generation Radio Access; Physical layer procedures (Release 1)," TS V5G.213 v1A, pp. 1-50 (Oct. 2016).
"Discussion on RS for phase tracking," 3GPP TSG RAN WG1 NR Ad-Hoc Meeting, Spokane, USA, R1-1700138, pp. 1-11, 3rd Generation Partnership Project, Valbonne, France (Jan. 16-20, 2017).
"DMRS Design Principle," 3GPP TSG RAN WG1 Meeting #87, Reno, USA, R1-1611812, pp. 1-6, 3rd Generation Partnership Project, Valbonne, France (Nov. 14-18, 2016).
ZTE Microelectronics et al., "Discussion on downlink DMRS design," 3GPP TSG RAN WG1 Meeting #88bis, Spokane, USA, R1-1704411, total 11 pages, 3rd Generation Partnership Project, Valbonne, France (Apr. 3-7, 2017).
Huawei, HiSilicon, "PTRS for CP-OFDM," 3GPP TSG RAN WG1 Meeting #89, Hangzhou, China, R1-1706937, total 6 pages, 3rd Generation Partnership Project, Valbonne, France (May 15-19, 2017).
Mitsubishi Electric, "UL PTRS for DFTsOFDM waveform," 3GPP TSG-RAN WG1 #89, Hangzhou, China, R1-1708997, total 8 pages, 3rd Generation Partnership Project, Valbonne, France (May 15-19, 2017).
"3rd Generation Partnership Project; Technical Specification Group Radio Access Network; NR; Multiplexing and channel coding (Release 15)," 3GPP TS 38.212 V0.0.0, total 10 pages, 3rd Generation Partnership Project, Valbonne, France (May 2017).
"3rd Generation Partnership Project; Technical Specification Group Radio Access Network; NR; Radio Resouice Control (RRC); Protocol specification (Release 15)," 3GPP TS 38.331 V0.0.3, total 20 pages, 3rd Generation Partnership Project, Valbonne, France (May 2017).
"3rd Generation Partnership Project; Technical Specification Group Radio Access Network; NR; NR and NG-RAN Overall Description; Stage 2 (Release 15)," 3GPP TS 38.300 V0.4.1, total 55 pages, 3rd Generation Partnership Project, Valbonne, France (Jun. 2017).
NTT Docomo, Inc., "Workplan for Study on NR Access Technology," 3GPP TSG RAN1 NR Ad-Hoc, Spokane, USA, R1-1700589, total 102 pages, 3rd Generation Partnership Project, Valbonne, France (Jan. 16-20, 2017).
Spreadtrum Communications, "Considerations on PT-RS for CP-OFDM," 3GPP TSG Ran WG1 NR Ad-Hoc#2, Qingdao, P.R. China, R1-1710363, total 6 pages, 3rd Generation Partnership Project, Valbonne, France (Jun. 27-30, 2017).

* cited by examiner

PHASE TRACKING REFERENCE SIGNAL PROCESSING METHOD AND APPARATUS

CROSS-REFERENCE TO RELATED APPLICATIONS

This application is a continuation of International Application No. PCT/CN2018/091203, filed on Jun. 14, 2018, which claims priority of Chinese Patent Application No. 201710920338.2, filed on Sep. 30, 2017 and priority of Chinese Patent Application No. 201710457990.5, filed on Jun. 16, 2017, The disclosures of the aforementioned applications are hereby incorporated by reference in their entireties.

TECHNICAL FIELD

This application relates to the communications field, and more specifically, to a phase tracking reference signal (PTRS) processing method and an apparatus.

BACKGROUND

In an existing wireless communications network (such as a 2G, 3G, or 4G network), all operating frequency bands of a communications system are within a frequency range below 6 GHz, but fewer operating frequency bands are available within this frequency range, and growing communication requirements cannot be satisfied. However, plenty of frequency bands are not yet fully utilized within a frequency range above 6 GHz. Therefore, the industry is researching and developing a next-generation wireless communications network (for example, a 5G network) whose operating frequency band is above 6 GHz, to provide an ultrahigh-speed data communication service.

A frequency band available for a next-generation wireless communications network within the frequency range above 6 GHz includes but is not limited to a frequency band of 28 GHz, 39 GHz, 60 GHz, 73 GHz, or the like. Because an operating frequency band of the next-generation wireless communications network is above 6 GHz, the next-generation wireless communications network has remarkable characteristics of a high-frequency communications system, such as large bandwidth and highly integrated antenna arrays, to easily implement a relatively high throughput. However, compared with an existing wireless communications network, the next-generation wireless communications network operating in the range above 6 GHz is subject to more severe intermediate radio frequency distortion, especially impact brought by phase noise (PHN). In addition, impact brought by a Doppler effect and a central frequency offset (CFO) on performance of the high-frequency communications system becomes more severe as the frequency band becomes higher. A common characteristic of the phase noise, the Doppler effect, and the CFO is that a phase error is introduced in data reception of the high-frequency communications system, and consequently the performance of the high-frequency communications system degrades or even the high-frequency communications system cannot work.

The phase noise is used as an example. A phase noise level deteriorates at a level of $20*\log(f1/f2)$ as a frequency band increases. For example, a phase noise level of a 28-GHz frequency band is 23 dB higher than a phase noise level of a 2-GHz frequency band. A higher phase noise level imposes greater impact on a common phase error (CPE).

To resolve the technical problem of the phase error, a new-generation wireless communications system uses two types of waveforms, namely, orthogonal frequency division multiplexing (OFDM) and discrete Fourier transform-spread-orthogonal frequency division multiplexing (DFT-s-OFDM), to perform transmission in an uplink direction. In addition, a phase tracking reference signal (PTRS) is designed in both types of waveforms.

FIG. 1 shows a PTRS design scheme of a DFT-s-OFDM waveform provided in the prior art. A PTRS is mapped into time domain before discrete Fourier transform (DFT) is performed on modulated symbols of a DFT-s-OFDM symbol. Usually, M consecutive PTRSs mapped to a same DFT-s-OFDM symbol are referred to as a chunk. For example, in a DFT-s-OFDM symbol shown in FIG. 1, two consecutive PTRSs are referred to as one chunk, and this DFT-s-OFDM symbol includes four chunks.

When a plurality of DFT-s-OFDM users in a same cell form a plurality of users in a multi-user multiple-input multiple-output (MU-MIMO) technology, PTRSs mapped to DFT-s-OFDM symbols that are sent by these DFT-s-OFDM users may overlap in time domain. Although phase compensation can be performed for the PTRSs after MIMO detection, residual interference may still affect PTRS estimation performance, thereby reducing phase noise tracking performance. Such a phenomenon is PTRS collision between users. Likewise, when a plurality of DFT-s-OFDM users in different cells transmit DFT-s-OFDM symbols on a same time-frequency resource, PTRS collision between users may also occur.

Currently, there is no solution to the PTRS collision between users.

SUMMARY

This application provides a PTRS processing method and an apparatus, which can effectively avoid PTRS collision between users.

According to a first aspect, a PTRS processing method is provided, including: receiving first indication information and second indication information from a network device, where the first indication information is used to indicate a time-domain location at which a PTRS is to be sent, and the second indication information is used to indicate an offset of an initial time-domain location to which the PTRS is mapped; mapping the PTRS to one or more DFT-s-OFDM symbols based on the first indication information and the second indication information; and outputting the one or more DFT-s-OFDM symbols.

The time-domain location of the PTRS in this application may be understood as OFDM symbols to which the PTRS is mapped in time domain.

According to a second aspect, a PTRS processing method is provided, including: sending, by a network device, first indication information and second indication information to a terminal, where the first indication information is used to indicate a time-domain location at which a PTRS is to be sent by the terminal, and the second indication information is used to indicate an offset of an initial time-domain location to which the PTRS is mapped by the terminal; and receiving, by the network device, one or more DFT-s-OFDM symbols sent by the terminal, where the one or more DFT-s-OFDM symbols are mapped by the terminal to a PTRS based on the first indication information and the second indication information.

In the solution provided in the first aspect or the second aspect, the PTRS is mapped to the DFT-s-OFDM symbol based on the time-domain location of the PTRS and the offset of the initial time-domain location to which the PTRS is mapped, so as to avoid a problem of time domain overlapping of PTRSs mapped to DFT-s-OFDM symbols of different terminals to an extent, thereby overcoming a problem of PTRS collision between different users.

With reference to the first aspect or the second aspect, in a possible implementation, that the second indication information is used to indicate an offset of an initial time-domain location to which the PTRS is mapped by the terminal specifically includes: the second indication information is used to indicate an offset that is of the initial time-domain location to which the PTRS is mapped and that is relative to the first DFT-s-OFDM symbol.

The first DFT-s-OFDM symbol is the first DFT-s-OFDM symbol in a subframe to which the PTRS is mapped. The subframe includes one or more DFT-s-OFDM symbols.

In this application, the PTRS mapped to the DFT-s-OFDM symbol is offset at a DFT-s-OFDM symbol level, so that PTRS collision between terminals can be avoided to an extent, thereby improving phase tracking precision.

With reference to the first aspect or the second aspect, in a possible implementation, that the second indication information is used to indicate an offset of an initial time-domain location to which the PTRS is mapped by the terminal specifically includes: the second indication information is used to indicate an offset that is of the initial time-domain location to which the PTRS is mapped and that is relative to the first modulated symbol of the first DFT-s-OFDM symbol to which the PTRS is mapped.

For example, the first DFT-s-OFDM symbol to which the PTRS is mapped is the first DFT-s-OFDM symbol, to which the PTRS is mapped, in a subframe that includes the one or more DFT-s-OFDM symbols. Each DFT-s-OFDM symbol includes a plurality of modulated symbols.

In this application, the PTRS mapped to the DFT-s-OFDM symbol is offset at a modulated symbol level, so that PTRS collision between terminals can be avoided to an extent, thereby improving phase tracking precision.

With reference to the first aspect or the second aspect, in a possible implementation, the second indication information is at least one of the following information: a demodulation reference signal (DMRS) port number of the terminal, a PTRS port number of the terminal, or a cell identity (ID) of the terminal.

Optionally, in an intra-cell scenario, the second indication information may be a demodulation reference signal DMRS port number of the terminal and/or a PTRS port number of the terminal.

It should be understood that, for terminals in a same cell, their DMRS port numbers are different from each other and their PTRS port numbers are also different from each other; therefore, offsets of initial time-domain locations of PTRSs obtained based on DMRS port numbers of different terminals are also different, or offsets of initial time-domain locations of PTRSs obtained based on PTRS port numbers of different terminals are also different.

Optionally, in an inter-cell scenario, the second indication information may be a cell ID of the terminal.

It should be understood that, for terminals in different cells, cell IDs of cells in which the terminals are located are different from each other; therefore, offsets of initial time-domain locations of PTRSs obtained based on cell IDs of different terminals are different.

With reference to the second aspect, in a possible implementation of the second aspect, the PTRS processing method further includes:

sending, by the network device, information about a correspondence between a DMRS port number and a PTRS mapping location set to the terminal; or sending information about a correspondence between a PTRS port number and a PTRS mapping location set to the terminal; or sending information about a correspondence between a cell ID and a PTRS mapping location set to the terminal.

With reference to the first aspect or the second aspect, in a possible implementation, that the first indication information is used to indicate a time-domain location at which a PTRS is to be sent by the terminal specifically includes: the first indication information is used to indicate a quantity of PTRS chunks, and the quantity of PTRS chunks represents a quantity of PTRS chunks mapped to one DFT-s-OFDM symbol to which the PTRS is mapped.

It should be noted that, in this specification, the PTRS chunk and the chunk indicate a same meaning, however, with two different ways of expression.

Optionally, in this implementation, the first indication information is scheduled bandwidth of the terminal.

For example, larger scheduled bandwidth indicates a larger quantity of PTRS chunks.

In this application, the following may be implemented by determining the quantity of PTRS chunks based on the scheduled bandwidth: A quantity of PTRSs mapped to a DFT-s-OFDM symbol increases as the scheduled bandwidth increases, and decreases as the scheduled bandwidth decreases. Therefore, this application can implement relatively high phase noise tracking performance in a large-bandwidth scenario, and can avoid excessively high overheads in a small-bandwidth scenario.

With reference to the first aspect or the second aspect, in a possible implementation, the first indication information is used to indicate a time-domain density of the PTRS.

Optionally, in this implementation, the first indication information is a modulation and coding scheme (MCS) of the terminal.

In conclusion, in the solution provided in the first aspect or the second aspect, time domain offset processing is performed on the PTRS in a process of mapping the PTRS to the DFT-s-OFDM symbol. This can avoid overlapping of time-domain locations of PTRSs mapped to DFT-s-OFDM symbols of different terminals to an extent, thereby avoiding PTRS collision between different terminals and further effectively improving phase noise tracking precision.

According to a third aspect, a PTRS processing method is provided, including: receiving first indication information and second indication information from a network device, where the first indication information is used to indicate a time-domain location at which a PTRS is to be sent, the second indication information is used to indicate code division multiplexing information, and the code division multiplexing information is used to perform code division multiplexing processing on a PTRS mapped to a DFT-s-OFDM symbol to which the PTRS is mapped; mapping the PTRS to one or more DFT-s-OFDM symbols based on the first indication information and the second indication information, and performing code division multiplexing processing, by using the code division multiplexing information, on the PTRS mapped to the one or more DFT-s-OFDM symbols; and sending the one or more DFT-s-OFDM symbols.

According to a fourth aspect, a PTRS processing method is provided, including: sending, by a network device, first indication information and second indication information to a terminal, where the first indication information is used to indicate a time-domain location at which a PTRS is to be sent by the terminal, the second indication information is used to indicate code division multiplexing information, and the code division multiplexing information is used to perform code division multiplexing processing on a PTRS mapped to a DFT-s-OFDM symbol to which the PTRS is mapped; and receiving, by the network device, one or more DFT-s-OFDM symbols, sent by the terminal, to which the PTRS is mapped, where the one or more DFT-s-OFDM symbols to which the PTRS is mapped are DFT-s-OFDM symbols obtained after the following operations: mapping, by the terminal, the PTRS to the one or more DFT-s-OFDM symbols based on the first indication information and the second indication information; and performing code division multiplexing processing, by using the code division multiplexing information, on the PTRS mapped to the one or more DFT-s-OFDM symbols.

In the solution provided in the third aspect or the fourth aspect, after the PTRS is mapped to the DFT-s-OFDM symbol based on the time-domain location of the PTRS indicated by the network device, code division multiplexing processing is performed on the PTRS mapped to the DFT-s-OFDM symbol. This can implement orthogonality of PTRSs of different terminals, thereby overcoming a problem of PTRS collision between different users, especially resolving PTRS collision between different users in a same cell.

In the solution provided in the third aspect or the fourth aspect, a specific process in which the terminal processes the PTRS based on the first indication information and the second indication information may be: first, mapping the PTRS to one or more DFT-s-OFDM symbols based on the time-domain location of the PTRS indicated in the first indication information; and then performing code division multiplexing processing on the PTRS mapped to the DFT-s-OFDM symbol.

With reference to the third aspect or the fourth aspect, in a possible implementation, the code division multiplexing information is an orthogonal cover code (OCC); and the performing code division multiplexing processing, by using the code division multiplexing information, on the PTRS mapped to the one or more DFT-s-OFDM symbols includes: performing orthogonal cover code processing, by using the OCC, on PTRSs in each PTRS chunk mapped to each DFT-s-OFDM symbol to which the PTRS is mapped.

Optionally, in this implementation, the second indication information may be at least one of the following information: a demodulation reference signal DMRS port number of the terminal, a PTRS port number of the terminal, or a terminal identity of the terminal.

It should be understood that, for terminals in a same cell, their DMRS port numbers are different from each other, their PTRS port numbers are also different from each other, and OCCs corresponding to DMRS/PTRS port numbers of different terminals are different. After the foregoing orthogonal cover code processing, PTRSs of different terminals in the cell are orthogonal to each other, thereby avoiding PTRS collision between terminals in the same cell.

Optionally, in this implementation, the second indication information may be a cell ID of a cell in which the terminal is located.

It should be understood that cell IDs of different cells are different from each other, and OCCs corresponding to different cell IDs are different. After the foregoing orthogonal cover code processing, PTRSs of terminals in different cells are orthogonal to each other, thereby avoiding PTRS collision between terminals in different cells.

With reference to the fourth aspect, in a possible implementation of the fourth aspect, the PTRS processing method further includes:

sending, by the network device, information about a correspondence between a DMRS port number and an OCC to the terminal; or sending information about a correspondence between a PTRS port number and an OCC to the terminal; or sending information about a correspondence between a terminal ID and an OCC to the terminal; or sending information about a correspondence between a cell ID and an OCC to the terminal.

With reference to the third aspect or the fourth aspect, in a possible implementation, the code division multiplexing information is a phase rotation factor; and the performing code division multiplexing processing, by using the code division multiplexing information, on the PTRS mapped to the one or more DFT-s-OFDM symbols includes: performing phase rotation processing, by using the phase rotation factor, on each PTRS chunk mapped to each DFT-s-OFDM symbol to which the PTRS is mapped.

Optionally, in this implementation, the second indication information may be at least one of the following information: a demodulation reference signal DMRS port number of the terminal, a PTRS port number of the terminal, or a terminal identity of the terminal.

It should be understood that, for terminals in a same cell, their DMRS port numbers are different from each other, their PTRS port numbers are also different from each other, and phase rotation factors corresponding to DMRS/PTRS port numbers of different terminals are different. After the foregoing phase rotation processing, PTRSs of different terminals in the cell are orthogonal to each other, thereby avoiding PTRS collision between terminals in the same cell.

Optionally, in this implementation, the second indication information may be a cell ID of a cell in which the terminal is located.

It should be understood that cell IDs of different cells are different from each other, and phase rotation factors corresponding to different cell IDs are different. After the foregoing phase rotation processing, PTRSs of terminals in different cells are orthogonal to each other, thereby avoiding PTRS collision between terminals in different cells.

With reference to the fourth aspect, in a possible implementation of the fourth aspect, the PTRS processing method further includes:

sending, by the network device, information about a correspondence between a DMRS port number and a phase rotation factor to the terminal; or sending information about a correspondence between a PTRS port number and a phase rotation factor to the terminal; or sending information about a correspondence between a terminal ID and a phase rotation factor to the terminal; or sending information about a correspondence between a cell ID and a phase rotation factor to the terminal.

With reference to the third aspect or the fourth aspect, in a possible implementation, the performing phase rotation processing, by using the phase rotation factor, on each PTRS chunk mapped to each DFT-s-OFDM symbol to which the PTRS is mapped includes: performing phase rotation processing, by using a phase rotation factor shown in the following formula, on an $(n+1)^{th}$ PTRS chunk mapped to each DFT-s-OFDM symbol to which the PTRS is mapped:

$$\exp\left(-j2\pi n \frac{N_1}{N}\right)$$

where j is a complex symbol; N represents a quantity of PTRS chunks mapped to each DFT-s-OFDM symbol to which the PTRS is mapped; n=0, 1, . . . , N−1; and $N_1$ represents a terminal-level phase rotation factor allocated to the terminal.

With reference to the third aspect or the fourth aspect, in a possible implementation, that the first indication information is used to indicate a time-domain location at which the PTRS is to be sent by the terminal specifically includes: the first indication information is used to indicate a quantity of PTRS chunks, and the quantity of PTRS chunks represents a quantity of PTRS chunks mapped to one DFT-s-OFDM symbol to which the PTRS is mapped.

In this implementation, the first indication information is scheduled bandwidth of the terminal.

For example, larger scheduled bandwidth indicates a larger quantity of PTRS chunks.

In this application, the following may be implemented by determining the quantity of PTRS chunks based on the scheduled bandwidth: A quantity of PTRSs mapped to a DFT-s-OFDM symbol increases as the scheduled bandwidth increases, and decreases as the scheduled bandwidth decreases. Therefore, this application can implement relatively high phase noise tracking performance in a large-bandwidth scenario, and can avoid excessively high overheads in a small-bandwidth scenario.

With reference to the third aspect or the fourth aspect, in a possible implementation, that the first indication information is used to indicate a time-domain location at which the PTRS is to be sent by the terminal specifically includes: the first indication information is used to indicate a time-domain density of the PTRS.

In this implementation, the first indication information is an MCS of the terminal.

With reference to the third aspect, in a possible implementation of the third aspect, the PTRS processing method further includes: obtaining a pseudo-random sequence based on a cell identity of a cell in which the terminal is located; and before the sending, by the terminal, the one or more DFT-s-OFDM symbols, the PTRS processing method further includes: performing scrambling processing, by the terminal by using the pseudo-random sequence, on the PTRS that has been mapped to the one or more DFT-s-OFDM symbols and on which the code division multiplexing processing has been performed.

For example, first, the PTRS is mapped to the one or more DFT-s-OFDM symbols based on the time-domain location of the PTRS indicated in the first indication information; then code division multiplexing processing is performed, by using the code division multiplexing information, on the PTRS mapped to the DFT-s-OFDM symbol; and finally, scrambling processing is performed, by using the pseudo-random sequence, on the PTRS on which the code division multiplexing processing has been performed.

In this application, after the PTRS is mapped to the DFT-s-OFDM symbol based on the time-domain location of the PTRS indicated by the network device, code division multiplexing processing and scrambling processing by using the pseudo-random sequence are performed on the PTRS mapped to the DFT-s-OFDM symbol. This can overcome both a problem of PTRS collision between terminals in a same cell and a problem of PTRS collision between terminals in different cells.

Optionally, in an implementation, the terminal obtains a cell-level pseudo-random sequence based on only the cell identity of the cell in which the terminal is located.

Optionally, in another implementation, the terminal obtains a terminal-level pseudo-random sequence based on the cell identity of the cell in which the terminal is located and the terminal identity of the terminal.

For example, the terminal identity of the terminal is a radio network temporary identity (RNTI) of the terminal.

Optionally, in another implementation, the pseudo-random sequence may further reuse an existing sequence of the terminal.

For example, in LTE, each terminal generates a scrambling sequence, denoted as a(n), based on an RNTI and a cell ID, and then scrambles an encoded and unmodulated bit by using the scrambling sequence. In this application, the scrambling sequence a(n) may be directly used as the pseudo-random sequence.

For example, the pseudo-random sequence may be any one of the following sequences: a gold sequence, an m-sequence, and a ZC sequence.

With reference to the third aspect, in a possible implementation of the third aspect, the performing scrambling processing, by the terminal by using the pseudo-random sequence, on the PTRS that has been mapped to the one or more DFT-s-OFDM symbols and on which the code division multiplexing processing has been performed includes: multiplying, by the terminal, the pseudo-random sequence by the PTRS on which the code division multiplexing processing has been performed.

With reference to the fourth aspect, in a possible implementation of the fourth aspect, the one or more DFT-s-OFDM symbols to which the PTRS is mapped are DFT-s-OFDM symbols obtained after the following operations, and the operations specifically include: mapping, by the terminal, the PTRS to the one or more DFT-s-OFDM symbols based on the first indication information and the second indication information; performing code division multiplexing processing, by using the code division multiplexing information, on the PTRS mapped to the one or more DFT-s-OFDM symbols; and performing scrambling processing, by using a pseudo-random sequence that is obtained based on a cell identity of a cell in which the terminal is located, on the PTRS on which the code division multiplexing processing has been performed.

In this application, after the PTRS is mapped to the DFT-s-OFDM symbol based on the time-domain location of the PTRS indicated by the network device, code division multiplexing processing and scrambling processing by using the pseudo-random sequence are performed on the PTRS mapped to the DFT-s-OFDM symbol. This can overcome both a problem of PTRS collision between terminals in a same cell and a problem of PTRS collision between terminals in different cells.

With reference to the fourth aspect, in a possible implementation of the fourth aspect, the pseudo-random sequence is a cell-level pseudo-random sequence determined based on the cell identity; or the pseudo-random sequence is a terminal-level pseudo-random sequence determined based on the cell identity and a terminal identity of the terminal.

With reference to the fourth aspect, in a possible implementation of the fourth aspect, the performing scrambling processing, by using a pseudo-random sequence that is obtained based on a cell identity of a cell in which the terminal is located, on the PTRS on which the code division multiplexing processing has been performed includes: multiplying the pseudo-random sequence by the PTRS on which the code division multiplexing processing has been performed.

With reference to the fourth aspect, in a possible implementation of the fourth aspect, the pseudo-random sequence may be any one of the following sequences: a gold sequence, an m-sequence, and a ZC sequence.

Therefore, in the solution provided in the third aspect or the fourth aspect, after the PTRS is mapped to the DFT-s-OFDM symbol based on the time-domain location of the PTRS indicated by the network device, code division multiplexing processing and scrambling processing by using the pseudo-random sequence are performed on the PTRS mapped to the DFT-s-OFDM symbol. This can overcome both a problem of PTRS collision between terminals in a same cell and a problem of PTRS collision between terminals in different cells.

According to a fifth aspect, a PTRS processing method is provided, including: receiving indication information from a network device, where the indication information is used to indicate a time-domain location at which a PTRS is to be sent; obtaining a pseudo-random sequence based on a cell identity of a cell in which a terminal is located; mapping the PTRS to one or more DFT-s-OFDM symbols based on the indication information, and performing scrambling processing, by using the pseudo-random sequence, on the PTRS mapped to the one or more DFT-s-OFDM symbols; and sending the one or more DFT-s-OFDM symbols.

According to a sixth aspect, a PTRS processing method is provided, including: sending, by a network device, indication information to a terminal, where the indication information is used to indicate a time-domain location at which a PTRS is to be sent by the terminal; and receiving, by the network device, one or more DFT-s-OFDM symbols, sent by the terminal, to which the PTRS is mapped, where the one or more DFT-s-OFDM symbols to which the PTRS is mapped are DFT-s-OFDM symbols obtained after the following operations: mapping, by the terminal, the PTRS to the one or more DFT-s-OFDM symbols based on the indication information, and performing scrambling, by using a pseudo-random sequence that is obtained based on a cell identity of a cell in which the terminal is located, on the PTRS mapped to the one or more DFT-s-OFDM symbols.

In the solution provided in the fifth aspect or the sixth aspect, the pseudo-random sequence is determined based on the cell identity of the cell in which the terminal is located, and then scrambling processing is performed, by using the pseudo-random sequence, on the PTRS mapped to the DFT-s-OFDM symbol. Because different cell identities correspond to different pseudo-random sequences, after the foregoing processing process, PTRSs mapped to DFT-s-OFDM symbols of terminals in different cells can maintain interference randomization. For example, at a receive end device, PTRSs mapped to DFT-s-OFDM symbols that are sent by DFT-s-OFDM users from adjacent cells are embodied as a random sequence, to achieve an objective of interference randomization, thereby avoiding a problem of PTRS collision between users in different cells.

With reference to the fifth aspect or the sixth aspect, in a possible implementation, the pseudo-random sequence is a cell-level pseudo-random sequence determined by the terminal based on the cell identity.

With reference to the fifth aspect or the sixth aspect, in a possible implementation, the pseudo-random sequence is a terminal-level pseudo-random sequence determined by the terminal based on the cell identity and a terminal identity of the terminal.

For example, the terminal identity of the terminal is a radio network temporary identity (RNTI) of the terminal.

In this implementation, scrambling processing is performed, by using the terminal-level pseudo-random sequence, on the PTRS mapped to the DFT-s-OFDM symbol. Therefore, this implementation can implement interference randomization of PTRSs of terminals in a cell.

With reference to the fifth aspect or the sixth aspect, in a possible implementation, the pseudo-random sequence may further reuse an existing sequence of the terminal.

For example, in LTE, each terminal generates a scrambling sequence, denoted as a(n), based on an RNTI and a cell ID, and then scrambles an encoded and unmodulated bit by using the scrambling sequence. In this application, the scrambling sequence a(n) may be directly used as the pseudo-random sequence.

For example, the pseudo-random sequence may be any one of the following sequences: a gold sequence, an m-sequence, and a ZC sequence.

With reference to the fifth aspect or the sixth aspect, in a possible implementation, the performing scrambling, by using the pseudo-random sequence, on the PTRS mapped to the one or more DFT-s-OFDM symbols includes: multiplying the pseudo-random sequence by the PTRS mapped to the one or more DFT-s-OFDM symbols.

With reference to the fifth aspect or the sixth aspect, in a possible implementation, that the indication information is used to indicate a time-domain location at which a PTRS is to be sent by the terminal specifically includes: the indication information is used to indicate a quantity of PTRS chunks, and the quantity of PTRS chunks represents a quantity of PTRS chunks mapped to one DFT-s-OFDM symbol to which the PTRS is mapped.

In this implementation, the first indication information is scheduled bandwidth of the terminal.

For example, larger scheduled bandwidth indicates a larger quantity of PTRS chunks.

In this application, the following may be implemented by determining the quantity of PTRS chunks based on the scheduled bandwidth: A quantity of PTRSs mapped to a DFT-s-OFDM symbol increases as the scheduled bandwidth increases, and decreases as the scheduled bandwidth decreases. Therefore, this application can implement relatively high phase noise tracking performance in a large-bandwidth scenario, and can avoid excessively high overheads in a small-bandwidth scenario.

With reference to the fifth aspect or the sixth aspect, in a possible implementation, that the indication information is used to indicate a time-domain location at which the PTRS is to be sent by the terminal specifically includes: the indication information is used to indicate a time-domain density of the PTRS.

In this implementation, the first indication information is an MCS of the terminal.

Therefore, in the solution provided in the fifth aspect or the sixth aspect, the pseudo-random sequence is determined based on the cell identity of the cell in which the terminal is located, and then scrambling processing is performed, by using the pseudo-random sequence, on the PTRS mapped to the DFT-s-OFDM symbol. Because different cell identities correspond to different pseudo-random sequences, after the foregoing processing process, PTRSs mapped to DFT-s-OFDM symbols of terminals in different cells can maintain interference randomization. For example, at a receive end device, PTRSs mapped to DFT-s-OFDM symbols that are sent by DFT-s-OFDM users from adjacent cells are embodied as a random sequence, to achieve an objective of interference randomization, thereby avoiding a problem of PTRS collision between users in different cells.

According to a seventh aspect, an apparatus is provided, including:

a receiving unit, configured to receive first indication information and second indication information from a network device, where the first indication information is used to indicate a time-domain location at which a PTRS is to be sent, and the second indication information is used to indicate an offset of an initial time-domain location to which the PTRS is mapped;

a processing unit, configured to map the PTRS to one or more DFT-s-OFDM symbols based on the first indication information and the second indication information that are received by the receiving unit; and a sending unit, configured to output the one or more DFT-s-OFDM symbols obtained by the processing unit.

The apparatus may be a terminal device, or may be a chip.

According to an eighth aspect, an apparatus is provided, including:

a sending unit, configured to send first indication information and second indication information to a terminal, where the first indication information is used to indicate a time-domain location at which a PTRS is to be sent by the terminal, and the second indication information is used to indicate an offset of an initial time-domain location to which the PTRS is mapped by the terminal; and a receiving unit, configured to receive one or more DFT-s-OFDM symbols sent by the terminal, where the one or more DFT-s-OFDM symbols are mapped by the terminal to a PTRS based on the first indication information and the second indication information.

The apparatus may be a network device, or may be a chip.

In the apparatus provided in the seventh aspect or the eighth aspect, the PTRS is mapped to the DFT-s-OFDM symbol based on the time-domain location of the PTRS and the offset of the initial time-domain location to which the PTRS is mapped, so as to avoid a problem of time domain overlapping of PTRSs mapped to DFT-s-OFDM symbols of different terminals to an extent, thereby overcoming a problem of PTRS collision between different users.

With reference to the seventh aspect or the eighth aspect, in a possible implementation, that the second indication information is used to indicate an offset of an initial time-domain location to which the PTRS is mapped by the terminal specifically includes: the second indication information is used to indicate an offset that is of the initial time-domain location to which the PTRS is mapped and that is relative to the first DFT-s-OFDM symbol.

With reference to the seventh aspect or the eighth aspect, in a possible implementation, that the second indication information is used to indicate an offset of an initial time-domain location to which the PTRS is mapped by the terminal specifically includes: the second indication information is used to indicate an offset that is of the initial time-domain location to which the PTRS is mapped and that is relative to the first modulated symbol of the first DFT-s-OFDM symbol to which the PTRS is mapped.

With reference to the seventh aspect or the eighth aspect, in a possible implementation, the second indication information is at least one of the following information: a demodulation reference signal DMRS port number of the terminal, a PTRS port number of the terminal, or a cell identity of the terminal.

With reference to the eighth aspect, in a possible implementation of the eighth aspect, the sending unit is further configured to send information about a correspondence between a DMRS port number and a PTRS mapping location set to the terminal; or send information about a correspondence between a PTRS port number and a PTRS mapping location set to the terminal; or send information about a correspondence between a cell ID and a PTRS mapping location set to the terminal.

With reference to the seventh aspect or the eighth aspect, in a possible implementation, that the first indication information is used to indicate a time-domain location at which a PTRS is to be sent by the terminal specifically includes: the first indication information is used to indicate a quantity of PTRS chunks, and the quantity of PTRS chunks represents a quantity of PTRS chunks mapped to one DFT-s-OFDM symbol to which the PTRS is mapped.

With reference to the seventh aspect or the eighth aspect, in a possible implementation, that the first indication information is used to indicate a time-domain location at which a PTRS is to be sent by the terminal specifically includes: the first indication information is used to indicate a time-domain density of the PTRS.

With reference to the seventh aspect or the eighth aspect, in a possible implementation, the first indication information is scheduled bandwidth of the terminal.

With reference to the seventh aspect or the eighth aspect, in a possible implementation, the first indication information is a modulation and coding scheme MCS of the terminal.

With reference to the seventh aspect, in a possible implementation, the apparatus is a terminal or a chip.

With reference to the eighth aspect, in a possible implementation, the apparatus is a network device or a chip.

According to a ninth aspect, an apparatus is provided, including:

a receiving unit, configured to receive first indication information and second indication information from a network device, where the first indication information is used to indicate a time-domain location at which a PTRS is to be sent, the second indication information is used to indicate code division multiplexing information, and the code division multiplexing information is used to perform code division multiplexing processing on a PTRS mapped to a DFT-s-OFDM symbol to which the PTRS is mapped;

a processing unit, configured to map the PTRS to one or more DFT-s-OFDM symbols based on the first indication information and the second indication information that are received by the receiving unit, and perform code division multiplexing processing, by using the code division multiplexing information, on the PTRS mapped to the one or more DFT-s-OFDM symbols; and a sending unit, configured to output the one or more DFT-s-OFDM symbols obtained by the processing unit.

The apparatus may be a terminal device, or may be a chip.

In this solution, after the PTRS is mapped to the DFT-s-OFDM symbol, code division multiplexing processing is performed on the PTRS mapped to the DFT-s-OFDM symbol. This can implement orthogonality of PTRSs of different terminals, thereby overcoming a problem of PTRS collision between different users, especially resolving PTRS collision between different users in a same cell.

With reference to the ninth aspect, in a possible implementation of the ninth aspect, the code division multiplexing information is an orthogonal cover code OCC; and that the processing unit is configured to perform code division multiplexing processing, by using the code division multiplexing information, on the PTRS mapped to the one or more DFT-s-OFDM symbols specifically includes:

the processing unit is configured to perform orthogonal cover code processing, by using the OCC, on PTRSs in each PTRS chunk mapped to each DFT-s-OFDM symbol to which the PTRS is mapped.

With reference to the ninth aspect, in a possible implementation of the ninth aspect, the code division multiplexing information is a phase rotation factor; and that the processing unit is configured to perform code division multiplexing processing, by using the code division multiplexing information, on the PTRS mapped to the one or more DFT-s-OFDM symbols specifically includes:

the processing unit is configured to perform phase rotation processing, by using the phase rotation factor, on each PTRS chunk mapped to each DFT-s-OFDM symbol to which the PTRS is mapped.

With reference to the ninth aspect, in a possible implementation of the ninth aspect, that the processing unit is configured to perform phase rotation processing, by using the phase rotation factor, on each PTRS chunk mapped to each DFT-s-OFDM symbol to which the PTRS is mapped specifically includes:

the processing unit is configured to perform phase rotation processing, by using a phase rotation factor shown in the following formula, on an $(n+1)^{th}$ PTRS chunk mapped to each DFT-s-OFDM symbol to which the PTRS is mapped:

$$\exp\left(-j2\pi n \frac{N_1}{N}\right)$$

where j is a complex symbol; N represents a quantity of PTRS chunks mapped to each DFT-s-OFDM symbol to which the PTRS is mapped; n=0, 1, . . . , N−1; and $N_1$ represents a terminal-level phase rotation factor allocated to a terminal.

With reference to the ninth aspect, in a possible implementation of the ninth aspect, the processing unit is further configured to obtain a pseudo-random sequence based on a cell identity of a cell in which the apparatus is located; and the processing unit is further configured to perform scrambling processing, by using the pseudo-random sequence, on the PTRS that has been mapped to the one or more DFT-s-OFDM symbols and on which the code division multiplexing processing has been performed.

With reference to the ninth aspect, in a possible implementation of the ninth aspect, the second indication information is at least one of the following information: a demodulation reference signal DMRS port number of the terminal, a PTRS port number of the terminal, or a cell identity of the terminal.

With reference to the ninth aspect, in a possible implementation of the ninth aspect, that the first indication information is used to indicate a time-domain location at which a PTRS is to be sent by the terminal specifically includes: the first indication information is used to indicate a quantity of PTRS chunks, and the quantity of PTRS chunks represents a quantity of PTRS chunks mapped to one DFT-s-OFDM symbol to which the PTRS is mapped.

Optionally, in this implementation, the first indication information is scheduled bandwidth of the terminal.

With reference to the ninth aspect, in a possible implementation of the ninth aspect, that the first indication information is used to indicate a time-domain location at which a PTRS is to be sent by the terminal specifically includes: the first indication information is used to indicate a time-domain density of the PTRS.

Optionally, in this implementation, the first indication information is a modulation and coding scheme MCS of the terminal.

With reference to the ninth aspect, in a possible implementation of the ninth aspect, that the processing unit is configured to obtain a pseudo-random sequence based on a cell identity of a cell in which the terminal is located specifically includes:

the processing unit is configured to obtain a cell-level pseudo-random sequence based on the cell identity; or obtain a terminal-level pseudo-random sequence based on the cell identity and a terminal identity of the terminal.

With reference to the ninth aspect, in a possible implementation of the ninth aspect, that the processing unit is configured to perform scrambling processing, by using the pseudo-random sequence, on the PTRS that has been mapped to the one or more DFT-s-OFDM symbols and on which the code division multiplexing processing has been performed specifically includes:

the processing unit is configured to multiply the pseudo-random sequence by the PTRS on which the code division multiplexing processing has been performed.

With reference to the ninth aspect, in a possible implementation of the ninth aspect, the pseudo-random sequence may be any one of the following sequences: a gold sequence, an m-sequence, and a ZC sequence.

With reference to the ninth aspect, in a possible implementation of the ninth aspect, the apparatus is a terminal or a chip.

According to a tenth aspect, an apparatus is provided, including:

a sending unit, configured to send first indication information and second indication information to a terminal, where the first indication information is used to indicate a time-domain location at which a PTRS is to be sent by the terminal, the second indication information is used to indicate code division multiplexing information, and the code division multiplexing information is used to perform code division multiplexing processing on a PTRS mapped to a DFT-s-OFDM symbol to which the PTRS is mapped; and a receiving unit, configured to receive one or more DFT-s-OFDM symbols, sent by the terminal, to which the PTRS is mapped, where the one or more DFT-s-OFDM symbols to which the PTRS is mapped are DFT-s-OFDM symbols obtained after the following operations: mapping, by the terminal, the PTRS to the one or more DFT-s-OFDM symbols based on the first indication information and the second indication information; and performing code division multiplexing processing, by using the code division multiplexing information, on the PTRS mapped to the one or more DFT-s-OFDM symbols.

The apparatus may be a network device, or may be a chip.

In this solution, after the PTRS is mapped to the DFT-s-OFDM symbol, code division multiplexing processing is performed on the PTRS mapped to the DFT-s-OFDM symbol. This can implement orthogonality of PTRSs of different terminals, thereby overcoming a problem of PTRS collision between different users, especially resolving PTRS collision between different users in a same cell.

With reference to the tenth aspect, in a possible implementation of the tenth aspect, the code division multiplexing information is an orthogonal cover code OCC; and the performing code division multiplexing processing, by using the code division multiplexing information, on the PTRS mapped to the one or more DFT-s-OFDM symbols includes:

performing orthogonal cover code processing, by using the OCC, on PTRSs in each PTRS chunk mapped to each DFT-s-OFDM symbol to which the PTRS is mapped.

With reference to the tenth aspect, in a possible implementation of the tenth aspect, the code division multiplexing information is a phase rotation factor; and the performing code division multiplexing processing, by using the code division multiplexing information, on the PTRS mapped to the one or more DFT-s-OFDM symbols includes:

performing phase rotation processing, by using the phase rotation factor, on each PTRS chunk mapped to each DFT-s-OFDM symbol to which the PTRS is mapped.

With reference to the tenth aspect, in a possible implementation of the tenth aspect, the performing phase rotation processing, by using the phase rotation factor, on each PTRS chunk mapped to each DFT-s-OFDM symbol to which the PTRS is mapped includes:

performing phase rotation processing, by using a phase rotation factor shown in the following formula, on an $(n+1)^{th}$ PTRS chunk mapped to each DFT-s-OFDM symbol to which the PTRS is mapped:

$$\exp\left(-j2\pi n \frac{N_1}{N}\right)$$

where j is a complex symbol; N represents a quantity of PTRS chunks mapped to each DFT-s-OFDM symbol to which the PTRS is mapped; n=0, 1, ..., N−1; and $N_1$ represents a terminal-level phase rotation factor allocated to the terminal.

With reference to the tenth aspect, in a possible implementation of the tenth aspect, the second indication information is at least one of the following information: a demodulation reference signal DMRS port number of the terminal, a PTRS port number of the terminal, or a cell identity of the terminal.

With reference to the tenth aspect, in a possible implementation of the tenth aspect, the sending unit is further configured to send information about a correspondence between a DMRS port number and an OCC to the terminal; or send information about a correspondence between a PTRS port number and an OCC to the terminal; or send information about a correspondence between a terminal ID and an OCC to the terminal; or send information about a correspondence between a cell ID and an OCC to the terminal.

With reference to the tenth aspect, in a possible implementation of the tenth aspect, the sending unit is further configured to send information about a correspondence between a DMRS port number and a phase rotation factor to the terminal; or send information about a correspondence between a PTRS port number and a phase rotation factor to the terminal; or send information about a correspondence between a terminal ID and a phase rotation factor to the terminal; or send information about a correspondence between a cell ID and a phase rotation factor to the terminal.

With reference to the tenth aspect, in a possible implementation of the tenth aspect, that the first indication information is used to indicate a time-domain location at which a PTRS is to be sent by the terminal specifically includes: the first indication information is used to indicate a quantity of PTRS chunks, and the quantity of PTRS chunks represents a quantity of PTRS chunks mapped to one DFT-s-OFDM symbol to which the PTRS is mapped.

Optionally, in this implementation, the first indication information is scheduled bandwidth of the terminal.

With reference to the tenth aspect, in a possible implementation of the tenth aspect, that the first indication information is used to indicate a time-domain location at which a PTRS is to be sent by the terminal specifically includes: the first indication information is used to indicate a time-domain density of the PTRS.

Optionally, in this implementation, the first indication information is a modulation and coding scheme MCS of the terminal.

With reference to the tenth aspect, in a possible implementation of the tenth aspect, the one or more DFT-s-OFDM symbols to which the PTRS is mapped are DFT-s-OFDM symbols obtained after the following operations, and the operations specifically include:

mapping, by the terminal, the PTRS to the one or more DFT-s-OFDM symbols based on the first indication information and the second indication information; performing code division multiplexing processing, by using the code division multiplexing information, on the PTRS mapped to the one or more DFT-s-OFDM symbols; and performing scrambling processing, by using a pseudo-random sequence that is obtained based on a cell identity of a cell in which the terminal is located, on the PTRS on which the code division multiplexing processing has been performed.

With reference to the tenth aspect, in a possible implementation of the tenth aspect, the pseudo-random sequence is a cell-level pseudo-random sequence determined based on the cell identity; or the pseudo-random sequence is a terminal-level pseudo-random sequence determined based on the cell identity and a terminal identity of the terminal.

With reference to the tenth aspect, in a possible implementation of the tenth aspect, the performing scrambling processing, by using a pseudo-random sequence that is obtained based on a cell identity of a cell in which the terminal is located, on the PTRS on which the code division multiplexing processing has been performed includes: multiplying the pseudo-random sequence by the PTRS on which the code division multiplexing processing has been performed.

With reference to the tenth aspect, in a possible implementation of the tenth aspect, the pseudo-random sequence may be any one of the following sequences: a gold sequence, an m-sequence, and a ZC sequence.

With reference to the tenth aspect, in a possible implementation of the tenth aspect, the apparatus is a network device or a chip.

According to an eleventh aspect, an apparatus is provided, including:

a receiving unit, configured to receive indication information from a network device, where the indication information is used to indicate a time-domain location at which a PTRS is to be sent;

a processing unit, configured to obtain a pseudo-random sequence based on a cell identity of a cell in which the apparatus is located, where the processing unit is further configured to map the PTRS to one or more DFT-s-OFDM symbols based on the indication information received by the receiving unit, and perform scrambling processing, by using the pseudo-random sequence, on the PTRS mapped to the one or more DFT-s-OFDM symbols; and a sending unit, configured to output the one or more DFT-s-OFDM symbols obtained by the processing unit.

The apparatus may be a terminal device, or may be a chip.

In this application, the pseudo-random sequence is determined based on the cell identity, and then scrambling processing is performed, by using the pseudo-random sequence, on the PTRS mapped to the DFT-s-OFDM symbol. Because different cell identities correspond to different pseudo-random sequences, after the foregoing processing process, PTRSs mapped to DFT-s-OFDM symbols of terminals in different cells can maintain interference randomization. For example, at a receive end device, PTRSs mapped to DFT-s-OFDM symbols that are sent by DFT-s-OFDM users from adjacent cells are embodied as a random sequence, to achieve an objective of interference randomization, thereby avoiding a problem of PTRS collision between users in different cells.

With reference to the eleventh aspect, in a possible implementation of the eleventh aspect, that the processing unit is configured to obtain a pseudo-random sequence based on a cell identity of a cell in which a terminal is located specifically includes:

the processing unit is configured to obtain a cell-level pseudo-random sequence based on the cell identity; or obtain a terminal-level pseudo-random sequence based on the cell identity and a terminal identity of the terminal.

With reference to the eleventh aspect, in a possible implementation of the eleventh aspect, that the processing unit is configured to perform scrambling, by using the pseudo-random sequence, on the PTRS mapped to the one or more DFT-s-OFDM symbols specifically includes:

the processing unit is configured to multiply the pseudo-random sequence by the PTRS mapped to the one or more DFT-s-OFDM symbols.

With reference to the eleventh aspect, in a possible implementation of the eleventh aspect, the apparatus is a terminal or a chip.

According to a twelfth aspect, an apparatus is provided, including:

a sending unit, configured to send indication information to a terminal, where the indication information is used to indicate a time-domain location at which a PTRS is to be sent by the terminal; and a receiving unit, configured to receive one or more DFT-s-OFDM symbols, sent by the terminal, to which the PTRS is mapped, where the one or more DFT-s-OFDM symbols to which the PTRS is mapped are DFT-s-OFDM symbols obtained after the following operations: mapping, by the terminal, the PTRS to the one or more DFT-s-OFDM symbols based on the indication information; and performing scrambling, by using a pseudo-random sequence that is obtained based on a cell identity of a cell in which the terminal is located, on the PTRS mapped to the one or more DFT-s-OFDM symbols.

The apparatus may be a network device, or may be a chip.

In this application, the pseudo-random sequence is determined based on the cell identity, and then scrambling processing is performed, by using the pseudo-random sequence, on the PTRS mapped to the DFT-s-OFDM symbol. Because different cell identities correspond to different pseudo-random sequences, after the foregoing processing process, PTRSs mapped to DFT-s-OFDM symbols of terminals in different cells can maintain interference randomization. For example, at a receive end device, PTRSs mapped to DFT-s-OFDM symbols that are sent by DFT-s-OFDM users from adjacent cells are embodied as a random sequence, to achieve an objective of interference randomization, thereby avoiding a problem of PTRS collision between users in different cells.

With reference to the twelfth aspect, in a possible implementation of the twelfth aspect, the pseudo-random sequence is a terminal-level pseudo-random sequence determined based on the cell identity; or the pseudo-random sequence is a cell-level pseudo-random sequence determined based on the cell identity and a terminal identity of the terminal.

With reference to the twelfth aspect, in a possible implementation of the twelfth aspect, the performing scrambling, by using the pseudo-random sequence, on the PTRS mapped to the one or more DFT-s-OFDM symbols includes:

multiplying the pseudo-random sequence by the PTRS mapped to the one or more DFT-s-OFDM symbols.

With reference to the twelfth aspect, in a possible implementation of the twelfth aspect, the apparatus is a network device.

With reference to the eleventh aspect or the twelfth aspect, in a possible implementation, the pseudo-random sequence may be any one of the following sequences: a gold sequence, an m-sequence, and a ZC sequence.

With reference to the eleventh aspect or the twelfth aspect, in a possible implementation, that the indication information is used to indicate a time-domain location at which a PTRS is to be sent by the terminal specifically includes: the indication information is used to indicate a quantity of PTRS chunks, and the quantity of PTRS chunks represents a quantity of PTRS chunks mapped to one DFT-s-OFDM symbol to which the PTRS is mapped.

Optionally, in this implementation, the indication information is scheduled bandwidth of the terminal.

With reference to the eleventh aspect or the twelfth aspect, in a possible implementation, that the indication information is used to indicate a time-domain location at which a PTRS is to be sent by the terminal specifically includes: the indication information is used to indicate a time-domain density of the PTRS.

Optionally, in this implementation, the indication information is a modulation and coding scheme MCS of the terminal.

According to a thirteenth aspect, an apparatus is provided, including: a processor, a memory, and a transceiver. The processor, the memory, and the transceiver communicate with each other through an internal connection path. The memory is configured to store an instruction. The processor is configured to execute the instruction stored in the memory, to control the transceiver to receive or send a signal. When the instruction stored in the memory is executed:

the transceiver is configured to receive first indication information and second indication information from a network device, where the first indication information is used to indicate a time-domain location at which a PTRS is to be sent by a terminal, and the second indication information is used to indicate an offset of an initial time-domain location to which the PTRS is mapped by the terminal;

the processor is configured to map the PTRS to one or more DFT-s-OFDM symbols based on the first indication information and the second indication information that are received by the transceiver; and the transceiver is configured to output the one or more DFT-s-OFDM symbols obtained by the processor.

The apparatus may be a terminal device, or may be a chip.

According to a fourteenth aspect, an apparatus is provided, including: a processor, a memory, and a transceiver. The processor, the memory, and the transceiver communicate with each other through an internal connection path. The memory is configured to store an instruction. The processor is configured to execute the instruction stored in the memory, to control the transceiver to receive or send a signal. When the instruction stored in the memory is executed:

the transceiver is configured to send first indication information and second indication information to a terminal, where the first indication information is used to indicate a time-domain location at which a PTRS is to be sent by the terminal, and the second indication information is used to indicate an offset of an initial time-domain location to which the PTRS is mapped by the terminal; and the transceiver is configured to receive one or more DFT-s-OFDM symbols sent by the terminal, where the one or more DFT-s-OFDM symbols are mapped by the terminal to a PTRS based on the first indication information and the second indication information.

The apparatus may be a network device, or may be a chip.

In the apparatus provided in the thirteenth aspect or the fourteenth aspect, the PTRS is mapped to the DFT-s-OFDM symbol based on the time-domain location of the PTRS and the offset of the initial time-domain location to which the PTRS is mapped, so as to avoid a problem of time domain overlapping of PTRSs mapped to DFT-s-OFDM symbols of different terminals to an extent, thereby overcoming a problem of PTRS collision between different users.

With reference to the thirteenth aspect or the fourteenth aspect, in a possible implementation, that the second indication information is used to indicate an offset of an initial time-domain location to which the PTRS is mapped by the terminal specifically includes: the second indication information is used to indicate an offset that is of the initial time-domain location to which the PTRS is mapped and that is relative to the first DFT-s-OFDM symbol.

With reference to the thirteenth aspect or the fourteenth aspect, in a possible implementation, that the second indication information is used to indicate an offset of an initial time-domain location to which the PTRS is mapped by the terminal specifically includes: the second indication information is used to indicate an offset that is of the initial time-domain location to which the PTRS is mapped and that is relative to the first modulated symbol of the first DFT-s-OFDM symbol to which the PTRS is mapped.

With reference to the thirteenth aspect or the fourteenth aspect, in a possible implementation, the second indication information is at least one of the following information: a demodulation reference signal DMRS port number of the terminal, a PTRS port number of the terminal, or a cell identity of the terminal.

With reference to the fourteenth aspect, in a possible implementation of the fourteenth aspect, the transceiver is further configured to send information about a correspondence between a DMRS port number and a PTRS mapping location set to the terminal; or send information about a correspondence between a PTRS port number and a PTRS mapping location set to the terminal; or send information about a correspondence between a cell ID and a PTRS mapping location set to the terminal.

With reference to the thirteenth aspect or the fourteenth aspect, in a possible implementation, that the first indication information is used to indicate a time-domain location at which a PTRS is to be sent by the terminal specifically includes: the first indication information is used to indicate a quantity of PTRS chunks, and the quantity of PTRS chunks represents a quantity of PTRS chunks mapped to one DFT-s-OFDM symbol to which the PTRS is mapped.

With reference to the thirteenth aspect or the fourteenth aspect, in a possible implementation, that the first indication information is used to indicate a time-domain location at which a PTRS is to be sent by the terminal specifically includes: the first indication information is used to indicate a time-domain density of the PTRS.

With reference to the thirteenth aspect or the fourteenth aspect, in a possible implementation, the first indication information is scheduled bandwidth of the terminal.

With reference to the thirteenth aspect or the fourteenth aspect, in a possible implementation, the first indication information is a modulation and coding scheme MCS of the terminal.

With reference to the thirteenth aspect, in a possible implementation, the apparatus is a terminal or a chip.

With reference to the fourteenth aspect, in a possible implementation, the apparatus is a network device or a chip.

According to a fifteenth aspect, an apparatus is provided, including: a processor, a memory, and a transceiver. The processor, the memory, and the transceiver communicate with each other through an internal connection path. The memory is configured to store an instruction. The processor is configured to execute the instruction stored in the memory, to control the transceiver to receive or send a signal. When the instruction stored in the memory is executed:

the transceiver is configured to receive first indication information and second indication information from a network device, where the first indication information is used to indicate a time-domain location at which a PTRS is to be sent, the second indication information is used to indicate code division multiplexing information, and the code division multiplexing information is used to perform code division multiplexing processing on a PTRS mapped to a DFT-s-OFDM symbol to which the PTRS is mapped;

the processor is configured to map the PTRS to one or more DFT-s-OFDM symbols based on the first indication information and the second indication information, and perform code division multiplexing processing, by using the code division multiplexing information, on the PTRS mapped to the one or more DFT-s-OFDM symbols; and the transceiver is configured to output the one or more DFT-s-OFDM symbols obtained by the processor.

The apparatus may be a terminal device, or may be a chip.

In this solution, after the PTRS is mapped to the DFT-s-OFDM symbol, code division multiplexing processing is performed on the PTRS mapped to the DFT-s-OFDM symbol. This can implement orthogonality of PTRSs of different terminals, thereby overcoming a problem of PTRS collision between different users, especially resolving PTRS collision between different users in a same cell.

With reference to the fifteenth aspect, in a possible implementation of the fifteenth aspect, the code division multiplexing information is an orthogonal cover code OCC; and that the processor is configured to perform code division multiplexing processing, by using the code division multiplexing information, on the PTRS mapped to the one or more DFT-s-OFDM symbols specifically includes:

the processor is configured to perform orthogonal cover code processing, by using the OCC, on PTRSs in each PTRS chunk mapped to each DFT-s-OFDM symbol to which the PTRS is mapped.

With reference to the fifteenth aspect, in a possible implementation of the fifteenth aspect, the code division multiplexing information is a phase rotation factor; and that the processor is configured to perform code division multiplexing processing, by using the code division multiplexing information, on the PTRS mapped to the one or more DFT-s-OFDM symbols specifically includes:

the processor is configured to perform phase rotation processing, by using the phase rotation factor, on each PTRS chunk mapped to each DFT-s-OFDM symbol to which the PTRS is mapped.

With reference to the fifteenth aspect, in a possible implementation of the fifteenth aspect, that the processor is configured to perform phase rotation processing, by using the phase rotation factor, on each PTRS chunk mapped to each DFT-s-OFDM symbol to which the PTRS is mapped specifically includes:

the processor is configured to perform phase rotation processing, by using a phase rotation factor shown in the following formula, on an $(n+1)^{th}$ PTRS chunk mapped to each DFT-s-OFDM symbol to which the PTRS is mapped:

$$\exp\left(-j2\pi n\frac{N_1}{N}\right)$$

where j is a complex symbol; N represents a quantity of PTRS chunks mapped to each DFT-s-OFDM symbol to which the PTRS is mapped; n=0, 1, . . . , N−1; and $N_1$ represents a terminal-level phase rotation factor allocated to a terminal.

With reference to the fifteenth aspect, in a possible implementation of the fifteenth aspect, the processor is further configured to obtain a pseudo-random sequence based on a cell identity of a cell in which the apparatus is located; and the processor is further configured to perform scrambling processing, by using the pseudo-random sequence, on the PTRS that has been mapped to the one or more DFT-s-OFDM symbols and on which the code division multiplexing processing has been performed.

With reference to the fifteenth aspect, in a possible implementation of the fifteenth aspect, the second indication information is at least one of the following information: a demodulation reference signal DMRS port number of the terminal, a PTRS port number of the terminal, or a cell identity of the terminal.

With reference to the fifteenth aspect, in a possible implementation of the fifteenth aspect, that the first indication information is used to indicate a time-domain location at which a PTRS is to be sent by a terminal specifically includes: the first indication information is used to indicate a quantity of PTRS chunks, and the quantity of PTRS chunks represents a quantity of PTRS chunks mapped to one DFT-s-OFDM symbol to which the PTRS is mapped.

Optionally, in this implementation, the first indication information is scheduled bandwidth of the terminal.

With reference to the fifteenth aspect, in a possible implementation of the fifteenth aspect, that the first indication information is used to indicate a time-domain location at which a PTRS is to be sent by the terminal specifically includes: the first indication information is used to indicate a time-domain density of the PTRS.

Optionally, in this implementation, the first indication information is a modulation and coding scheme MCS of the terminal.

With reference to the fifteenth aspect, in a possible implementation of the fifteenth aspect, that the processor is configured to obtain a pseudo-random sequence based on a cell identity of a cell in which the terminal is located specifically includes:

the processor is configured to obtain a cell-level pseudo-random sequence based on the cell identity; or obtain a terminal-level pseudo-random sequence based on the cell identity and a terminal identity of the terminal.

With reference to the fifteenth aspect, in a possible implementation of the fifteenth aspect, that the processor is configured to perform scrambling processing, by using the pseudo-random sequence, on the PTRS that has been mapped to the one or more DFT-s-OFDM symbols and on which the code division multiplexing processing has been performed specifically includes:

the processor is configured to multiply the pseudo-random sequence by the PTRS on which the code division multiplexing processing has been performed.

With reference to the fifteenth aspect, in a possible implementation of the fifteenth aspect, the pseudo-random sequence may be any one of the following sequences: a gold sequence, an m-sequence, and a ZC sequence.

With reference to the fifteenth aspect, in a possible implementation of the fifteenth aspect, the apparatus is a terminal or a chip.

According to a sixteenth aspect, an apparatus is provided, including: a processor, a memory, and a transceiver. The processor, the memory, and the transceiver communicate with each other through an internal connection path. The memory is configured to store an instruction. The processor is configured to execute the instruction stored in the memory, to control the transceiver to receive or send a signal. When the instruction stored in the memory is executed:

the transceiver is configured to send first indication information and second indication information to a terminal, where the first indication information is used to indicate a time-domain location at which a PTRS is to be sent by the terminal, the second indication information is used to indicate code division multiplexing information, and the code division multiplexing information is used to perform code division multiplexing processing on a PTRS mapped to a DFT-s-OFDM symbol to which the PTRS is mapped; and the transceiver is configured to receive one or more DFT-s-OFDM symbols, sent by the terminal, to which the PTRS is mapped, where the one or more DFT-s-OFDM symbols to which the PTRS is mapped are DFT-s-OFDM symbols obtained after the following operations: mapping, by the terminal, the PTRS to the one or more DFT-s-OFDM symbols based on the first indication information and the second indication information; and performing code division multiplexing processing, by using the code division multiplexing information, on the PTRS mapped to the one or more DFT-s-OFDM symbols.

The apparatus may be a network device, or may be a chip.

In this solution, after the PTRS is mapped to the DFT-s-OFDM symbol, code division multiplexing processing is performed on the PTRS mapped to the DFT-s-OFDM symbol. This can implement orthogonality of PTRSs of different terminals, thereby overcoming a problem of PTRS collision between different users, especially resolving PTRS collision between different users in a same cell.

With reference to the sixteenth aspect, in a possible implementation of the sixteenth aspect, the code division multiplexing information is an orthogonal cover code OCC; and the performing code division multiplexing processing, by using the code division multiplexing information, on the PTRS mapped to the one or more DFT-s-OFDM symbols includes:

performing orthogonal cover code processing, by using the OCC, on PTRSs in each PTRS chunk mapped to each DFT-s-OFDM symbol to which the PTRS is mapped.

With reference to the sixteenth aspect, in a possible implementation of the sixteenth aspect, the code division multiplexing information is a phase rotation factor; and the performing code division multiplexing processing, by using the code division multiplexing information, on the PTRS mapped to the one or more DFT-s-OFDM symbols includes:

performing phase rotation processing, by using the phase rotation factor, on each PTRS chunk mapped to each DFT-s-OFDM symbol to which the PTRS is mapped.

With reference to the sixteenth aspect, in a possible implementation of the sixteenth aspect, the performing phase rotation processing, by using the phase rotation factor, on each PTRS chunk mapped to each DFT-s-OFDM symbol to which the PTRS is mapped includes:

performing phase rotation processing, by using a phase rotation factor shown in the following formula, on an $(n+1)^{th}$ PTRS chunk mapped to each DFT-s-OFDM symbol to which the PTRS is mapped:

$$\exp\left(-j2\pi n \frac{N_1}{N}\right)$$

where j is a complex symbol; N represents a quantity of PTRS chunks mapped to each DFT-s-OFDM symbol to which the PTRS is mapped; n=0, 1, . . . , N−1; and $N_1$ represents a terminal-level phase rotation factor allocated to the terminal.

With reference to the sixteenth aspect, in a possible implementation of the sixteenth aspect, the second indication information is at least one of the following information: a demodulation reference signal DMRS port number of the terminal, a PTRS port number of the terminal, or a cell identity of the terminal.

With reference to the sixteenth aspect, in a possible implementation of the sixteenth aspect, the transceiver is further configured to send information about a correspondence between a DMRS port number and an OCC to the terminal; or send information about a correspondence between a PTRS port number and an OCC to the terminal; or send information about a correspondence between a terminal ID and an OCC to the terminal; or send information about a correspondence between a cell ID and an OCC to the terminal.

With reference to the sixteenth aspect, in a possible implementation of the sixteenth aspect, the transceiver is further configured to send information about a correspondence between a DMRS port number and a phase rotation factor to the terminal; or send information about a correspondence between a PTRS port number and a phase rotation factor to the terminal; or send information about a correspondence between a terminal ID and a phase rotation factor to the terminal; or send information about a correspondence between a cell ID and a phase rotation factor to the terminal.

With reference to the sixteenth aspect, in a possible implementation of the sixteenth aspect, that the first indication information is used to indicate a time-domain location at which a PTRS is to be sent by the terminal specifically includes: the first indication information is used to indicate a quantity of PTRS chunks, and the quantity of PTRS chunks represents a quantity of PTRS chunks mapped to one DFT-s-OFDM symbol to which the PTRS is mapped.

Optionally, in this implementation, the first indication information is scheduled bandwidth of the terminal.

With reference to the sixteenth aspect, in a possible implementation of the sixteenth aspect, that the first indication information is used to indicate a time-domain location at which a PTRS is to be sent by the terminal specifically includes: the first indication information is used to indicate a time-domain density of the PTRS.

Optionally, in this implementation, the first indication information is a modulation and coding scheme MCS of the terminal.

With reference to the sixteenth aspect, in a possible implementation of the sixteenth aspect, the one or more DFT-s-OFDM symbols to which the PTRS is mapped are DFT-s-OFDM symbols obtained after the following operations, and the operations specifically include:

mapping, by the terminal, the PTRS to the one or more DFT-s-OFDM symbols based on the first indication information and the second indication information; performing code division multiplexing processing, by using the code division multiplexing information, on the PTRS mapped to the one or more DFT-s-OFDM symbols; and performing scrambling processing, by using a pseudo-random sequence that is obtained based on a cell identity of a cell in which the terminal is located, on the PTRS on which the code division multiplexing processing has been performed.

With reference to the sixteenth aspect, in a possible implementation of the sixteenth aspect, the pseudo-random sequence is a cell-level pseudo-random sequence determined based on the cell identity; or the pseudo-random sequence is a terminal-level pseudo-random sequence determined based on the cell identity and a terminal identity of the terminal.

With reference to the sixteenth aspect, in a possible implementation of the sixteenth aspect, the performing scrambling processing, by using a pseudo-random sequence that is obtained based on a cell identity of a cell in which the terminal is located, on the PTRS on which the code division multiplexing processing has been performed includes: multiplying the pseudo-random sequence by the PTRS on which the code division multiplexing processing has been performed.

With reference to the sixteenth aspect, in a possible implementation of the sixteenth aspect, the pseudo-random sequence may be any one of the following sequences: a gold sequence, an m-sequence, and a ZC sequence.

With reference to the sixteenth aspect, in a possible implementation of the sixteenth aspect, the apparatus is a network device.

According to a seventeenth aspect, an apparatus is provided, including: a processor, a memory, and a transceiver. The processor, the memory, and the transceiver communicate with each other through an internal connection path. The memory is configured to store an instruction. The processor is configured to execute the instruction stored in the memory, to control the transceiver to receive or send a signal. When the instruction stored in the memory is executed:

the transceiver is configured to receive indication information from a network device, where the indication information is used to indicate a time-domain location at which a PTRS is to be sent;

the processor is configured to obtain a pseudo-random sequence based on a cell identity of a cell in which the apparatus is located;

the processor is further configured to map the PTRS to one or more DFT-s-OFDM symbols based on the indication information received by the transceiver, and perform scrambling processing, by using the pseudo-random sequence, on the PTRS mapped to the one or more DFT-s-OFDM symbols; and the transceiver is configured to output the one or more DFT-s-OFDM symbols obtained by the processor.

The apparatus may be a terminal device, or may be a chip.

In this application, the pseudo-random sequence is determined based on the cell identity, and then scrambling processing is performed, by using the pseudo-random sequence, on the PTRS mapped to the DFT-s-OFDM symbol. Because different cell identities correspond to different pseudo-random sequences, after the foregoing processing process, PTRSs mapped to DFT-s-OFDM symbols of terminals in different cells can maintain interference randomization. For example, at a receive end device, PTRSs mapped to DFT-s-OFDM symbols that are sent by DFT-s-OFDM users from adjacent cells are embodied as a random sequence, to achieve an objective of interference randomization, thereby avoiding a problem of PTRS collision between users in different cells.

With reference to the seventeenth aspect, in a possible implementation of the seventeenth aspect, that the processor is configured to obtain a pseudo-random sequence based on a cell identity of a cell in which the apparatus is located specifically includes:

the processor is configured to obtain a cell-level pseudo-random sequence based on the cell identity; or obtain a terminal-level pseudo-random sequence based on the cell identity and a terminal identity of the terminal.

With reference to the seventeenth aspect, in a possible implementation of the seventeenth aspect, that the processor is configured to perform scrambling, by using the pseudo-random sequence, on the PTRS mapped to the one or more DFT-s-OFDM symbols specifically includes:

the processor is configured to multiply the pseudo-random sequence by the PTRS mapped to the one or more DFT-s-OFDM symbols.

With reference to the seventeenth aspect, in a possible implementation of the seventeenth aspect, the apparatus is a terminal or a chip.

According to an eighteenth aspect, an apparatus is provided, including: a processor, a memory, and a transceiver. The processor, the memory, and the transceiver communicate with each other through an internal connection path. The memory is configured to store an instruction. The processor is configured to execute the instruction stored in the memory, to control the transceiver to receive or send a signal. When the instruction stored in the memory is executed:

the transceiver is configured to send indication information to a terminal, where the indication information is used to indicate a time-domain location at which a PTRS is to be sent by the terminal; and the transceiver is configured to receive one or more DFT-s-OFDM symbols, sent by the terminal, to which the PTRS is mapped, where the one or more DFT-s-OFDM symbols to which the PTRS is mapped are DFT-s-OFDM symbols obtained after the following operations: mapping, by the terminal, the PTRS to the one or more DFT-s-OFDM symbols based on the indication information; and performing scrambling, by using a pseudo-random sequence that is obtained based on a cell identity of a cell in which the terminal is located, on the PTRS mapped to the one or more DFT-s-OFDM symbols.

The apparatus may be a network device, or may be a chip.

In this application, the pseudo-random sequence is determined based on the cell identity, and then scrambling processing is performed, by using the pseudo-random sequence, on the PTRS mapped to the DFT-s-OFDM symbol. Because different cell identities correspond to different pseudo-random sequences, after the foregoing processing process, PTRSs mapped to DFT-s-OFDM symbols of terminals in different cells can maintain interference randomization. For example, at a receive end device, PTRSs mapped to DFT-s-OFDM symbols that are sent by DFT-s-OFDM users from adjacent cells are embodied as a random sequence, to achieve an objective of interference randomization, thereby avoiding a problem of PTRS collision between users in different cells.

With reference to the eighteenth aspect, in a possible implementation of the eighteenth aspect, the pseudo-random sequence is a terminal-level pseudo-random sequence determined based on the cell identity; or the pseudo-random sequence is a cell-level pseudo-random sequence determined based on the cell identity and a terminal identity of the terminal.

With reference to the eighteenth aspect, in a possible implementation of the eighteenth aspect, the performing scrambling, by using the pseudo-random sequence, on the PTRS mapped to the one or more DFT-s-OFDM symbols includes:

multiplying the pseudo-random sequence by the PTRS mapped to the one or more DFT-s-OFDM symbols.

With reference to the eighteenth aspect, in a possible implementation of the eighteenth aspect, the apparatus is a network device.

With reference to the seventeenth aspect or the eighteenth aspect, in a possible implementation, the pseudo-random sequence may be any one of the following sequences: a gold sequence, an m-sequence, and a ZC sequence.

With reference to the seventeenth aspect or the eighteenth aspect, in a possible implementation, that the indication information is used to indicate a time-domain location at which a PTRS is to be sent by the terminal specifically includes: the indication information is used to indicate a quantity of PTRS chunks, and the quantity of PTRS chunks represents a quantity of PTRS chunks mapped to one DFT-s-OFDM symbol to which the PTRS is mapped.

Optionally, in this implementation, the indication information is scheduled bandwidth of the terminal.

With reference to the seventeenth aspect or the eighteenth aspect, in a possible implementation, that the indication information is used to indicate a time-domain location at which a PTRS is to be sent by the terminal specifically includes: the indication information is used to indicate a time-domain density of the PTRS.

Optionally, in this implementation, the indication information is a modulation and coding scheme MCS of the terminal.

According to a nineteenth aspect, a computer readable storage medium is provided, where a computer program is stored on the computer readable storage medium, and when the computer program is executed by a computer, the computer program implements: the method according to any one of the first aspect or the possible implementations of the first aspect; or the method according to any one of the second aspect or the possible implementations of the second aspect; or the method according to any one of the third aspect or the possible implementations of the third aspect; or the method according to any one of the fourth aspect or the possible implementations of the fourth aspect; or the method according to any one of the fifth aspect or the possible implementations of the fifth aspect; or the method according to any one of the sixth aspect or the possible implementations of the sixth aspect.

According to a twentieth aspect, a computer program product is provided, where the computer program product includes an instruction, and when the computer program product runs on a computer, the computer performs: the method according to any one of the first aspect or the possible implementations of the first aspect; or the method according to any one of the second aspect or the possible implementations of the second aspect; or the method according to any one of the third aspect or the possible implementations of the third aspect; or the method according to any one of the fourth aspect or the possible implementations of the fourth aspect; or the method according to any one of the fifth aspect or the possible implementations of the fifth aspect; or the method according to any one of the sixth aspect or the possible implementations of the sixth aspect.

DESCRIPTION OF EMBODIMENTS

The following describes the technical solutions of this application with reference to the accompanying drawings.

Figure 2:
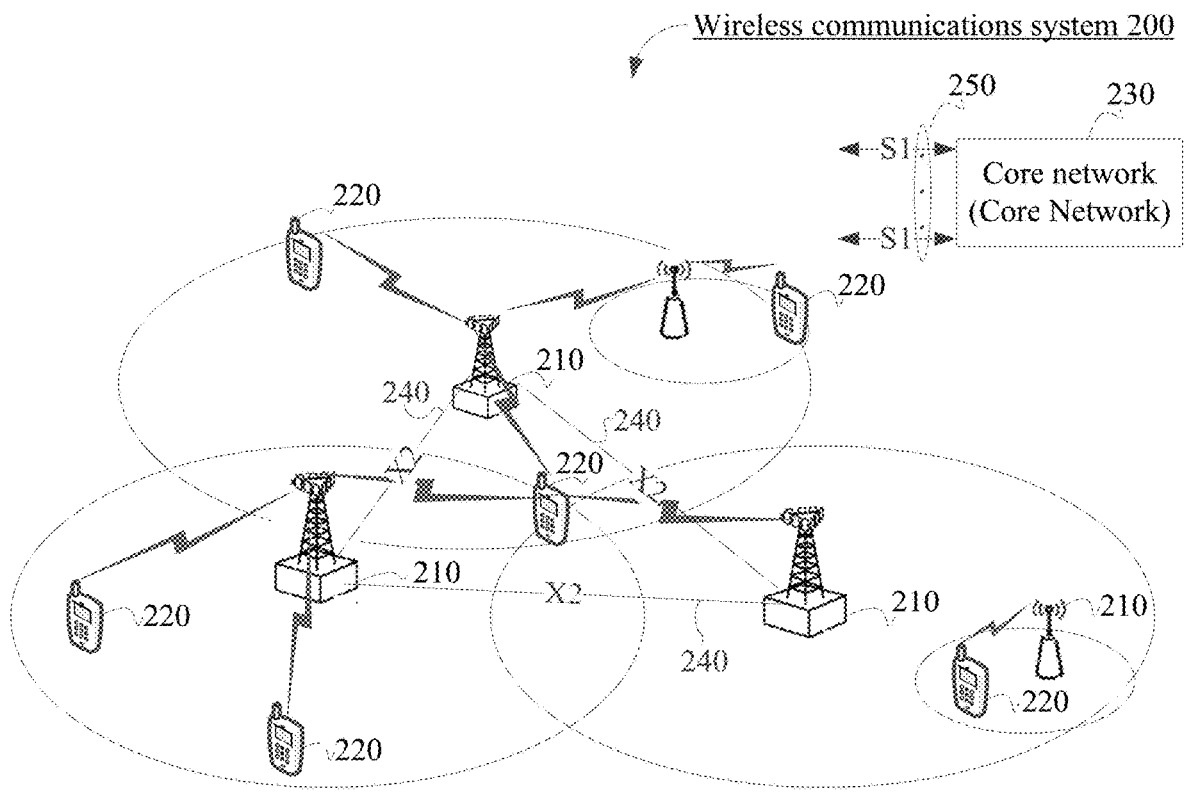
FIG. 2 is a schematic diagram of an application scenario according to an embodiment of the present application.

FIG. 2 shows a wireless communications system 200 in this application. The wireless communications system 200 may work in a high frequency band, and is not limited to a long term evolution (LTE) system. The wireless communications system 200 may alternatively be a future evolved 5th generation mobile communications (t 5G) system, a new radio (NR) system, a machine-to-machine (M2M) system, or the like. As shown in FIG. 2, the wireless communications system 200 may include: one or more network devices 210, one or more terminals 220, and a core network 230.

The network device 210 may be a base station. The base station may be configured to communicate with one or more terminals, or may be configured to perform communication with one or more base stations having some functions of a terminal (for example, communication between a macro base station and a micro base station such as an access point). The base station may be a base transceiver station (BTS) in a time division synchronous code division multiple access (TD-SCDMA) system, or may be an evolved NodeB (eNB) in an LTE system, or a base station in a 5G system or a new radio (NR) system. In addition, the base station may alternatively be an access point (AP), a transmission/reception point (TRP), a central unit (CU), or another network entity, and may include some or all functions of the foregoing network entities.

The terminal 220 may be distributed in the entire wireless communications system 200, and may be still or moving. In some embodiments of this application, the terminal 220 may be a mobile device, a mobile station, a mobile unit, an M2M terminal, a radio unit, a remote unit, a user agent, a mobile client, or the like.

For example, the network device 210 may be configured to: under control of a network device controller (not shown), communicate with the terminal 220 through one or more antennas. In some embodiments, the network device controller may be a part of the core network 230, or may be integrated in the network device 210. Specifically, the network device 210 may be configured to transmit control information or user data to the core network 230 through a backhaul interface 250 (for example, an S1 interface). Specifically, one network device 210 and another network device 210 may directly or indirectly communicate with each other through a backhaul interface 240 (for example, an X2 interface).

The wireless communications system shown in FIG. 2 is merely intended to describe the technical solutions in this application more clearly, but does not constitute any limitation on this application. A person of ordinary skill in the art may be aware that, with evolution of network architectures and emergence of new service scenarios, the technical solutions provided in the embodiments of the present application are also applicable to similar technical problems.

In the prior art, usually a PTRS is mapped to one or more DFT-s-OFDM symbols based on a predetermined time-domain location of the PTRS. When a plurality of terminals send DFT-s-OFDM symbols, a problem of overlapping of time domain configurations of PTRSs mapped to the DFT-s-OFDM symbols that are sent by the plurality of terminals may easily occur, causing PTRS collision between different terminals.

For the foregoing technical problem, the embodiments of the present application provide a PTRS processing method and an apparatus, to effectively avoid the PTRS collision between different terminals.

To sum up, in the embodiments of the present application, PTRS collision between different terminals is avoided by time-domain offsetting of an initial time-domain location to which a PTRS is mapped; or PTRS collision between different terminals is avoided by performing code division multiplexing processing on a PTRS mapped to a DFT-s-OFDM symbol; or interference randomization of a PTRS is implemented by performing cell-level scrambling processing on the PTRS mapped to a DFT-s-OFDM symbol, to avoid PTRS collision between different terminals; or PTRS collision between different terminals is avoided by performing both code division multiplexing processing and cell-level scrambling processing on a PTRS mapped to a DFT-s-OFDM symbol.

Therefore, the embodiments of the present application can effectively avoid PTRS collision between different terminals.

Figure 3:
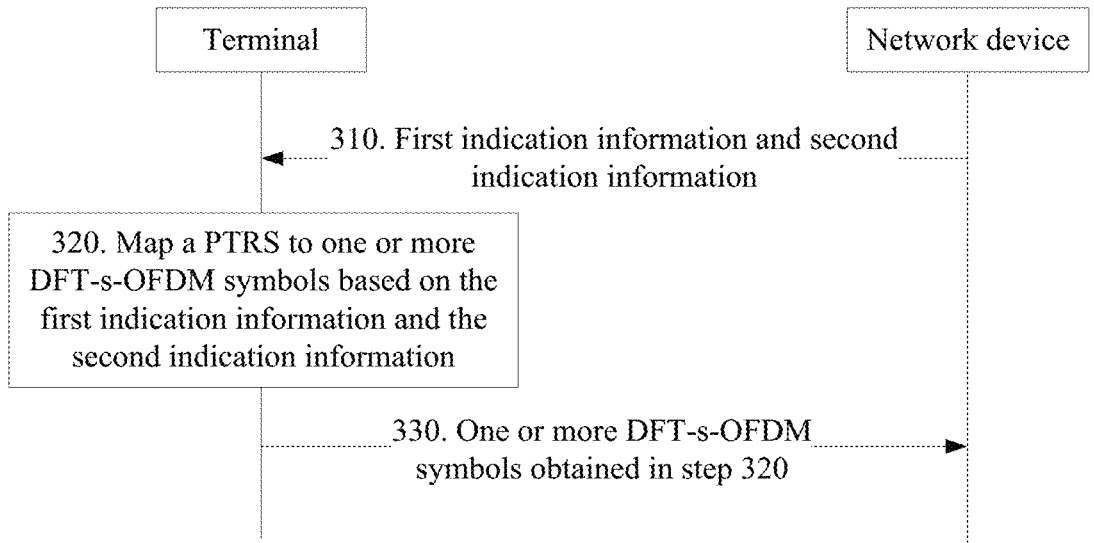
FIG. 3 is a schematic interactive diagram of a PTRS processing method according to an embodiment of the present application.

FIG. 3 is a schematic interactive diagram of a PTRS processing method 300 according to an embodiment of the present application. For example, a network device in FIG. 3 corresponds to the network device 210 shown in FIG. 2, and a terminal in FIG. 3 corresponds to the terminal 220 in FIG. 2. As shown in FIG. 3, the PTRS processing method 300 in this embodiment of the present application includes the following steps.

310. The network device sends first indication information and second indication information to the terminal, where the first indication information is used to indicate a time-domain location at which a PTRS is to be sent by the terminal, and the second indication information is used to indicate an offset of an initial time-domain location to which the PTRS is mapped by the terminal.

For example, the time-domain location of the PTRS indicates OFDM symbols to which the PTRS is mapped in a subframe. For example, the subframe includes seven DFT-s-OFDM symbols, and the PTRS may be mapped to symbols 1, 3, 5, and 7 in the subframe. The initial time-domain location to which the PTRS is mapped indicates the first OFDM symbol, to which the PTRS is mapped, in the subframe. For example, usually the first OFDM symbol is the initial time-domain location.

320. The terminal maps the PTRS to one or more DFT-s-OFDM symbols based on the first indication information and the second indication information.

For example, first, the PTRS is mapped to the one or more DFT-s-OFDM symbols based on the time-domain location of the PTRS indicated in the first indication information; and then, the PTRS mapped to the DFT-s-OFDM symbol is offset based on the offset indicated in the second indication information. Alternatively, first, the time-domain location of the PTRS indicated in the first indication information is offset based on the offset indicated in the second indication information; and then, the PTRS is mapped to one or more DFT-s-OFDM symbols based on an offset time-domain location of the PTRS.

It should be understood that, the first indication information and the second indication information may be sent by using one piece of downlink signaling, or may be sent by using different pieces of downlink signaling, and this is not limited in this application.

It should be noted that, the mapping the PTRS to one or more DFT-s-OFDM symbols means mapping the PTRS to a subframe that includes the one or more DFT-s-OFDM symbols. Optionally, the PTRS may be mapped to all DFT-s-OFDM symbols in the subframe, and in this case, a time-domain density of the PTRS is 1. The time-domain density means that one PTRS is mapped every specific quantity of OFDM symbols. When the PTRS is mapped to each OFDM symbol, the time-domain density of the PTRS is 1. When one PTRS is mapped to every two OFDM symbols, the time-domain density of the PTRS is ½. Optionally, the PTRS is mapped to some DFT-s-OFDM symbols in the subframe. To be specific, the PTRS is mapped to some DFT-s-OFDM symbols in the one or more DFT-s-OFDM symbols. In this case, the time-domain density of the PTRS is greater than 0 and less than 1. In this embodiment of the present application, there is no strict restriction on mapping the PTRS to each DFT-s-OFDM symbol in the one or more DFT-s-OFDM symbols.

330. The terminal sends the one or more DFT-s-OFDM symbols obtained after the processing in step 320.

For example, as shown in FIG. 3, the terminal sends the one or more DFT-s-OFDM symbols obtained after the processing in step 320 to the network device. Correspondingly, the network device receives the one or more DFT-s-OFDM symbols from the terminal.

In this embodiment of the present application, the PTRS is mapped to the DFT-s-OFDM symbol based on the time-domain location of the PTRS and the offset of the initial time-domain location to which the PTRS is mapped, so as to avoid a problem of time domain overlapping of PTRSs mapped to DFT-s-OFDM symbols of different terminals to an extent, thereby overcoming a problem of PTRS collision between different users.

For example, the second indication information is attribute information of the terminal, which distinguishes the terminal from another terminal, for example, a demodulation reference signal DMRS port number of the terminal, a PTRS port number of the terminal, or a cell identity (ID) of the terminal.

In other words, the offset of the initial time-domain location to which the PTRS is mapped is determined based on the attribute information of the terminal. It should be understood that, for example, if attribute information of a terminal 1 is different from attribute information of a terminal 2, an offset of an initial time-domain location of a PTRS determined based on the attribute information of the terminal 1 is also different from an offset of an initial time-domain location of a PTRS determined based on the attribute information of the terminal 2. In this case, on two DFT-s-OFDM waveforms, obtained based on the offset of the terminal 1 and the offset of the terminal 2, to which PTRSs are mapped, there is a high probability that time-domain locations to which the PTRSs are mapped do not overlap with each other, thereby avoiding a problem of PTRS collision between the terminal 1 and the terminal 2.

Optionally, in an intra-cell scenario, the second indication information may be a demodulation reference signal DMRS port number of the terminal or a PTRS port number of the terminal.

It should be understood that, for terminals in a same cell, their DMRS port numbers are different from each other and their PTRS port numbers are also different from each other; therefore, offsets of initial time-domain locations of PTRSs obtained based on DMRS port numbers of different terminals are also different, or offsets of initial time-domain locations of PTRSs obtained based on PTRS port numbers of different terminals are also different.

Optionally, in an inter-cell scenario, the second indication information may be a cell identity ID of the terminal.

It should be understood that, for terminals in different cells, cell identities of cells in which the terminals are located are different from each other; therefore, offsets of initial time-domain locations of PTRSs obtained based on cell identities of different terminals are different.

Optionally, in an embodiment, the second indication information is used to indicate an offset that is of the initial time-domain location to which the PTRS is mapped and that is relative to the first DFT-s-OFDM symbol.

For example, the first DFT-s-OFDM symbol is the first DFT-s-OFDM symbol in a subframe to which the PTRS is mapped. The subframe includes one or more DFT-s-OFDM symbols.

The offset in this embodiment may be measured in subframes, slots, mini-slots (mini-slot), symbols, or an absolute time such as x milliseconds. In this application, that the offset is measured in symbols is used as an example, that is, the offset indicates a quantity of DFT-s-OFDM symbols by which the initial time-domain location is offset.

It is assumed that the time-domain location of the PTRS indicated in the first indication information shows that the PTRS is mapped every K DFT-s-OFDM symbols, where K is a positive integer. In this case, the offset that is of the initial time-domain location to which the PTRS is mapped and that is relative to the first DFT-s-OFDM symbol may be 0, 1, . . . , K−1. For example, the offset may be determined based on the DMRS port number of the terminal or the PTRS port number of the terminal (corresponding to the intra-cell scenario), or the offset may be determined based on the cell identity of the terminal (corresponding to the inter-cell scenario).

For example, it is assumed that the time-domain location of the PTRS indicated in the first indication information shows that the time-domain density of the PTRS is ¼, and DMRS ports (which may alternatively be PTRS ports; herein, DMRS ports are used as an example for description) of the terminal have a one-to-one correspondence with offsets. For example, it is assumed that uplink DMRS port numbers of a current cell include 41, 42, 43, and 44. Table 1 shows a correspondence between these DMRS port numbers and the offsets.

TABLE 1

| DMRS port number | Offset |
|---|---|
| 41 | 0 |
| 42 | 1 |
| 43 | 2 |
| 44 | 3 |

For example, when the DMRS port number of the terminal is 41, the offset is determined as 0; or when the DMRS port number of the terminal is 43, the offset is determined as 2.

For example, it is assumed that the time-domain location of the PTRS indicated in the first indication information shows that the time-domain density of the PTRS is ¼, and cell IDs of the terminal have a one-to-one correspondence with offsets. Table 2 shows a correspondence between different cell IDs and the offsets.

TABLE 2

| Cell ID | Offset |
|---|---|
| ID_1 | 0 |
| ID_2 | 1 |
| ID_3 | 2 |
| ID_4 | 3 |

Assuming that a cell ID of a cell in which a terminal 1 is located is ID_1, an offset corresponding to the cell ID of the terminal 1 is 0; or assuming that a cell ID of a cell in which a terminal 2 is located is ID_3, an offset corresponding to the cell ID of the terminal 2 is 2.

For example, in the foregoing embodiment described with reference to Table 1 or Table 2, a correspondence between an offset and a DMRS port number (or a PTRS port number or a cell ID) may be notified in advance to the terminal by using downlink signaling. In other words, information about a correspondence between an offset and a DMRS port number is sent to the terminal; or information about a correspondence between the offset and a PTRS port number is sent to the terminal; or information about a correspondence between the offset and a cell ID is sent to the terminal. For example, the downlink signaling may be any one of the following information: system information (SI), radio resource control (RRC) signaling, a MAC control element (MAC-CE), or downlink control information (DCI).

Optionally, in the foregoing embodiment described with reference to Table 1 or Table 2, a correspondence between an offset and a DMRS port number (or a PTRS port number or a cell ID) may alternatively be configured in the terminal by using a protocol. In other words, the terminal prestores information about a correspondence between an offset and a DMRS port number, or prestores information about a correspondence between an offset and a PTRS port number, or prestores information about a correspondence between an offset and a cell ID.

Figure 4:
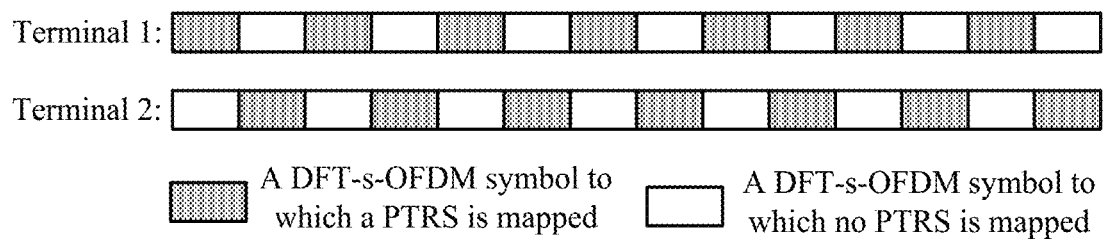
FIG. 4 is a schematic diagram of offsetting, at a symbol level, a PTRS mapped to a DFT-s-OFDM symbol according to an embodiment of the present application.

For example, as shown in FIG. 4, PTRSs are mapped every one DFT-s-OFDM symbol. In a subframe of a terminal 1, an offset that is of an initial time-domain location to which a PTRS is mapped and that is relative to the first DFT-s-OFDM symbol is 0. In a subframe of a terminal 2, an offset that is of an initial time-domain location to which a PTRS is mapped and that is relative to the first DFT-s-OFDM symbol is 1 (in units of DFT-s-OFDM symbols).

It should be understood that, for the terminal 1 and the terminal 2 shown in FIG. 4, although PTRS mapping is performed based on a same PTRS time-domain location (namely, same first indication information) for the subframes of the two terminals, the offset that is of the initial time-domain location to which the PTRS is mapped and that is relative to the first DFT-s-OFDM symbol for the terminal 1 is different from that for the terminal 2. Therefore, there is a high probability that a time-domain location of the PTRS mapped in the subframe of the terminal 1 does not overlap a time-domain location of the PTRS mapped in the subframe of the terminal 2. This can avoid PTRS collision between the terminal 1 and the terminal 2 to an extent, thereby improving phase tracking precision.

The embodiment shown in FIG. 4 may also be referred to as offsetting, at a symbol level, a PTRS mapped to a DFT-s-OFDM symbol.

It should be understood that, FIG. 4 is merely an example but not a limitation. In actual application, a specific numeral value of the offset that is of the initial time-domain location to which the PTRS is mapped and that is relative to the first DFT-s-OFDM symbol may be determined according to a specific requirement, and this is not limited in this embodiment of the present application.

Optionally, in another embodiment, the second indication information is used to indicate an offset that is of the initial time-domain location to which the PTRS is mapped and that is relative to the first modulated symbol of the first DFT-s-OFDM symbol to which the PTRS is mapped.

For example, the first DFT-s-OFDM symbol to which the PTRS is mapped is the first DFT-s-OFDM symbol, to which the PTRS is mapped, in a subframe that includes the one or more DFT-s-OFDM symbols.

In this embodiment, the offset is measured in modulated symbols, that is, the offset represents a quantity of modulated symbols by which the initial time-domain location is offset.

In an optional implementation, the offset that is of the initial time-domain location to which the PTRS is mapped and that is relative to the first modulated symbol may be determined based on the DMRS port number or the PTRS port number of the terminal (corresponding to the intra-cell scenario), or may be determined based on the cell identity of the terminal (corresponding to the inter-cell scenario).

Figure 5:
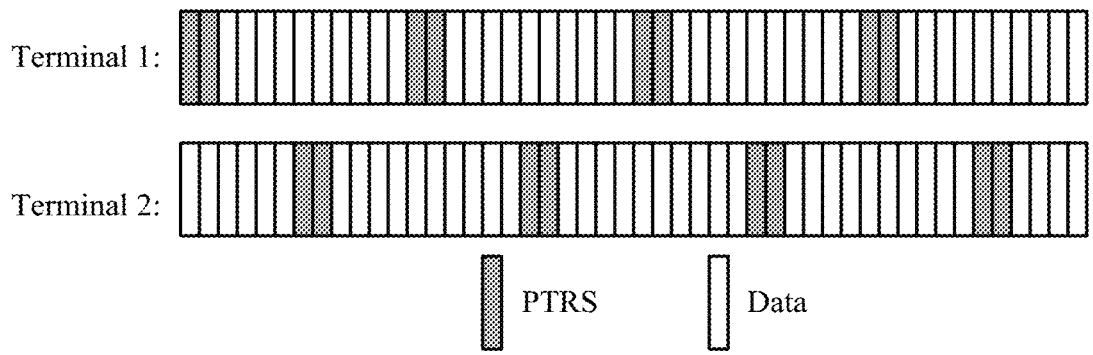
FIG. 5 is a schematic diagram of offsetting, at a modulated symbol level, a PTRS mapped to a DFT-s-OFDM symbol according to an embodiment of the present application.

For example, it is assumed that the time-domain location of the PTRS indicated in the first indication information shows that N PTRS chunks (for example, N is equal to 4 in FIG. 5) are mapped to one DFT-s-OFDM symbol, and a size of each chunk is M (for example, M is equal to 2 in FIG. 5). In this case, DMRS ports (which may alternatively be PTRS ports; herein, DMRS ports are used as an example for description) of the terminal have a one-to-one correspondence with offsets. For example, it is assumed that uplink DMRS port numbers of a current cell include 41, 42, 43, and 44. Table 3 shows a correspondence between these DMRS port numbers and the offsets.

TABLE 3

| DMRS port number | Offset (at a modulated symbol level) |
|---|---|
| 41 | 0 |
| 42 | 1 |
| 43 | 2 |
| 44 | 3 |

For example, when the DMRS port number of the terminal is 41, the offset is determined as 0; or when the DMRS port number of the terminal is 43, the offset is determined as 2.

In the foregoing embodiment, the offset at the modulated symbol level is represented directly by using a quantity of offset modulated symbols. Optionally, the offset at the modulated symbol level may alternatively be represented by using a proportion of a quantity of offset modulated symbols to a total quantity of modulated symbols that are included in one DFT-s-OFDM symbol. In the following description, such an offset is referred to as a proportional offset. Still using an example in which uplink DMRS port numbers include 41, 42, 43, and 44, Table 4 shows a correspondence between these DMRS port numbers and proportional offsets.

TABLE 4

| DMRS port number | Proportional offset |
|---|---|
| 41 | 0 |
| 42 | 1/24 |
| 43 | 2/24 |
| 44 | 3/24 |

For example, when scheduled bandwidth is four RBs, namely, 48 subcarriers (that is, one DFT-s-OFDM symbol includes 48 modulated symbols), quantities of offset modulated symbols calculated based on column 2 in Table 4 are respectively 0, 2, 4, and 6.

For example, it is assumed that the time-domain location of the PTRS indicated in the first indication information shows that N PTRS chunks (for example, N is equal to 4 in FIG. 5) are mapped to one DFT-s-OFDM symbol, and a size of each chunk is M (for example, M is equal to 2 in FIG. 5). In this case, cell IDs of the terminal have a one-to-one correspondence with offsets. Table 5 shows a correspondence between different cell IDs and the offsets.

TABLE 5

| Cell ID | Offset (at a modulated symbol level) |
|---|---|
| ID_1 | 0 |
| ID_2 | 1 |
| ID_3 | 2 |
| ID_4 | 3 |

For example, when the cell ID of the terminal is ID_1, an offset corresponding to the cell ID of the terminal is 0; or when the cell ID of the terminal is ID_3, an offset corresponding to the cell ID of the terminal is 2.

For example, in the foregoing embodiment described with reference to Table 3, Table 4, or Table 5, a correspondence between an offset and a DMRS port number (or a PTRS port number or a cell ID) may be notified in advance to the terminal by using downlink signaling. In other words, information about a correspondence between an offset and a DMRS port number is sent to the terminal; or information about a correspondence between an offset and a PTRS port number is sent to the terminal; or information about a correspondence between an offset and a cell ID is sent to the terminal. For example, the downlink signaling may be any one of the following information: system information (SI), radio resource control (RRC) signaling, a MAC control element (MAC-CE), or downlink control information (DCI).

Optionally, in the foregoing embodiment described with reference to Table 3, Table 4, or Table 5, a correspondence between an offset and a DMRS port number (or a PTRS port number or a cell ID) may alternatively be configured in the terminal by using a protocol. In other words, the terminal prestores information about a correspondence between an offset and a DMRS port number, or prestores information about a correspondence between an offset and a PTRS port number, or prestores information about a correspondence between an offset and a cell ID.

In another optional implementation, when it is determined that there is a particular PTRS mapping manner for the DFT-s-OFDM symbol, for example, when the DFT-s-OFDM symbol includes N chunks (for example, N is equal to 4 in FIG. 5) and a size of each chunk is M (for example, M is equal to 2 in FIG. 5), a plurality of mapping location sets (S1, S2, . . . ) are defined for the N*M PTRSs and different mapping location sets correspond to different PTRS mapping locations. For mapping of the PTRS to the DFT-s-OFDM symbol, a corresponding mapping location set may be determined based on the DMRS port number of the terminal and/or the PTRS port number of the terminal (corresponding to the intra-cell scenario), or a corresponding mapping location set may be determined based on the cell identity of the terminal (corresponding to the inter-cell scenario).

For example, DMRS ports (which may alternatively be PTRS ports; herein, DMRS ports are used as an example for description) of the terminal have a one-to-one correspondence with mapping location sets. It is assumed that mapping location sets include S1, S2, S3, and S4, and uplink DMRS port numbers include 41, 42, 43, and 44. Table 6 shows a correspondence between these DMRS port numbers and the mapping location sets.

TABLE 6

| DMRS port number | Mapping location set |
| --- | --- |
| 41 | S1 |
| 42 | S2 |
| 43 | S3 |
| 44 | S4 |

For example, when a DMRS port number of a terminal 1 is 41, PTRS mapping is performed based on the mapping location set S1; or when a port number of a terminal 2 is 43, PTRS mapping is performed based on the mapping location set S3. Because a time-domain location of a PTRS mapped to a DFT-s-OFDM symbol of the terminal 1 does not overlap a time-domain location of a PTRS mapped to a DFT-s-OFDM symbol of the terminal 2, PTRS collision does not occur between the terminal 1 and the terminal 2.

For example, cell IDs of the terminal have a one-to-one correspondence with mapping location sets. It is assumed that mapping location sets include S1, S2, S3, and S4. Table 7 shows a mapping relationship between different cell IDs and the mapping location sets.

TABLE 7

| Cell ID | Mapping location set |
| --- | --- |
| ID_1 | S1 |
| ID_2 | S2 |
| ID_3 | S3 |
| ID_4 | S4 |

For example, when a cell ID of a terminal 1 is ID_1, PTRS mapping is performed based on the mapping location set S1; or when a cell ID of a terminal 2 is ID_3, PTRS mapping is performed based on the mapping location set S3. Because a time-domain location of a PTRS in the mapping location set S1 does not overlap a time-domain location of a PTRS in the mapping location set S3, PTRS collision does not occur between the terminal 1 and the terminal 2.

Optionally, in the foregoing embodiment described with reference to Table 6 or Table 7, a mapping location set and a correspondence between a mapping location set and a DMRS port number (or a PTRS port number or a cell ID) may be notified in advance to the terminal by using downlink signaling. In other words, information about a correspondence between a DMRS port number and a PTRS mapping location set is sent to the terminal; or information about a correspondence between a PTRS port number and a PTRS mapping location set is sent to the terminal; or information about a correspondence between a cell ID and a PTRS mapping location set is sent to the terminal. For example, the downlink signaling may be any one of the following information: system information (SI), radio resource control (RRC) signaling, a MAC control element (MAC-CE), or downlink control information (DCI).

Optionally, in the foregoing embodiment described with reference to Table 6 or Table 7, a mapping location set and a correspondence between a mapping location set and a DMRS port number (or a PTRS port number or a cell ID) may alternatively be configured in the terminal by using a protocol. In other words, the terminal prestores information about a correspondence between a DMRS port number and a PTRS mapping location set, or prestores information about a correspondence between a PTRS port number and a PTRS mapping location set, or prestores information about a correspondence between a cell ID and a PTRS mapping location set.

For example, in an example shown in FIG. 5, a DFT-s-OFDM symbol of a terminal 1 and a DFT-s-OFDM symbol of a terminal 2 each include 48 modulated symbols, four PTRS chunks are mapped to both the DFT-s-OFDM symbol of the terminal 1 and the DFT-s-OFDM symbol of the terminal 2, and each chunk includes two PTRSs. An initial time-domain location to which a PTRS is mapped on the DFT-s-OFDM symbol of the terminal 1 is the first modulated symbol (denoted as a modulated symbol 0). In other words, in the DFT-s-OFDM symbol of the terminal 1, an offset that is of an initial time-domain location to which a PTRS is mapped and that is relative to the first modulated symbol is 0. An initial time-domain location to which a PTRS is mapped on the DFT-s-OFDM symbol of the terminal 2 is the $7^{th}$ modulated symbol (denoted as a modulated symbol 6). In other words, in the DFT-s-OFDM symbol of the terminal 2, an offset that is of an initial time-domain location to which a PTRS is mapped and that is relative to a first modulated symbol is six modulated symbols.

It should be understood that, for the terminal 1 and the terminal 2 shown in FIG. 5, although a quantity of chunks mapped to the DFT-s-OFDM symbol of the terminal 1 is the same as a quantity of chunks mapped to the DFT-s-OFDM symbol of the terminal 2, the offset that is of the initial time-domain location to which the PTRS is mapped and that is relative to the first modulated symbol for the terminal 1 is different from that for the terminal 2. Therefore, there is a high probability that a time-domain location of the PTRS mapped to the DFT-s-OFDM symbol of the terminal 1 does not overlap a time-domain location of the PTRS mapped to the DFT-s-OFDM symbol of the terminal 2. This can avoid PTRS collision between the terminal 1 and the terminal 2 to an extent, thereby improving phase tracking precision.

The embodiment shown in FIG. 5 may also be referred to as offsetting a PTRS at a modulated symbol level.

It should be understood that, FIG. 5 is merely an example but not a limitation. In actual application, a specific numeral value of the offset that is of the initial time-domain location to which the PTRS is mapped and that is relative to the first modulated symbol may be determined according to a specific requirement, and this is not limited in this embodiment of the present application.

Optionally, in some embodiments of the PTRS processing method 300, the second indication information is at least one of the following information: a demodulation reference signal DMRS port number of the terminal, a PTRS port number of the terminal, or a cell identity ID of the terminal.

Optionally, in some embodiments of the PTRS processing method 300, the first indication information is used to indicate a time-domain density of the PTRS.

For example, in this application, the time-domain density of the PTRS may be related to at least one of a cyclic prefix (CP) type, a subcarrier spacing, or a modulation and coding scheme (MCS).

For example, there is a correspondence between the time-domain density of the PTRS and at least one of the CP type, the subcarrier spacing, or the modulation and coding scheme. Different CP types or subcarrier spacings or modulation and coding schemes may correspond to different time-domain densities. For example, the correspondence may be predefined in a protocol, or may be configured by the network device by using higher layer signaling (for example, RRC signaling).

The time-domain density of the PTRS means that the PTRS is mapped every specific quantity of symbols. For example, the PTRS may be consecutively mapped to each symbol of a PUSCH (or a PDSCH), or may be mapped every two symbols of a PUSCH (or a PDSCH), or may be mapped every four symbols of a PUSCH (or a PDSCH).

In this application, the time-domain density of the PTRS may be determined based on the subcarrier spacing and the modulation and coding scheme. For example, for one determined subcarrier spacing value, one or more modulation and coding scheme thresholds may be predefined, or configured by using higher layer signaling, so that all modulation and coding schemes between two adjacent modulation and coding scheme thresholds correspond to a same time-domain density of the PTRS, as shown in Table 8.

TABLE 8

| MCS range | Time-domain density |
| --- | --- |
| 0 ≤ MCS < MCS_1 | 0 |
| MCS_1 ≤ MCS < MCS_2 | 1/4 |
| MCS_2 ≤ MCS < MCS_3 | 1/2 |
| MCS_3 ≤ MCS | 1 |

In the table, MCS_1, MCS_2, and MCS_3 are modulation and coding scheme thresholds, and "½" in the time-domain densities is the time-domain density shown in FIG. 4.

For example, when the subcarrier spacing is determinate, the time-domain density of the PTRS may be determined based on a modulation and coding scheme threshold range within which an actual modulation and coding scheme MCS falls. For example, it is assumed that Table 9 represents modulation and coding scheme thresholds when a default subcarrier spacing SCS_1 is equal to 15 kHz. If the actual modulation and coding scheme MCS falls within a range [MCS_2, MCS_3], the time-domain density of the PTRS is ½. The example is merely used to explain this embodiment of the present application, and shall not constitute a limitation.

In a possible implementation, for pi/2-BPSK modulation, a PTRS is not needed for tracking phase noise or a frequency offset. To implement this configuration, MCS_1 is made always greater than or equal to a maximum MCS (marked as MCS_M1) of pi/2-BPSK modulation, that is, MCS_1≥MCS_M1. It may be directly stipulated in a protocol not to perform PTRS mapping for pi/2-BPSK. Therefore, there is an alternative solution of the implementation shown in Table 8, as shown in Table 9 (on the left of row 1 is the maximum MCS of pi/2-BPSK plus 1).

TABLE 9

| MCS range | Time-domain density |
| --- | --- |
| (MCS_M1 + 1) ≤ MCS < MCS_1 | 0 |
| MCS_1 ≤ MCS < MCS_2 | 1/4 |
| MCS_2 ≤ MCS < MCS_3 | 1/2 |
| MCS_3 ≤ MCS | 1 |

In this application, different subcarrier spacings may correspond to different modulation and coding scheme thresholds. In other words, for different subcarrier spacings, a table of a correspondence between different modulation and coding scheme thresholds and different time-domain densities may be configured.

For example, modulation and coding scheme thresholds corresponding to different subcarrier spacings may be predefined in a protocol, or may be configured by the network device by using higher layer signaling (for example, RRC signaling).

In some optional embodiments, a default subcarrier spacing (represented as SCS_1), such as 15 kHz, and one or more default thresholds (represented as MCS') corresponding to the default subcarrier spacing may be predefined in a protocol or configured by using higher layer signaling. In addition, for another non-default subcarrier spacing, a corresponding modulation and coding scheme offset (represented as MCS_offset, which is an integer) may be predefined in a protocol or configured by using higher layer signaling: MCS_offset+MCS=MCS', where the MCS represents an actual modulation and coding scheme for the another non-default subcarrier spacing. For the another non-default subcarrier spacing, the time-domain density of the PTRS may be determined by adding the modulation and coding scheme offset MCS_offset to the actual modulation and coding scheme MCS.

For example, it is assumed that Table 10 represents modulation and coding scheme thresholds when a default subcarrier spacing SCS_1 is 15 kHz. When a non-default subcarrier spacing is 60 kHz, if the actual modulation and coding scheme MCS plus the MCS_offset falls within a range [0, MCS_1], the time-domain density of the PTRS is 0. If the actual modulation and coding scheme MCS plus the MCS_offset falls within a range [MCS_1, MCS_2], the time-domain density of the PTRS is ¼. The example is merely used to explain this embodiment of the present application, and shall not constitute a limitation.

TABLE 10

| MCS range | Time-domain density |
| --- | --- |
| 0 ≤ MCS' < MCS_1 | 0 |
| MCS_1 ≤ MCS' < MCS_2 | 1/4 |
| MCS_2 ≤ MCS' < MCS_3 | 1/2 |
| MCS_3 ≤ MCS' | 1 |

In some optional embodiments, a default subcarrier spacing (represented as SCS_1) and one or more default modulation and coding scheme thresholds (represented as MCS') corresponding to the default subcarrier spacing may be predefined in a protocol or configured by using higher layer signaling. In addition, for another non-default subcarrier spacing (represented as SCS_n), a corresponding scaling factor $\beta$ ($0<\beta<1$) may be predefined in a protocol or configured by using higher layer signaling, and $\beta=SCS\_1/SCS\_n$ may be defined. For the another non-default subcarrier spacing, a default modulation and coding scheme threshold range within which an actual modulation and coding scheme MCS falls may be determined by using the MCS and the default modulation and coding scheme threshold MCS'; and then an actual time-domain density of the PTRS is determined by multiplying the scaling factor β by a time-domain density corresponding to the default modulation and coding scheme threshold range.

For example, it is assumed that Table 10 represents modulation and coding scheme thresholds when a default subcarrier spacing SCS_1 is 60 kHz. When a non-default subcarrier spacing is 120 kHz, if the actual modulation and coding scheme MCS falls within [MCS_2, MCS_3], the actual time-domain density of the PTRS is a time-domain density closest to a product of the scaling factor β and a time-domain density "½". Because β=60/120=½, the actual time-domain density of the PTRS is ¼. The example is merely used to explain this embodiment of the present application, and shall not constitute a limitation.

In this application, for different CP types or lengths, a correspondence between a time-domain density of the PTRS and at least one of a subcarrier spacing and a modulation and coding scheme may be predefined in a protocol or configured by using higher layer signaling (for example, RRC signaling).

Optionally, for an extended cyclic prefix (ECP), the time-domain density of the PTRS may be predefined as follows in a protocol or configured as follows by using higher layer signaling: consecutively mapping the PTRS to each symbol of a PUSCH (or a PDSCH). In this way, the PTRS can be used to assist in Doppler frequency offset estimation in a high-rate large-delay expansion scenario.

For example, the first indication information includes a modulation and coding scheme (MCS) of the terminal.

It should be understood that, for a low-MCS service, a phase noise tracking performance requirement is relatively low and the time-domain density of the PTRS can be reduced. In other words, mapping the PTRS to each DFT-s-OFDM symbol is not necessary, and the PTRS may be mapped every specific quantity of DFT-s-OFDM symbols. For example, the PTRS is mapped every two DFT-s-OFDM symbols or every four DFT-s-OFDM symbols.

In this embodiment, the time-domain density of the PTRS is determined based on the MCS, to effectively reduce overheads.

Optionally, in some embodiments of the PTRS processing method 300, the first indication information is further used to indicate a quantity of PTRS chunks, and the quantity of PTRS chunks represents a quantity of PTRS chunks (Chunk) mapped to one DFT-s-OFDM symbol to which the PTRS is mapped.

For example, the first indication information includes scheduled bandwidth of the terminal. In other words, the quantity of chunks is determined by the scheduled bandwidth, and the quantity of chunks increases as the scheduled bandwidth increases, and decreases as the scheduled bandwidth decreases.

Figure 1:
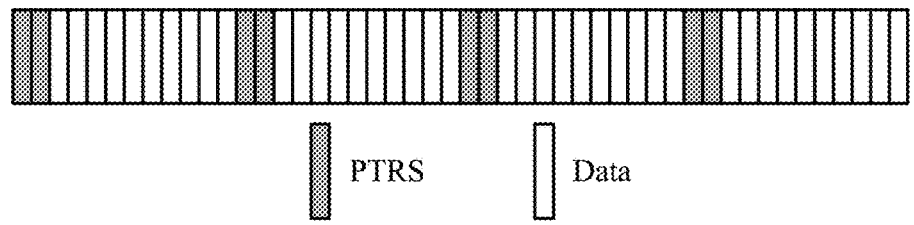
FIG. 1 is a schematic diagram of a PTRS mapped to a DFT-s-OFDM symbol in the prior art.

Using a DFT-s-OFDM symbol (including 48 modulated symbols) shown in FIG. 1 as an example, Table 11 shows a correspondence between the quantity of chunks and the scheduled bandwidth, where NRB represents a quantity of RBs allocated to an LTE system.

TABLE 11

| Scheduled bandwidth | Quantity of chunks |
|---|---|
| 0 ≤ NRB < NRB1 | 1 |
| NRB1 ≤ NRB < NRB2 | 2 |
| NRB2 ≤ NRB < NRB3 | 4 |
| NRB3 ≤ NRB < NRB4 | 8 |
| NRB4 ≤ NRB < NRB5 | 16 |
| NRB5 ≤ NRB | 32 |

It should be understood that a larger quantity of PTRS samples is more conducive to phase noise and frequency shift tracking performance. However, when bandwidth allocated to a particular terminal is insufficient, excessive PTRS samples bring excessively high overheads, causing a decrease in a user throughput. Therefore, the quantity of PTRS samples may be increased as the scheduled bandwidth increases, and may be decreased as the scheduled bandwidth decreases, so as to implement relatively high phase noise tracking performance in a large-bandwidth scenario and avoid excessively high overheads in a small-bandwidth scenario.

For example, in the foregoing embodiment described with reference to Table 11, a correspondence between a quantity of chunks and scheduled bandwidth may be notified in advance to the terminal by using downlink signaling. For example, the downlink signaling may be any one of the following information: system information (SI), radio resource control (RRC) signaling, a MAC control element (MAC-CE), or downlink control information (DCI).

Optionally, in the foregoing embodiment described with reference to Table 11, a correspondence between a quantity of chunks and scheduled bandwidth may alternatively be configured in the terminal by using a protocol. In other words, the terminal prestores information about a correspondence between a quantity of chunks and scheduled bandwidth.

In conclusion, in the PTRS processing method 300 provided in this embodiment of the present application, time domain offset processing is performed on the PTRS in a process of mapping the PTRS to the DFT-s-OFDM symbol. This can avoid overlapping of time-domain locations of PTRSs mapped to DFT-s-OFDM symbols of different terminals to an extent, thereby avoiding PTRS collision between different terminals and further effectively improving phase noise tracking precision.

Figure 6:
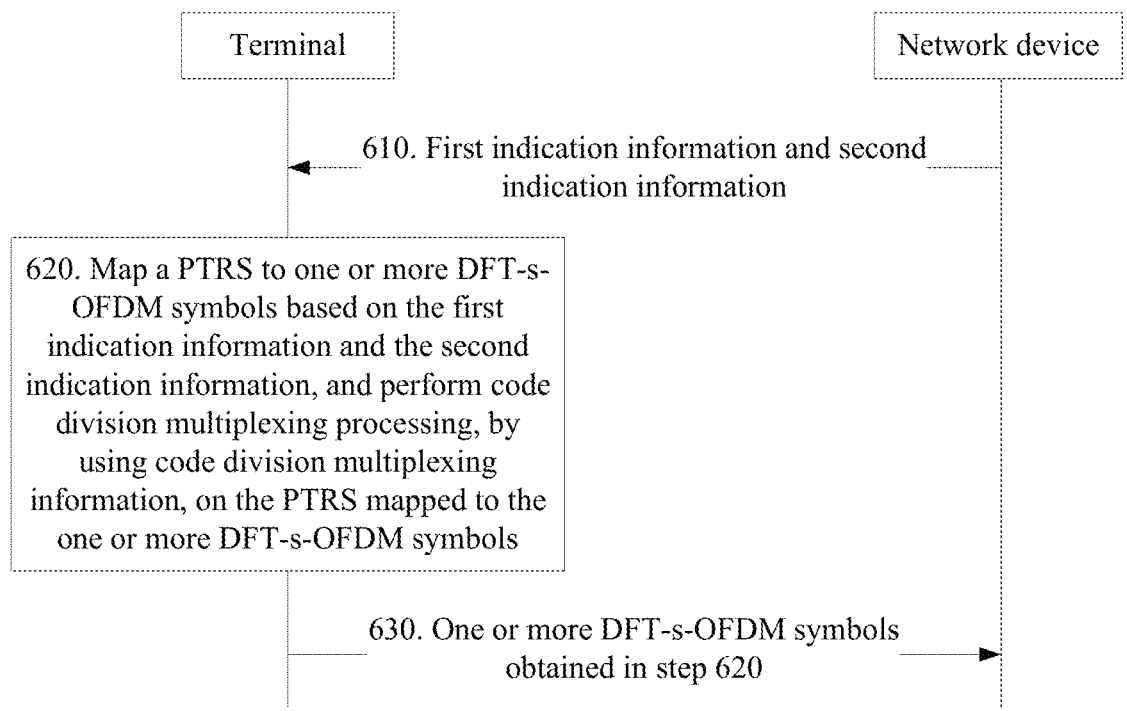
FIG. 6 is another schematic interactive diagram of a PTRS processing method according to an embodiment of the present application.

As shown in FIG. 6, an embodiment of the present application further provides a PTRS processing method 600. A network device in FIG. 6 may correspond to the network device 210 in FIG. 2, and a terminal in FIG. 6 may correspond to the terminal 220 in FIG. 2. The PTRS processing method 600 includes the following steps.

610. The network device sends first indication information and second indication information to the terminal, where the first indication information is used to indicate a time-domain location at which a PTRS is to be sent by the terminal, the second indication information is used to indicate code division multiplexing information, and the code division multiplexing information is used to perform code division multiplexing processing on a PTRS mapped to a discrete Fourier transform-spread-orthogonal frequency division multiplexing DFT-s-OFDM symbol.

For example, the time-domain location of the PTRS is a time-domain location when the PTRS is mapped to a subframe, where the subframe includes, for example, 7 or 14 DFT-s-OFDM symbols.

For example, the code division multiplexing information may be an orthogonal cover code or a phase rotation factor, as described in detail below.

620. The terminal maps the PTRS to one or more DFT-s-OFDM symbols based on the first indication information and the second indication information, and performs code division multiplexing processing, by using the code division multiplexing information, on the PTRS mapped to the one or more DFT-s-OFDM symbols.

For example, first, the PTRS is mapped to the one or more DFT-s-OFDM symbols based on the time-domain location of the PTRS indicated in the first indication information; and then code division multiplexing processing is performed on the PTRS mapped to the DFT-s-OFDM symbol.

630. The terminal sends the one or more DFT-s-OFDM symbols obtained after the processing in step 620.

For example, as shown in FIG. 6, the terminal sends the one or more DFT-s-OFDM symbols obtained after the processing in step 620 to the network device. Correspondingly, the network device receives the one or more DFT-s-OFDM symbols from the terminal.

In the prior art, usually a PTRS is mapped to one or more DFT-s-OFDM symbols based on a predetermined time-domain location of the PTRS. When a plurality of terminals send DFT-s-OFDM symbols, a problem of overlapping of time domain configurations of PTRSs mapped to the DFT-s-OFDM symbols that are sent by the plurality of terminals may easily occur, causing PTRS collision between different terminals.

However, in this embodiment of the present application, after the PTRS is mapped to the DFT-s-OFDM symbol based on the time-domain location of the PTRS indicated by the network device, code division multiplexing processing is performed on the PTRS mapped to the DFT-s-OFDM symbol. This can implement orthogonality of PTRSs of different terminals, thereby overcoming a problem of PTRS collision between different users, especially resolving PTRS collision between different users in a same cell.

Optionally, in an implementation, the code division multiplexing information is an orthogonal cover code (OCC); and the performing code division multiplexing processing, by using the code division multiplexing information, on the PTRS mapped to the one or more DFT-s-OFDM symbols in step 620 includes: performing orthogonal cover code processing, by using the OCC, on PTRSs in each PTRS chunk mapped to each DFT-s-OFDM symbol to which the PTRS is mapped.

For example, it is assumed that, after the PTRS is mapped to one or more DFT-s-OFDM symbols based on the time-domain location of the PTRS indicated in the first indication information, each PTRS chunk (Chunk) mapped to the DFT-s-OFDM symbol includes four PTRS samples. In this case, orthogonal cover codes may be generated as follows: {1, 1, 1, 1}, {1, 1, −1, −1}, {1, −1, 1, −1}, and {1, −1, −1, 1}. If four terminals perform orthogonal cover code processing, by using the four orthogonal cover codes respectively, on PTRSs mapped to their respective DFT-s-OFDM symbols, the PTRSs of the four terminals can be kept orthogonal to each other. Certainly, if two terminals perform orthogonal cover code processing, by using any two of the foregoing orthogonal cover codes respectively, on PTRSs mapped to their respective DFT-s-OFDM symbols, the PTRSs of the two terminals can be kept orthogonal to each other.

Optionally, in this embodiment, the second indication information may be at least one of the following information: a demodulation reference signal DMRS port number of the terminal, a PTRS port number of the terminal, or a terminal identity of the terminal.

In other words, the terminal may select its own orthogonal cover code based on a DMRS port number, a PTRS port number, or a terminal identity of the terminal.

It should be understood that, for terminals in a same cell, because their DMRS port numbers are different from each other and their PTRS port numbers are also different from each other, code division multiplexing information corresponding to DMRS/PTRS port numbers of different terminals is different.

The DMRS port number is used as an example for description. It is assumed that, uplink DMRS port numbers of a current cell include 41, 42, 43, and 44, each chunk mapped to a DFT-s-OFDM symbol includes four PTRS samples, and orthogonal cover codes are the foregoing {1, 1, 1, 1}, {1, 1, −1, −1}, {1, −1, 1, −1}, and {1, −1, −1, 1}. Table 12 shows a correspondence between these DMRS port numbers and the orthogonal cover codes.

TABLE 12

| DMRS port number | Orthogonal cover code |
| --- | --- |
| 41 | {1, 1, 1, 1} |
| 42 | {1, 1, −1, −1} |
| 43 | {1, −1, 1, −1} |
| 44 | {1, −1, −1, 1} |

For example, if a DMRS port number of a terminal 1 is 41, the orthogonal cover code {1, 1, 1, 1} is selected to process PTRS samples in each chunk mapped to a DFT-s-OFDM symbol; or if a DMRS port number of a terminal 2 is 44, the orthogonal cover code {1, −1, −1, 1} is selected to process PTRS samples in each chunk mapped to a DFT-s-OFDM symbol. It should be understood that, after the foregoing orthogonal cover code processing, the PTRS mapped to the DFT-s-OFDM symbol of the terminal 1 and the PTRS mapped to the DFT-s-OFDM symbol of the terminal 2 are orthogonal to each other, and therefore collision can be avoided.

Optionally, for an inter-cell scenario, in some of the foregoing embodiments, the second indication information may alternatively be a cell identity ID of the terminal.

It should be understood that, for terminals in different cells, because cell identities of cells in which the terminals are located are different from each other, orthogonal cover codes corresponding to the cell identities of the different terminals are different.

For example, it is assumed that each chunk mapped to a DFT-s-OFDM symbol includes four PTRS samples, and orthogonal cover codes are the foregoing {1, 1, 1, 1}, {1, 1, −1, −1}, {1, −1, 1, −1}, and {1, −1, −1, 1}. Table 13 shows a correspondence between different cell IDs and the orthogonal cover codes.

TABLE 13

| Cell ID | Orthogonal cover code |
| --- | --- |
| ID_1 | {1, 1, 1, 1} |
| ID_2 | {1, 1, −1, −1} |
| ID_3 | {1, −1, 1, −1} |
| ID_4 | {1, −1, −1, 1} |

For example, if a cell ID of a terminal 1 is ID_1, the orthogonal cover code {1, 1, 1, 1} is selected to process PTRS samples in each chunk mapped to a DFT-s-OFDM symbol; or if a cell ID of a terminal 2 is ID_4, the orthogonal cover code {1, −1, −1, 1} is selected to process PTRS samples in each chunk mapped to a DFT-s-OFDM symbol. It should be understood that, after the foregoing orthogonal cover code processing, the PTRS mapped to the DFT-s-OFDM symbol of the terminal 1 and the PTRS mapped to the DFT-s-OFDM symbol of the terminal 2 are orthogonal to each other, and therefore collision can be avoided.

For example, in the foregoing embodiment described with reference to Table 12 or Table 13, a correspondence between an orthogonal cover code and a DMRS port number (or a PTRS port number or a cell ID) may be notified in advance to the terminal by using downlink signaling. In other words, information about a correspondence between an orthogonal cover code and a DMRS port number is sent to the terminal; or information about a correspondence between an orthogonal cover code and a PTRS port number is sent to the terminal; or information about a correspondence between an orthogonal cover code and a cell ID is sent to the terminal. For example, the downlink signaling may be any one of the following information: system information (SI), radio resource control (RRC) signaling, a MAC control element (MAC-CE), or downlink control information (DCI).

Optionally, in the foregoing embodiment described with reference to Table 12 or Table 13, a correspondence between an orthogonal cover code and a DMRS port number (or a PTRS port number or a cell ID) may alternatively be configured in the terminal by using a protocol. In other words, the terminal prestores information about a correspondence between a DMRS port number and a PTRS mapping location set, or prestores information about a correspondence between a PTRS port number and a PTRS mapping location set, or prestores information about a correspondence between a cell ID and a PTRS mapping location set.

Optionally, in another implementation, the code division multiplexing information is a phase rotation factor; and the performing code division multiplexing processing, by using the code division multiplexing information, on the PTRS mapped to the one or more DFT-s-OFDM symbols in step 620 includes: performing phase rotation processing, by using the phase rotation factor, on each PTRS chunk mapped to each DFT-s-OFDM symbol to which the PTRS is mapped.

For example, it is assumed that after the PTRS is mapped to one or more DFT-s-OFDM symbols based on the time-domain location of the PTRS indicated in the first indication information, each DFT-s-OFDM symbol to which the PTRS is mapped includes N PTRS chunks (Chunk). PTRS samples in each chunk are multiplied by a phase rotation factor.

For example, phase rotation processing is performed, by using a phase rotation factor shown in the following formula, on an $(n+1)^{th}$ PTRS chunk mapped to each DFT-s-OFDM symbol to which the PTRS is mapped:

$$\exp\left(-j2\pi n \frac{N_1}{N}\right) \quad (1)$$

where j is a complex symbol; N represents a quantity of PTRS chunks mapped to each DFT-s-OFDM symbol to which the PTRS is mapped; n=0, 1, . . . , N−1; and $N_1$ represents a terminal-level phase rotation factor allocated to the terminal.

Optionally, in this embodiment, the second indication information is at least one of the following information: a demodulation reference signal DMRS port number of the terminal, a PTRS port number of the terminal, or a terminal identity ID of the terminal.

In other words, the terminal may determine, based on a DMRS port number, a PTRS port number, or a terminal identity ID of the terminal, the phase rotation factor used for performing the phase rotation processing on the PTRS. For example, in the foregoing embodiment described with reference to formula (1), the terminal-level phase rotation factor $N_1$ allocated to the terminal is determined based on the DMRS port number, the PTRS port number, or the terminal identity ID of the terminal.

The DMRS port number is used as an example. It is assumed that uplink DMRS port numbers of a current cell include 41, 42, 43, and 44. Table 14 shows a correspondence between terminal-level phase rotation factors $N_1$ allocated to terminals in the current cell and these DMRS port numbers.

TABLE 14

| DMRS port number | $N_1$ |
| --- | --- |
| 41 | 0 |
| 42 | N/4 |
| 43 | N/2 |
| 44 | 3N/4 |

For example, if a DMRS port number of a terminal 1 is 41 and a terminal-level phase rotation factor $N_1$ of the terminal 1 is 0, a chunk-level phase rotation factor is calculated with reference to the foregoing formula (1) and $N_1=0$, and then each chunk mapped to a DFT-s-OFDM symbol is processed based on the calculated phase rotation factor. If a DMRS port number of a terminal 2 is 44 and a terminal-level phase rotation factor $N_1$ of the terminal 2 is 3N/4, a chunk-level phase rotation factor is calculated with reference to the foregoing formula (1) and $N_1=3N/4$, and then each chunk mapped to a DFT-s-OFDM symbol is processed based on the calculated phase rotation factor. It should be understood that, after the foregoing phase rotation processing, the PTRS mapped to the DFT-s-OFDM symbol of the terminal 1 and the PTRS mapped to the DFT-s-OFDM symbol of the terminal 2 are orthogonal to each other, and therefore PTRS collision between terminals in a cell can be avoided.

Optionally, for an inter-cell scenario, in the foregoing embodiment concerning phase rotation, the second indication information may alternatively be a cell identity ID of the terminal.

It should be understood that, for terminals in different cells, because cell identities of cells in which the terminals are located are different from each other, phase rotation factors corresponding to the cell identities of the different terminals are different.

For example, Table 15 shows a correspondence between different cell IDs and terminal-level phase rotation factors $N_1$ allocated to terminals in different cells.

TABLE 15

| Cell ID | $N_1$ |
| --- | --- |
| ID_1 | 0 |
| ID_2 | N/4 |
| ID_3 | N/2 |
| ID_4 | 3N/4 |

For example, if a cell ID of a terminal 1 is ID_1 and a terminal-level phase rotation factor $N_1$ of the terminal 1 is 0, a chunk-level phase rotation factor is calculated with reference to the foregoing formula (1) and $N_1=0$, and then each chunk mapped to a DFT-s-OFDM symbol is processed based on the calculated phase rotation factor. If a cell ID of a terminal 2 is ID_4 and a terminal-level phase rotation factor $N_1$ of the terminal 2 is 3N/4, a chunk-level phase rotation factor is calculated with reference to the foregoing formula (1) and $N_1=3N/4$, and then each chunk mapped to a DFT-s-OFDM symbol is processed based on the calculated phase rotation factor. It should be understood that, after the foregoing phase rotation processing, the PTRS mapped to the DFT-s-OFDM symbol of the terminal 1 and the PTRS mapped to the DFT-s-OFDM symbol of the terminal 2 are orthogonal to each other, and therefore PTRS collision between terminals in different cells can be avoided.

For example, in the foregoing embodiment described with reference to Table 14 or Table 15, a correspondence between a terminal-level phase rotation factor $N_1$ and a DMRS port number (or a PTRS port number or a cell ID) may be notified in advance to the terminal by using downlink signaling. In other words, information about a correspondence between a terminal-level phase rotation factor $N_1$ and a DMRS port number is sent to the terminal; or information about a correspondence between a terminal-level phase rotation factor $N_1$ and a PTRS port number is sent to the terminal; or information about a correspondence between a terminal-level phase rotation factor $N_1$ and a cell ID is sent to the terminal. For example, the downlink signaling is any one of the following information: system information (system information, SI), RRC signaling, an MAC-CE, or DCI.

Optionally, in the foregoing embodiment described with reference to Table 14 or Table 15, a correspondence between a terminal-level phase rotation factor $N_1$ and a DMRS port number (or a PTRS port number or a cell ID) may alternatively be configured in the terminal by using a protocol. In other words, the terminal prestores information about a correspondence between a DMRS port number and a terminal-level phase rotation factor $N_1$, or prestores information about a correspondence between a PTRS port number and a terminal-level phase rotation factor $N_1$, or prestores information about a correspondence between a cell ID and a terminal-level phase rotation factor $N_1$.

Optionally, in some embodiments of the PTRS processing method 600, the first indication information is used to indicate a time-domain density of the PTRS.

For example, the first indication information includes a modulation and coding scheme MCS of the terminal. For details, refer to related description of the foregoing PTRS processing method 300. For brevity, details are not described herein again.

Optionally, in some embodiments of the PTRS processing method 600, the first indication information is further used to indicate a quantity of PTRS chunks, and the quantity of PTRS chunks represents a quantity of PTRS chunks (Chunk) mapped to one DFT-s-OFDM symbol to which the PTRS is mapped.

For example, the first indication information includes scheduled bandwidth of the terminal. In other words, the quantity of chunks is determined by the scheduled bandwidth, and the quantity of chunks increases as the scheduled bandwidth increases, and decreases as the scheduled bandwidth decreases. For details, refer to related description of the PTRS processing method 300. For brevity, details are not described herein again.

In conclusion, in the PTRS processing method 600 provided in this embodiment of the present application, after the PTRS is mapped to the DFT-s-OFDM symbol based on the time-domain location of the PTRS indicated by the network device, code division multiplexing processing is performed on the PTRS mapped to the DFT-s-OFDM symbol. This can implement orthogonality of PTRSs of different terminals, to overcome a problem of PTRS collision between different users, especially to resolve PTRS collision between different users in a same cell, thereby improving phase noise tracking precision.

Figure 7:
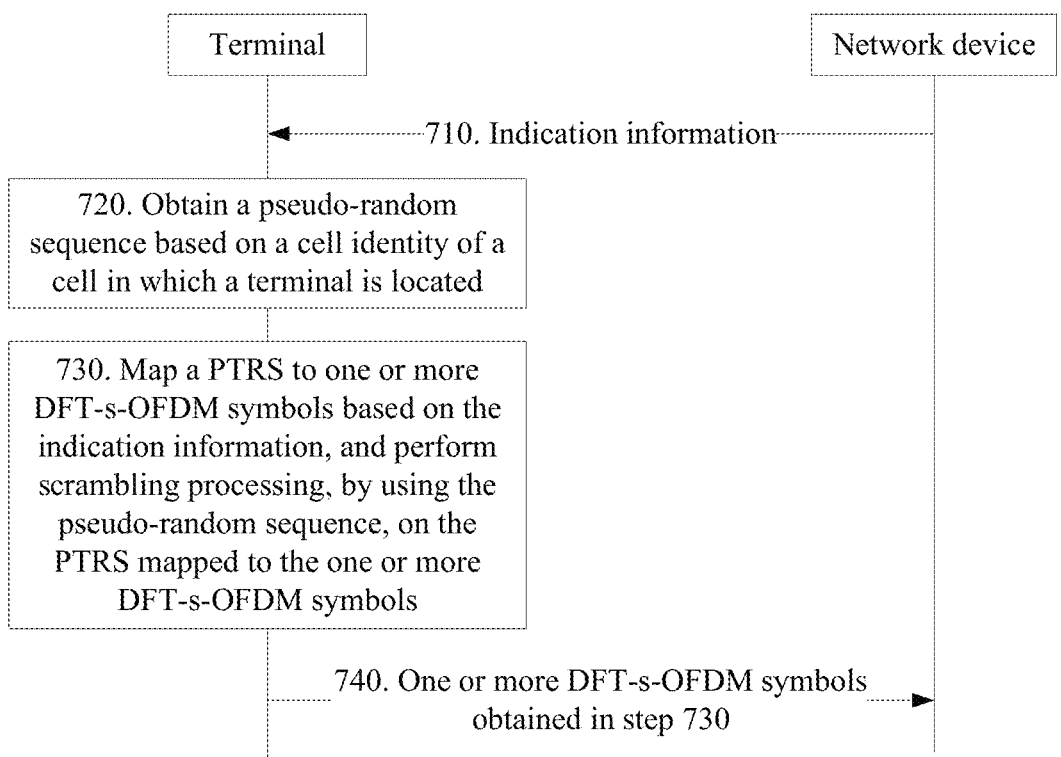
FIG. 7 is still another schematic interactive diagram of a PTRS processing method according to an embodiment of the present application.

As shown in FIG. 7, an embodiment of the present application further provides a PTRS processing method 700. A network device in FIG. 7 may correspond to the network device 210 in FIG. 2, and a terminal in FIG. 7 may correspond to the terminal 220 in FIG. 2. The PTRS processing method 700 includes the following steps.

710. The network device sends indication information to the terminal, where the indication information is used to indicate a time-domain location at which a PTRS is to be sent by the terminal. Correspondingly, the terminal receives the indication information from the network device.

The indication information corresponds to the first indication information in some of the foregoing embodiments. For details, refer to the foregoing description. Details are not described herein again.

720. The terminal obtains a pseudo-random sequence based on a cell identity of a cell in which the terminal is located.

For example, the pseudo-random sequence may be a sequence {0, 1} such as a gold sequence or an m-sequence, or the pseudo-random sequence may be a ZC sequence.

Different cell identities correspond to different pseudo-random sequences.

730. The terminal maps the PTRS to one or more discrete Fourier transform-spread-orthogonal frequency division multiplexing DFT-s-OFDM symbols based on the indication information, and performs scrambling processing, by using the pseudo-random sequence, on the PTRS mapped to the one or more DFT-s-OFDM symbols.

For example, first, the PTRS is mapped to the one or more DFT-s-OFDM symbols based on the indication information; and then scrambling processing is performed, by using the pseudo-random sequence, on the PTRS mapped to the DFT-s-OFDM symbol.

For example, the performing scrambling processing on the PTRS mapped to the DFT-s-OFDM symbol means multiplying the pseudo-random sequence by the PTRS mapped to the DFT-s-OFDM symbol. A process of the scrambling processing is described in detail below.

740. The terminal sends the one or more DFT-s-OFDM symbols obtained after the processing in step 730.

For example, as shown in FIG. 7, the terminal sends the one or more DFT-s-OFDM symbols obtained after the processing in step 730 to the network device. Correspondingly, the network device receives the one or more DFT-s-OFDM symbols from the terminal.

It should be noted that, the embodiment shown in FIG. 7 is mainly applicable to processing PTRSs of terminals in different cells.

In the prior art, usually a PTRS is mapped to one or more DFT-s-OFDM symbols based on a predetermined time-domain location of the PTRS. When a plurality of terminals send DFT-s-OFDM symbols, a problem of overlapping of time domain configurations of PTRSs mapped to the DFTs-OFDM symbols that are sent by the plurality of terminals may easily occur, causing PTRS collision between different terminals.

However, in this embodiment, the pseudo-random sequence is determined based on the cell identity of the cell in which the terminal is located, and then scrambling processing is performed, by using the pseudo-random sequence, on the PTRS mapped to the DFT-s-OFDM symbol. Because different cell identities correspond to different pseudo-random sequences, after the foregoing processing process, PTRSs mapped to DFT-s-OFDM symbols of terminals in different cells can maintain interference randomization. For example, at a receive end device, PTRSs mapped to DFT-s-OFDM symbols that are sent by DFT-s-OFDM users from adjacent cells are embodied as a random sequence, to achieve an objective of interference randomization, thereby avoiding a problem of PTRS collision between users in different cells.

Optionally, in an implementation, in step 720, the terminal obtains a cell-level pseudo-random sequence based on only the cell identity of the cell in which the terminal is located.

Optionally, in another implementation, in step 720, the terminal obtains a terminal-level pseudo-random sequence based on the cell identity of the cell in which the terminal is located and a terminal identity of the terminal.

For example, the terminal identity of the terminal is a radio network temporary identity (Radio Network Temporary Identity, RNTI) of the terminal.

For example, the terminal obtains a scrambling sequence a(n) based on the cell identity and the RNTI of the terminal. Then scrambling may be performed, by using a subset of a(n), on the PTRS mapped to the DFT-s-OFDM symbol. For example, first, a subset of a(n) is converted into a modulated sequence in a form of {1, −1}; and then the modulated sequence is multiplied, in a one-to-one correspondence manner, by the PTRS mapped to the DFT-s-OFDM symbol. The modulated sequence may be a BPSK sequence or a QPSK sequence.

The following describes, by using a terminal-level pseudo-random sequence as an example, a process of performing scrambling processing, by using the pseudo-random sequence, on the PTRS mapped to the one or more DFT-s-OFDM symbols in step 730.

(1) Obtain a sequence initialization factor (c_ini), denoted as c_ini=f (N_cell, n_RNTI), based on a cell identity (N_cell) and a terminal identity (n_RNTI).

(2) Obtain a pseudo-random sequence c(n) based on c_ini and a particular sequence generation rule.

For example, a length of the pseudo-random sequence c(n) may correspond to a quantity of PTRSs mapped to one DFT-s-OFDM symbol, or may correspond to a quantity of PTRSs mapped to a plurality of DFT-s-OFDM symbols.

For example, if a subframe sent by the terminal includes one DFT-s-OFDM symbol, the length of c(n) corresponds to a quantity of PTRSs mapped to one DFT-s-OFDM symbol; or if a subframe sent by the terminal includes a plurality of DFT-s-OFDM symbols, the length of c(n) corresponds to a quantity of PTRSs mapped to the plurality of DFT-s-OFDM symbols.

(3) Convert c(n) into a modulated symbol d(k).

For example, d(k) may be a BPSK symbol (or a QPSK symbol) whose value is {1, −1}, or may be a QPSK symbol whose value is a complex number.

(4) Multiply, in a one-to-one correspondence manner, d(k) by PTRS symbols mapped to the one or more DFT-s-OFDM symbols.

Optionally, in another implementation, in step 720, the pseudo-random sequence may reuse an existing sequence, such as a data scrambling sequence.

In LTE, each terminal generates a scrambling sequence, denoted as a(n), based on an RNTI and a cell ID, and then scrambles an encoded and unmodulated bit by using the scrambling sequence. Therefore, the scrambling sequence a(n) may be directly used as the pseudo-random sequence in step 720.

For example, the PTRS may be scrambled by using a subset of a(n). For example, a subset of a(n) is taken, and the subset is converted into a BPSK sequence (or a QPSK sequence) in a form of {1, −1}; and then the PTRS sequence is multiplied, in a one-to-one correspondence manner, by the PTRS samples mapped to the DFT-s-OFDM symbol.

Optionally, in some embodiments of the PTRS processing method 700, the indication information is used to indicate a time-domain density of the PTRS.

For example, the indication information includes a modulation and coding scheme MCS of the terminal. The indication information corresponds to the first indication information in the foregoing embodiments. For details, refer to related description of the PTRS processing method 300. For brevity, details are not described herein again.

Optionally, in some embodiments of the PTRS processing method 700, the indication information is further used to indicate a quantity of PTRS chunks, and the quantity of PTRS chunks represents a quantity of PTRS chunks (Chunk) mapped to one DFT-s-OFDM symbol to which the PTRS is mapped.

For example, the indication information includes scheduled bandwidth of the terminal. In other words, the quantity of chunks is determined by the scheduled bandwidth, and the quantity of chunks increases as the scheduled bandwidth increases, and decreases as the scheduled bandwidth decreases. The indication information corresponds to the first indication information in the foregoing embodiments. For details, refer to related description of the PTRS processing method 300. For brevity, details are not described herein again.

In conclusion, in the PTRS processing method 700 provided in this embodiment of the present application, the pseudo-random sequence is determined based on the cell identity of the cell in which the terminal is located, and then scrambling processing is performed, by using the pseudo-random sequence, on the PTRS mapped to the DFT-s-OFDM symbol. Because different cell identities correspond to different pseudo-random sequences, after the foregoing processing process, PTRSs mapped to DFT-s-OFDM symbols of terminals in different cells can maintain interference randomization. For example, at a receive end device, PTRSs mapped to DFT-s-OFDM symbols that are sent by DFT-s-OFDM users from adjacent cells are embodied as a random sequence, to achieve an objective of interference randomization, thereby avoiding a problem of PTRS collision between users in different cells.

The foregoing describes, with reference to FIG. 6, a solution of orthogonality processing of a PTRS mapped to a DFT-s-OFDM symbol, and describes, with reference to FIG. 7, a solution of random interference processing on a PTRS mapped to a DFT-s-OFDM symbol. The embodiment shown in FIG. 6 is applicable to overcoming a problem of PTRS collision between terminals in a same cell, and the embodiment shown in FIG. 7 is applicable to overcoming a problem of PTRS collision between terminals in different cells. In actual application, a corresponding solution may be flexibly selected according to different application requirements. For example, if there is a need to overcome both the problem of PTRS collision between terminals in a same cell and the problem of PTRS collision between terminals in different cells, the solution shown in FIG. 6 and the solution shown in FIG. 7 may be combined for use.

Figure 8:
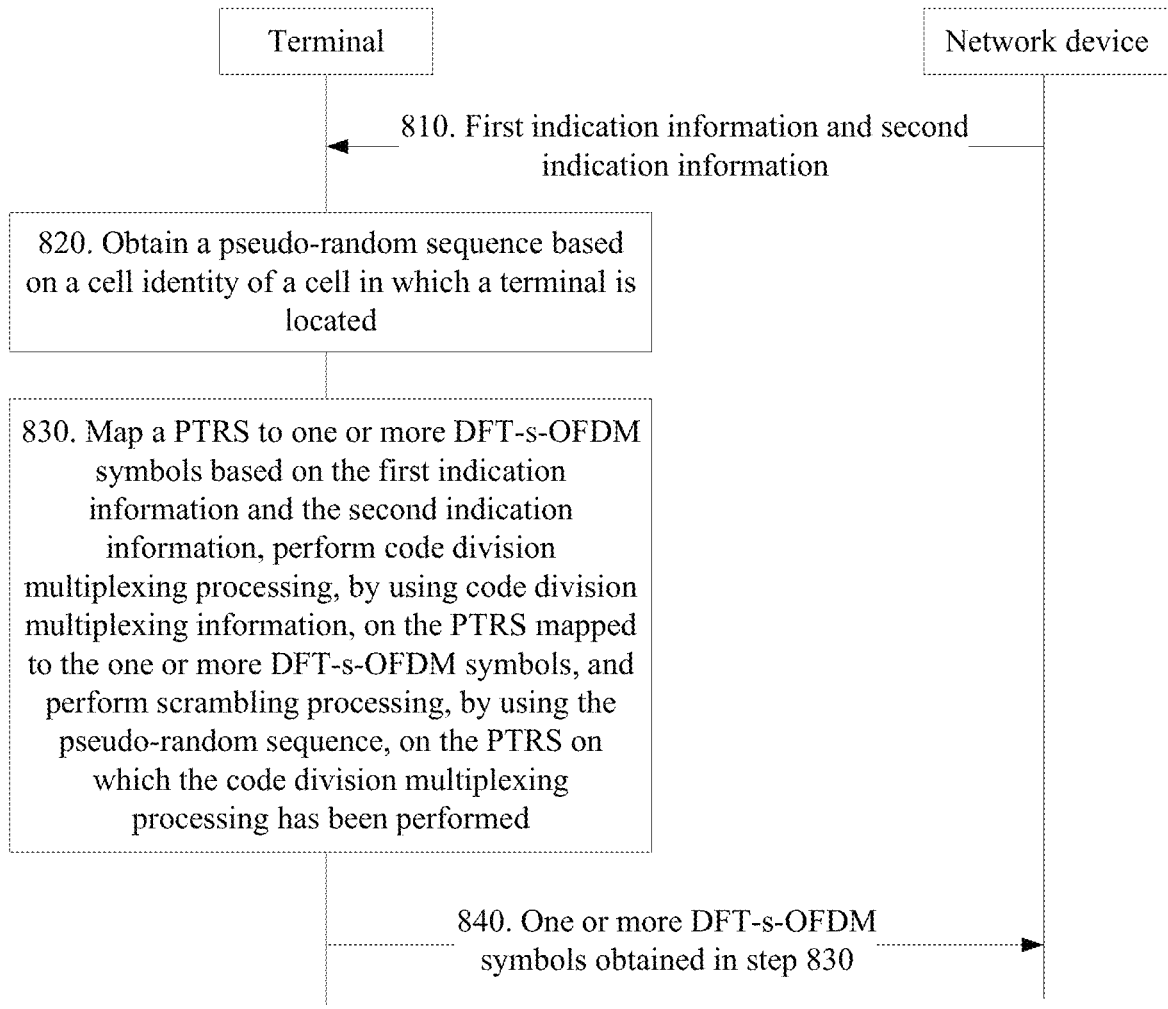
FIG. 8 is yet another schematic interactive diagram of a PTRS processing method according to an embodiment of the present application.

As shown in FIG. 8, an embodiment of the present application further provides a PTRS processing method 800. The PTRS processing method 800 may be considered as a combination of the method shown in FIG. 6 and the method shown in FIG. 7. The PTRS processing method 800 includes the following steps.

810. A network device sends first indication information and second indication information to a terminal, where the first indication information is used to indicate a time-domain location at which a PTRS is to be sent by the terminal, the second indication information is used to indicate code division multiplexing information, and the code division multiplexing information is used to perform code division multiplexing processing on a PTRS mapped to a discrete Fourier transform-spread-orthogonal frequency division multiplexing DFT-s-OFDM symbol. Correspondingly, the terminal receives the first indication information and the second indication information from the network device.

This step corresponds to step 710 in the embodiment shown in FIG. 7. For details, refer to the foregoing description. For brevity, details are not described herein again.

820. The terminal obtains a pseudo-random sequence based on a cell identity of a cell in which the terminal is located.

This step corresponds to step 720 in the embodiment shown in FIG. 7. For details, refer to the foregoing description. For brevity, details are not described herein again.

830. The terminal maps the PTRS to one or more DFT-s-OFDM symbols based on the first indication information and the second indication information, performs code division multiplexing processing, by using the code division multiplexing information, on the PTRS mapped to the one or more DFT-s-OFDM symbols, and performs scrambling processing, by using the pseudo-random sequence, on the PTRS on which the code division multiplexing processing has been performed.

For example, first, the PTRS is mapped to the one or more DFT-s-OFDM symbols based on the time-domain location of the PTRS indicated in the first indication information; then code division multiplexing processing is performed, by using the code division multiplexing information, on the PTRS mapped to the DFT-s-OFDM symbol; and finally, scrambling processing is performed, by using the pseudo-random sequence, on the PTRS on which the code division multiplexing processing has been performed.

840. The terminal sends the one or more DFT-s-OFDM symbols obtained after the processing in step 830.

For example, as shown in FIG. 8, the terminal sends the one or more DFT-s-OFDM symbols obtained after the processing in step 830 to the network device. Correspondingly, the network device receives the one or more DFT-s-OFDM symbols.

In this embodiment of the present application, after the PTRS is mapped to the DFT-s-OFDM symbol based on the time-domain location of the PTRS indicated by the network device, both code division multiplexing processing and scrambling processing by using the pseudo-random sequence are performed on the PTRS mapped to the DFT-s-OFDM symbol. This can overcome both a problem of PTRS collision between terminals in a same cell and a problem of PTRS collision between terminals in different cells.

Optionally, the code division multiplexing information is an orthogonal cover code OCC; and the performing code division multiplexing processing, by using the code division multiplexing information, on the PTRS mapped to the one or more DFT-s-OFDM symbols in step 830 includes: performing orthogonal cover code processing, by using the OCC, on PTRSs in each PTRS chunk mapped to each DFT-s-OFDM symbol to which the PTRS is mapped.

For details, refer to related description in the embodiment shown in FIG. 6. Details are not described herein again.

Optionally, the code division multiplexing information is a phase rotation factor; and the performing code division multiplexing processing, by using the code division multiplexing information, on the PTRS mapped to the one or more DFT-s-OFDM symbols in step 830 includes: performing phase rotation processing, by using the phase rotation factor, on each PTRS chunk mapped to each DFT-s-OFDM symbol to which the PTRS is mapped.

For details, refer to related description in the embodiment shown in FIG. 6. Details are not described herein again.

Optionally, the performing scrambling processing, by using the pseudo-random sequence, on the PTRS on which the code division multiplexing processing has been performed in step 830 includes: multiplying the pseudo-random sequence by the PTRS on which the code division multiplexing processing has been performed.

For example, a process of multiplying the pseudo-random sequence by the PTRS on which the code division multiplexing processing has been performed is as follows:

(1) Obtain a sequence initialization factor (c_ini) based on a cell identity (N_cell) and a terminal identity (n_RNTI), that is, c_ini=f(N_cell, n_RNTI).

(2) Obtain a pseudo-random sequence c(n) based on c_ini and a particular sequence generation rule.

For example, a length of the pseudo-random sequence c(n) may correspond to a quantity of PTRSs mapped to one DFT-s-OFDM symbol, or may correspond to a quantity of PTRSs mapped to a plurality of DFT-s-OFDM symbols.

For example, if a subframe sent by the terminal includes one DFT-s-OFDM symbol, the length of c(n) corresponds to a quantity of PTRSs mapped to one DFT-s-OFDM symbol; or if a subframe sent by the terminal includes a plurality of DFT-s-OFDM symbols, the length of c(n) corresponds to a quantity of PTRSs mapped to the plurality of DFT-s-OFDM symbols.

(3) Convert c(n) into a modulated symbol d(k).

For example, d(k) may be a BPSK symbol whose value is {1, −1}, or may be a QPSK symbol whose value is a complex number.

(4) Multiply, in a one-to-one correspondence manner, d(k) by PTRS symbols that have been mapped to the one or more DFT-s-OFDM symbols and on which orthogonality processing has been performed.

It should be noted that, if there is a need to implement orthogonality of PTRSs of terminals in a same cell and interference randomization of PTRSs of terminals in different cells, c_ini is calculated based on only the cell identity (N_cell) in step (1), that is, c_ini=f(N_cell).

If there is a need to implement orthogonality of PTRSs of terminals with different ports (DMRS port numbers or PTRS port numbers) in a same cell and implement interference randomization of PTRSs of other terminals in a same cell or in different cells, c_ini is calculated based on both the cell identity (N_cell) and the terminal identity (n_RNTI) in step (1), that is, c_ini=f(N_cell, n_RNTI).

For details about a manner of obtaining the pseudo-random sequence in step 820 and an expression form of the pseudo-random sequence, refer to the foregoing related description made with reference to FIG. 7. Details are not described herein again.

It should be noted that, for pi/2-BPSK modulation, in a best case, the PTRS is a real-number sequence (for example, {1, −1}). In this case, the scrambling sequence should also be a real-number sequence.

Because the OCC is a real number, a real-number sequence is obtained after the OCC is combined with a scrambling code.

The phase rotation factor may be a complex number. In a method in which phase rotation and scrambling are combined, a real-number phase rotation sequence may be allocated to a pi/2-BPSK modulation user, and other sequences are allocated to other modulation users.

After an all-real-number PTRS sequence is obtained, the all-real-number PTRS sequence is multiplexed with a PBSK data symbol; and then pi/2 phase rotation is simultaneously performed on data and the PTRS, to obtain a pi/2-BPSK modulated symbol. In this way, a low-PAPR characteristic of pi/2-BPSK is retained as far as possible.

The foregoing describes the PTRS processing methods provided in the embodiments of the present application. The following describes apparatuses provided in the embodiments of the present application.

The foregoing mainly describes the solutions provided in the embodiments of this application from a perspective of interaction between network elements. It may be understood that, to implement the foregoing functions, each network element, for example, a transmit end device or a receive end device, includes a corresponding hardware structure and/or a software module for performing the functions. A person skilled in the art should be easily aware that, with reference to example units and algorithm steps described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Function module division may be performed on a transmit end device or a receive end device according to the foregoing method examples in the embodiments of this application. For example, function modules may be divided to correspond to functions, or two or more functions may be integrated into one processing module. The integrated module may be implemented in a form of hardware, or may be implemented in a form of a software function module. It should be noted that the module division in the embodiments of this application is an example, and is merely logical function division, and there may be another division manner in actual implementation. The following gives description by using an example in which function modules are divided to correspond to functions.

An embodiment of this application further provides a PTRS processing apparatus. The PTRS processing apparatus may be a terminal, or may be a chip. The PTRS processing apparatus may be configured to perform the steps performed by the terminal in FIG. 3, FIG. 6, FIG. 7, or FIG. 8.

Figure 9:
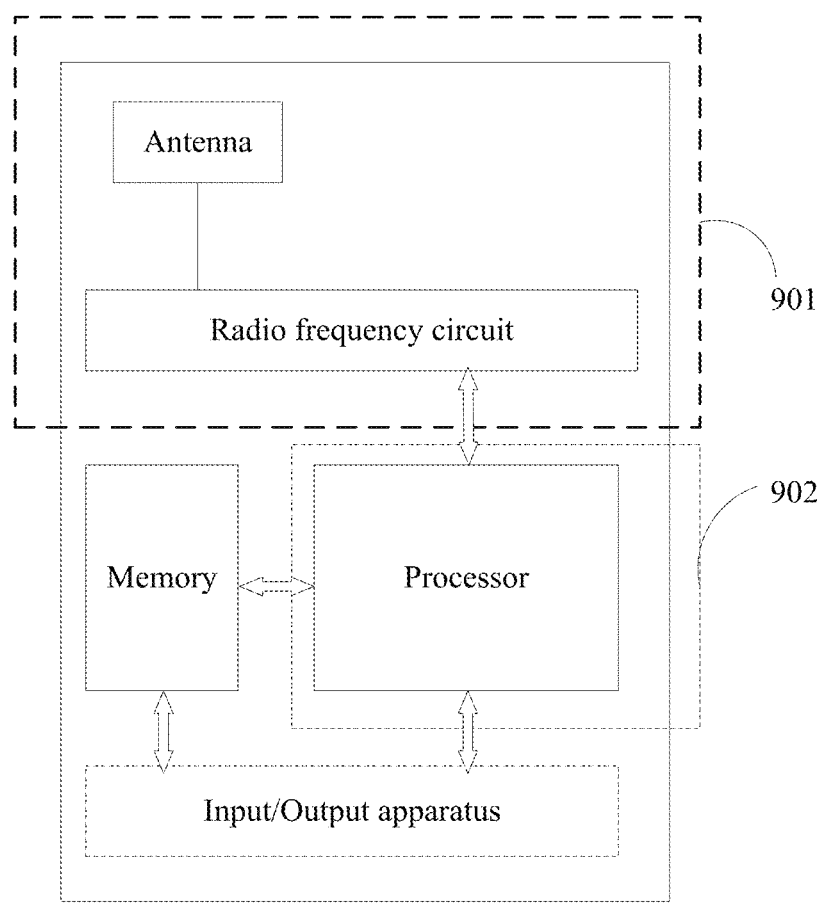
FIG. 9 is a schematic block diagram of a terminal according to an embodiment of the present application.

When the PTRS processing apparatus is a terminal, FIG. 9 is a schematic diagram of a simplified structure of the terminal. For ease of understanding and graphical representation, in FIG. 9, a mobile phone is used as an example of the terminal. As shown in FIG. 9, the terminal includes a processor, a memory, a radio frequency circuit, an antenna, and an input/output apparatus. The processor is mainly configured to process a communications protocol and communications data, control the terminal, execute a software program, and process data of the software program or the like. The memory is mainly configured to store the software program and data. The radio frequency circuit is mainly configured to perform conversion between a baseband signal and a radio frequency signal, and process a radio frequency signal. The antenna is mainly configured to send or receive a radio frequency signal in a form of an electromagnetic wave. The input/output apparatus, for example, a touchscreen, a display screen, or a keypad, is mainly configured to receive data entered by a user and output data to the user. It should be noted that some types of terminals may not have the input/output apparatus.

When data needs to be sent, the processor performs baseband processing on the data to be sent and then outputs a baseband signal to the radio frequency circuit. The radio frequency circuit performs radio frequency processing on the baseband signal and then transmits a radio frequency signal by using the antenna in a form of an electromagnetic wave. When data is sent to the terminal, the radio frequency signal receives a radio frequency signal by using the antenna, converts the radio frequency signal into a baseband signal, and outputs the baseband signal to the processor. The processor converts the baseband signal into data, and processes the data. For ease of description, FIG. 9 shows only one memory and one processor. In an actual terminal product, there may be one or more processors and one or more memories. The memory may also be referred to as a storage medium, a storage device, or the like. The memory may be disposed independent of the processor, or may be integrated with the processor, and this is not limited in this embodiment of this application.

In this embodiment of this application, the antenna having sending and receiving functions and the radio frequency circuit may be considered as a transceiver unit of the terminal, and the processor having a processing function may be considered as a processing unit of the terminal. As shown in FIG. 9, the terminal includes a transceiver unit 901 and a processing unit 902. The transceiver unit may also be referred to as a transceiver, a transceiver, a transceiver apparatus, or the like. The processing unit may also be referred to as a processor, a processing board, a processing module, a processing apparatus, or the like. Optionally, in the transceiver unit 901, a device configured to implement a receiving function may be considered as a receiving unit; and in the transceiver unit 901, a device configured to implement a sending function may be considered as a sending unit. In other words, the transceiver unit 901 includes a receiving unit and a sending unit. Sometimes, the transceiver unit may alternatively be referred to as a transceiver, a transceiver circuit, or the like. Sometimes, the receiving unit may alternatively be referred to as a receiver, a receiving device, a receiving circuit, or the like. Sometimes, the sending unit may alternatively be referred to as a transmitter, a transmitting circuit, or the like.

For example, in an implementation, the processing unit 901 is configured to perform step 320 in FIG. 3 and/or other steps in this application; and the transceiver unit 902 performs a receiving operation on a terminal side in step 310 in FIG. 3, or a sending operation on a terminal side in step 330, and/or other steps in this application. For another example, in an implementation, the processing unit 902 is configured to perform steps 820 and 830 in FIG. 8 and/or other steps in this application; and the transceiver unit 902 performs a receiving action on a terminal side in step 810 in FIG. 8, or a sending operation on a terminal side in step 840, and/or other steps in this application.

When the PTRS processing apparatus is a chip, the chip includes a transceiver unit and a processing unit. The transceiver unit may be an input/output circuit or a communications interface. The processing unit is a processor, microprocessor, or integrated circuit integrated in the chip.

An embodiment of this application further provides a PTRS processing apparatus. The PTRS processing apparatus may be a network device, or may be a chip. The PTRS processing apparatus may be configured to perform the steps performed by the network device in FIG. 3, FIG. 6, FIG. 7, or FIG. 8.

Figure 10:
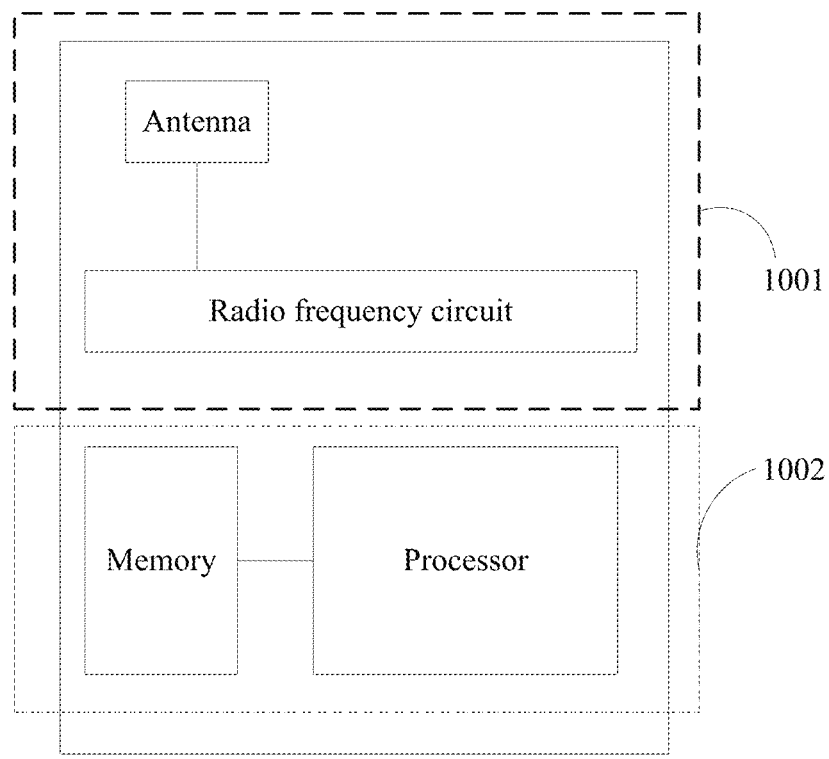
FIG. 10 is a schematic block diagram of a network device according to an embodiment of the present application.

When the PTRS processing apparatus is a network device, for example, a base station, FIG. 10 is a schematic diagram of a simplified structure of the base station. The base station includes a part 1001 and a part 1002. The part 1001 is mainly configured to send or receive a radio frequency signal, and perform conversion between a radio frequency signal and a baseband signal. The part 1002 is mainly configured to perform baseband processing, base station control, and the like. Usually, the part 1001 may be referred to as a transceiver unit, a transceiver, a transceiver circuit, a transceiver, or the like. The part 1002 is usually a control center of the base station, and usually may be referred to as a processing unit, configured to control the base station to perform the steps performed by the network device in FIG. 3, FIG. 6, FIG. 7, or FIG. 8. For details, refer to descriptions in the foregoing related parts.

A transceiver unit of the part 1001 may also be referred to as a transceiver, a transceiver, or the like, and includes an antenna and a radio frequency unit. The radio frequency unit is mainly configured to perform radio frequency processing. Optionally, in the part 1001, a device configured to implement a receiving function may be considered as a receiving unit, and a device configured to implement a sending function may be considered as a sending unit. In other words, the part 1001 includes a receiving unit and a sending unit. The receiving unit may also be referred to as a receiver, a receiving device, a receiving circuit, or the like. The sending unit may also be referred to as a transmitter, a transmitter, a transmitting circuit, or the like.

The part 1002 may include one or more boards. Each board may include one or more processors and one or more memories. The processor is configured to read and execute a program in the memory, to implement a baseband processing function and control the base station. If a plurality of boards exist, the boards may be interconnected to enhance a processing capability. In an optional implementation, a plurality of boards may share one or more processors, or a plurality of boards share one or more memories, or a plurality of boards simultaneously share one or more processors.

For example, in an implementation, the transceiver unit is configured to perform a sending operation on a network device side in step 310 in FIG. 3 and a receiving operation on the network device side in step 330 in FIG. 3; and the processing unit is configured to parse the one or more DFT-s-OFDM symbols received in step 330 in FIG. 3.

For another example, in an implementation, the transceiver unit is configured to perform a sending operation on a network device side in step 810 in FIG. 8, a receiving operation on the network device side in step 840 in FIG. 8, and/or other steps in this application; and the processing unit is configured to parse the one or more DFT-s-OFDM symbols received in step 840 in FIG. 8.

When the PTRS processing apparatus is a chip, the chip includes a transceiver unit and a processing unit. The transceiver unit may be an input/output circuit or a communications interface. The processing unit is a processor, microprocessor, or integrated circuit integrated in the chip.

For explanation of related content about any one of the above provided communications apparatuses and a beneficial effect thereof, refer to a corresponding method embodiment provided above. Details are not described herein again.

Figure 11:
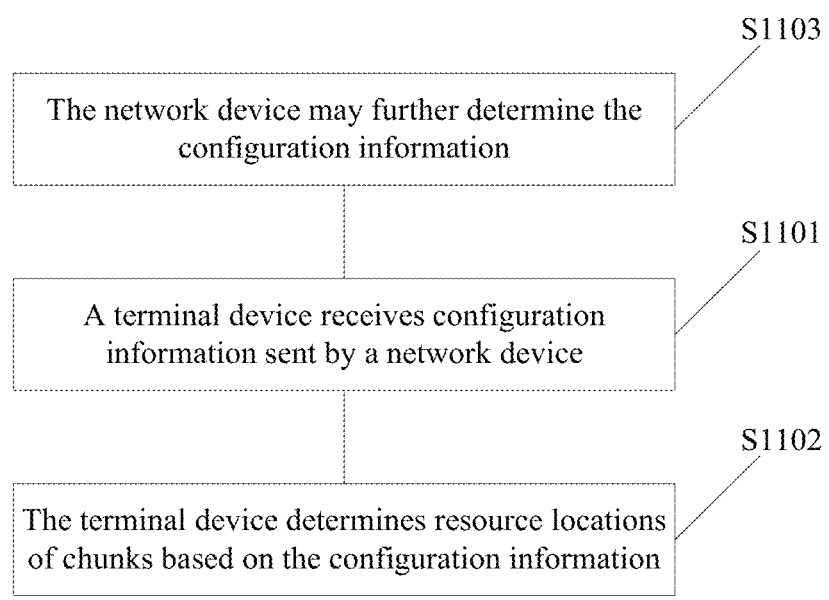
FIG. 11 is a schematic diagram of a signal processing method according to an embodiment of the present application.

The following describes another embodiment of the present application in detail according to a flowchart shown in FIG. 11. In different cases, there may be different application scenarios for PTRS chunks included in a DFT-s-OFDM symbol. Time-domain locations of PTRS chunks are configured for a network device and/or a terminal device, to adapt to a scenario requirement and improve performance. A configuration manner in this embodiment of the present application may include the following steps.

S1101. The terminal device receives configuration information sent by the network device, where the configuration information indicates an offset parameter and/or an interval parameter, and the configuration information is used to determine resource locations of the PTRS chunks.

As described in the foregoing embodiments, in one DFT-s-OFDM symbol, M consecutive PTRS samples or (modulated) symbols in time domain are referred to as a PTRS chunk. One DFT-s-OFDM symbol includes one or more PTRS chunks. For ease of description, PTRS chunks included in one DFT-s-OFDM symbol may also be referred to as chunks. For example, a quantity of chunks in one DFT-s-OFDM symbol is X, and/or a quantity of PTRS samples or (modulated) symbols included in one chunk is L. Correspondingly, if both x and l are counted starting from 0, a value range of x is $0 \le x \le X-1$ and a value range of l is $0 \le l \le L-1$. The time-domain locations of the chunks may be determined by the terminal device based on a function or a mapping relationship. In an embodiment, the terminal device determines a location of an $l^{th}$ PTRS symbol in an $x^{th}$ chunk based on a parameter configured by the network device. In another embodiment, the terminal device receives configuration information sent by the network device. The configuration information indicates an offset parameter and/or an interval parameter. The offset parameter may be used to indicate a quantity of (modulated) symbols between the first PTRS symbol and the first (modulated) symbol on a DFT-s-OFDM symbol on which a PTRS is located. The interval parameter may be used to indicate a quantity of (modulated) symbols (which may include a PTRS symbol) between two consecutive PTRS chunks.

In the foregoing embodiment, the determining of the time-domain locations of the chunks based on a function or a mapping relationship is described. The following gives detailed description based on different cases indicated in the configuration information.

Example 1

The network device or the terminal device determines the time-domain locations of the chunks in the following calculation manner:

$$PTRS(l,x) = x \cdot N' + \Delta t + l$$

When the configuration information includes the offset parameter $\Delta t$, the network device or the terminal device may perform calculation based on the configuration information. x and l represent a location of an $l^{th}$ PTRS symbol in an $x^{th}$ chunk, a quantity of chunks in one DFT-s-OFDM symbol is X, and/or a quantity of PTRS symbols included in one chunk is L. If both x and l are counted starting from 0, a value range of x is 0≤x≤X−1 and a value range of l is 0≤l≤L−1.

$$N' = \left\lfloor \frac{N}{X} \right\rfloor$$

Figure 16:
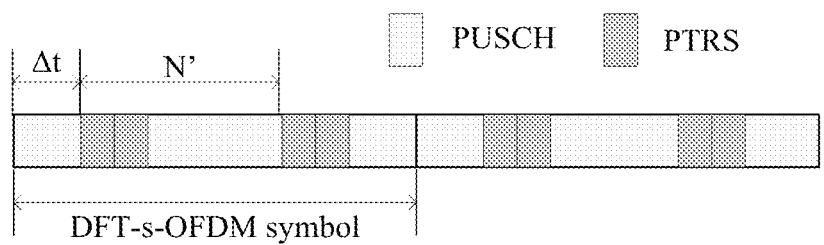
FIG. 16 is a schematic block diagram of PTRS location parameters according to an embodiment of the present application.

(refer to illustration in FIG. 16). $\lfloor \ \rfloor$ is a rounding-down symbol. N is a quantity of all pre-DFT (modulated) symbols of a DFT-s-OFDM symbol. N' represents, in any two adjacent chunks, an interval between the first symbol of the first chunk and the first symbol of the second chunk, or may be understood as an interval between an $l^{th}$ symbol of the first chunk and an $l^{th}$ symbol of the second chunk. N, X, and L are parameters configured by the network device, or may be predefined values, or may be indicated by using an MCS or scheduled bandwidth. For example, N is determined by using scheduled bandwidth or a quantity of RBs configured by using downlink control information (Downlink Control Information, DCI), for example, N=12*NumRB; X is determined by using scheduled bandwidth or a quantity of RBs or an MCS configured by using DCI; and L is determined by using an MCS or scheduled bandwidth or a quantity of RBs configured by using DCI.

In the foregoing case, the network device determines the resource locations of the chunks by configuring the offset parameter Δt (refer to illustration shown in FIG. 16). For example, in RRC signaling or an MAC-CE or DCI, two bits are used to represent a specific configuration of an offset thereof: 00 indicates a configuration 0, 01 indicates a configuration 1, and 10 indicates a configuration 2. In a specific implementation of Example 1, a value of the configured Δt may be at least one of the following three values in the following table:

| Configuration value | Calculation method for Δt in a corresponding configuration |
|---|---|
| Configuration 0 | $\Delta t = \lfloor 0 \cdot (N' - L) \rfloor$ |
| Configuration 1 | $\Delta t = \left\lfloor \frac{1}{2} \cdot (N' - L) \right\rfloor$ |
| Configuration 2 | $\Delta t = \lfloor 1 \cdot (N' - L) \rfloor$ |

It can be learned that, when the configuration value in the table is 0, the value of Δt may be directly 0; or when the configuration value is 1, the value of Δt may be directly $\lfloor N'-L \rfloor$.

In another embodiment, a value of Δt may be at least one of the following three values in the following table:

| Configuration value | Calculation method for Δt in a corresponding configuration |
|---|---|
| Configuration 0 | $\Delta t = \lceil 0 \cdot (N' - L) \rceil$ |
| Configuration 1 | $\Delta t = \left\lceil \frac{1}{2} \cdot (N' - L) \right\rceil$ |
| Configuration 2 | $\Delta t = \lceil 1 \cdot (N' - L) \rceil$ |

$\lceil \ \rceil$ is a rounding-up symbol. When the configuration value in the table is 0, the value of Δt may be directly 0; or when the configuration value is 1, the value of Δt may be directly $\lceil N'-L \rceil$. In another embodiment, the rounding symbol in the foregoing table may be a calculation manner of rounding to a nearest integer. In other words, when the configuration value is 0, the value of Δt is 0; or when the configuration value is 1, the value of Δt is calculation of rounding ½·(N'−L) to a nearest integer; or when the configuration value is 2, the value of Δt is calculation of rounding N'−L to a nearest integer.

It should be understood that the foregoing different configurations may correspond to different physical meanings. For example, the configuration 0 indicates that there is no offset, or indicates an offset that is required for a PTRS chunk to be located at a header or a front end of each equal interval; the configuration 1 indicates an offset that is required for a PTRS chunk to be located at the middle of an equal interval; and the configuration 2 indicates an offset that is required for a PTRS chunk to be located at a tail or a rear end of each equal interval. It should be understood that the equal interval may be equally dividing one DFT-s-OFDM symbol into a particular quantity of chunks. If equal division cannot be achieved in some cases, a quantity of symbols in a plurality of chunks obtained by division according to some rules is rounded up or rounded down. Alternatively, a smallest quantity is taken, and a supplement is added at a last equal-interval chunk; or a largest quantity is taken, and a particular quantity is deducted from a last equal interval. For example, a length of DFT-s-OFDM is 96 QAM modulated symbols; and if configuration is performed based on 2-PTRS chunks, modulated symbols 0 to 47 are the first equal interval and modulated symbols 48 to 95 are the second equal interval. If there are 94 modulated symbols and three equal intervals, it may be that modulated symbols 0 to 30 are the first equal interval, modulated symbols 31 to 61 are the second equal interval, and modulated symbols 62 to 93 are the third equal interval; or it may be that modulated symbols 0 to 31 are one equal interval, modulated symbols 32 to 63 are one equal interval, and modulated symbols 64 to 93 are one equal interval. In this case, the network device may determine the different configurations based on a PTRS status, so as to avoid collision and save a resource. In a corresponding scenario in which 94 modulated symbols are grouped into three equal intervals, because 94=31×3+1, one excessive modulated symbol may be placed, through configuration, into one of the first equal interval, the second equal interval, and the third equal interval in the three equal intervals. It should be understood that, the foregoing example is a configuration manner, and the network device and user equipment may directly predefine modulated symbols in the equal interval configuration and a form of the chunk.

It should be further understood that the foregoing configuration numbers are merely examples. In other words, for the configuration numbers, more or fewer configurations may be implemented by adding or reducing a quantity of rows in the foregoing tables. The offsets corresponding to the foregoing different configurations are also merely examples. In other words, a specific offset corresponding to each configuration may alternatively be another value, or the offset may be directly configured.

In still another embodiment, different configurations may be associated with another parameter for implicit indication. For example, Δt is associated with an MCS, and the terminal device may determine different configuration values based on different MCS values. Alternatively, the different configurations may be a combination of different parameters. In an embodiment, a specific value or configuration of Δt may be determined by at least one of an MCS, BW, a phase noise model, a channel status, a quantity of PTRS chunks, or the like. For example, if the MCS is relatively high and/or the BW is relatively large and/or the quantity of PTRS chunks is relatively large, the offset may be the configuration 1, to reduce an extrapolation length and enhance estimation accuracy; or if the MCS is relatively low and/or the BW is relatively small and/or the quantity of PTRS chunks is relatively small, the offset may be the configuration 0, to relatively quickly obtain an estimated value of phase noise and reduce a delay.

In an embodiment, a value set or configuration set of Δt may be configured by using RRC or higher layer signaling, or predefined, or configured by default; and then DCI is further configured based on the value set or the configuration set, to indicate a current offset configuration. In another embodiment, a value set or configuration set of Δt may be configured by using RRC signaling, or predefined, or configured by default; and then an MAC-CE is further configured based on the value set or the configuration set, to indicate a current offset configuration. In still another embodiment, a value set or configuration set of Δt is notified by the network device and/or a base station by using signaling, or predefined, or configured by default, where the signaling includes at least one of RRC signaling, an MAC-CE, or DCI; and on a basis of configuring the value set or configuration set of Δt, a current offset configuration is determined implicitly by at least one of an MCS, BW, a phase noise model, a channel status, a quantity of PTRS chunks, or the like.

Example 2

The network device or the terminal device determines the time-domain locations of the chunks based on the following calculation manner:

PTRS(l,x)=x·N'+Δt+l

Similar to the foregoing Example 1, when the configuration information includes the offset parameter Δt and the interval parameter N', the network device or the terminal device may perform calculation in the foregoing manner. In an embodiment, the configuration information may include first configuration information and/or second configuration information, where the first configuration information includes Δt and the second configuration information includes N'.

Similar to Example 1, a configuration manner of the configuration information is specifically as follows: When the configuration information includes the offset parameter Δt and further includes the interval parameter N', the network device or the terminal device may specifically determine a location of an $l^{th}$ PTRS symbol in the $x^{th}$ chunk based on the configuration information. A quantity of chunks in one DFT-s-OFDM symbol is X and/or a quantity of PTRS symbols included in one chunk is L. If x and l are both counted starting from 0, a value range of x is 0≤x≤X−1 and a value range of l is 0≤l≤L−1.

In an implementation of Example 2, there may be three configuration manners for the interval parameter N': configured as $$\left\lfloor \frac{N}{X} \right\rfloor,$$

configured as $$\left\lfloor \frac{N-K}{X-1} \right\rfloor,$$

or configured as $12 \times N_{step}$, where $N_{step}$ represents a density of PTRS chunks in a DFT-s-OFDM symbol and indicates that there is one PTRS chunk every $12 \times N_{step}$ samples. Optionally, there are three Δt configurations corresponding to the configuration $$N' = \left\lfloor \frac{N}{X} \right\rfloor,$$

and Δt may be at least one of the following three values in Example 1:

| Configuration value | Calculation method for Δt in a corresponding configuration |
|---|---|
| Configuration 0 | Δt = ⌊0 · (N' − L)⌋ |
| Configuration 1 | $\Delta t = \left\lfloor \frac{1}{2} \cdot (N' - L) \right\rfloor$ |
| Configuration 2 | Δt = ⌊1 · (N' − L)⌋ |

Optionally, the rounding-down symbol in the configuration 0, the configuration 1, and the configuration 2 of Δt in the foregoing table may alternatively be a rounding-up symbol, and Δt may be at least one of the following three values in Example 1:

| Configuration value | Calculation method for Δt in a corresponding configuration |
|---|---|
| Configuration 0 | Δt = ⌈0 · (N' − L)⌉ |
| Configuration 1 | $\Delta t = \left\lceil \frac{1}{2} \cdot (N' - L) \right\rceil$ |
| Configuration 2 | Δt = ⌈1 · (N' − L)⌉ |

Alternatively, the rounding included in the rounding symbol is an algorithm for rounding to a nearest integer, or may be another configuration manner in Example 1. For other examples of the configuration value, refer to Example 1.

In an optional embodiment, when the configuration of Δt is only one of the configuration 0, the configuration 1, and the configuration 2, the configuration information may include only the interval parameter but not both the offset parameter and the interval parameter.

In an optional embodiment, corresponding to $$N' = \left\lfloor \frac{N-K}{X-1} \right\rfloor,$$

there may be only one configuration manner of Δt, or the offset parameter Δt is not configured. For example, when the configuration is $$N' = \left\lfloor \frac{N-K}{X-1} \right\rfloor,$$

Δt is configured as one of the configuration 0, the configuration 1, and the configuration 2. Alternatively, for example, when the configuration is $$N' = \left\lfloor \frac{N-K}{X-1} \right\rfloor,$$

the offset parameter Δt is not configured and a location of an $l^{th}$ PTRS symbol in an $x^{th}$ chunk is determined not based on formula PTRS(l, x)=x·N'+Δt+l; instead, configuration is performed in a manner in which a chunk exists separately at a header and/or a tail of DFT-s-OFDM, and remaining chunks are evenly distributed at an interval of N', for example, every two chunks are at an interval of N'. In another embodiment, the even distribution may be that every two chunks are at an interval of a combination of N', N'+1, and N'−1; or at an interval of one of N', N'+1, and N'−1. In still another embodiment, a manner of the even distribution may alternatively be that the first N or last N chunks are at an interval of N'. For example, there are a total of 96 modulated symbols 0 to 95, a size of each chunk is 2, and there are a total of four chunks. In this case, a location of a PTRS may be 0, 1, 31, 32, 62, 63, 94, or 95. 94 and 95 are fixed locations, or location numbers, or location indexes of a last chunk. It should be understood that, the foregoing examples are merely intended to describe manners of distributing a PTRS in the modulated symbols. The network device and user equipment may directly predefine modulated symbols in a corresponding configuration and a form of the chunk.

In another optional embodiment, corresponding to $$N' = \left\lfloor \frac{N-K}{X-1} \right\rfloor,$$

when the configuration of Δt is the configuration 0, the following two methods may be used to determine a location of a PTRS symbol in each PTRS chunk:

| Configuration value | Calculation method for Δt in a corresponding configuration | Restrictive condition in a corresponding configuration |
| --- | --- | --- |
| Configuration 0 | Δt = ⌊0 · (N' − L)⌋ | 0 ≤ x ≤ X − 2, and an extra and last PTRS chunk is fixedly on last L symbols of a DFT-s-OFDM symbol |
| Configuration 0 | Δt = ⌊0 · (N' − L)⌋ | 1 ≤ x ≤ X − 1, and an extra and first PTRS chunk is fixedly on first L symbols of a DFT-s-OFDM symbol |

In an embodiment, a method for calculating the configuration 0 in the table may be that a value 0 may be directly used.

In an optional embodiment, corresponding to N'=12×$N_{step}$, $N_{step}$ may be configured by using signaling, including at least one of RRC signaling, an MAC-CE, or DCI. In an optional embodiment, $N_{step}$ may be implicitly indicated by using scheduled bandwidth or a quantity of RBs or an MCS. For example, larger scheduled bandwidth or a larger quantity of RBs indicates a larger value of $N_{step}$, and smaller scheduled bandwidth or a smaller quantity of RBs indicates a smaller value of $N_{step}$. For another example, scheduled bandwidth ranges or RB quantity ranges are predefined or preconfigured, where a same range corresponds to same $N_{step}$, different ranges correspond to different $N_{step}$, and thresholds for defining the ranges may be configured or reconfigured by using RRC signaling. For another example, $N_{step}$ corresponding to different ranges may also be configured or reconfigured, and configuration signaling includes at least one of RRC signaling, an MAC-CE, and DCI.

In an optional embodiment, corresponding to N'=12×$N_{step}$, Δt may be at least one of the following three values in Example 1:

| Configuration value | Calculation method for Δt in a corresponding configuration |
| --- | --- |
| Configuration 0 | Δt = ⌊0 · (N' − L)⌋ |
| Configuration 1 | $\Delta t = \left\lfloor \frac{1}{2} \cdot (N' - L) \right\rfloor$ |
| Configuration 2 | Δt = ⌊1 · (N' − L)⌋ |

Optionally, the rounding-down symbol in the configuration 0, the configuration 1, and the configuration 2 of Δt in the foregoing table may alternatively be a rounding-up symbol, and Δt may be at least one of the following three values in Example 1:

| Configuration value | Calculation method for Δt in a corresponding configuration |
| --- | --- |
| Configuration 0 | Δt = ⌈0 · (N' − L)⌉ |
| Configuration 1 | $\Delta t = \left\lceil \frac{1}{2} \cdot (N' - L) \right\rceil$ |
| Configuration 2 | Δt = ⌈1 · (N' − L)⌉ |

Alternatively, the rounding included in the rounding symbol is an algorithm for rounding to a nearest integer (that is, the rounding symbol is substituted by a rounding algorithm), or may be another configuration manner in Example 1. For other examples of the configuration value, refer to Example 1. Optionally, corresponding to N'=12×$N_{step}$, the value of Δt may be an element of the following set:

$$A = \{0, 1, 2, \ldots, 12 \times N_{step} - L\},$$

Alternatively, the value of Δt may be an element of a subset of A, for example, a number that is an integral multiple of 12 in A.

In Example 2, a value of N' may be configured by using signaling, such as higher layer signaling or physical layer signaling. For example, the signaling may be signaling such as RRC signaling, an MAC-CE, or DCI. For example, two bits are used, bits 00 represent $$N' = \left\lfloor \frac{N}{X} \right\rfloor,$$

bits 01 represent $$N' = \left\lfloor \frac{N-K}{X-1} \right\rfloor,$$

and bits 10 represent $N'=12 \times N_{step}$. For another example, after a configuration set of N' is configured by using higher layer signaling, predefined, or preconfigured, DCI or an MAC-CE uses one bit to configure N'. For example, the configuration set of N' is configured by using RRC signaling, predefined, or preconfigured as $$\left\{ \left\lfloor \frac{N}{X} \right\rfloor, \left\lfloor \frac{N-K}{X-1} \right\rfloor \right\};$$

and DCI uses a bit 0 to represent $$N' = \left\lfloor \frac{N}{X} \right\rfloor,$$

and uses a bit 1 to represent $$N' = \left\lfloor \frac{N-K}{X-1} \right\rfloor.$$

Alternatively, the bit 1 may represent $$N' = \left\lfloor \frac{N}{X} \right\rfloor,$$

and the bit 0 may represent $$N' = \left\lfloor \frac{N-K}{X-1} \right\rfloor.$$

In another embodiment, a calculation formula or a configuration of N' is determined by any one of an MCS, BW, a phase noise model, a capability of a receiver, or a quantity of PTRS chunks. For example, $$N' = \left\lfloor \frac{N}{X} \right\rfloor$$

when the quantity of PTRS chunks is large, for example, $X \geq 4$, or otherwise, $$N' = \left\lfloor \frac{N-K}{X-1} \right\rfloor,$$

for example, when X<4; or $$N' = \left\lfloor \frac{N}{X} \right\rfloor$$

when the BW is large, or $$N' = \left\lfloor \frac{N-K}{X-1} \right\rfloor$$

when the BW is small; or $$N' = \left\lfloor \frac{N}{X} \right\rfloor$$

when the receiver can perform symbol-level processing in combination with a plurality of DFT-s-OFDM symbols, or otherwise, $$N' = \left\lfloor \frac{N-K}{X-1} \right\rfloor.$$

In Example 2, alternatively, the value or configuration of N' and the configuration of Δt may be combined for indication. In an embodiment, the configuration information indicates that the offset parameter Δt and/or the interval parameter N' may be at least one of the following in the following table:

| Configuration value | Calculation method for Δt in a corresponding configuration | Calculation method for N' in a corresponding configuration |
| --- | --- | --- |
| Configuration 00 | An extra PTRS chunk is fixedly on first or last L symbols of a DFT-s-OFDM symbol, and other PTRS chunks are distributed at an equal interval. | $N' = \left\lfloor \frac{N-K}{X-1} \right\rfloor$ |
| Configuration 01 | $\Delta t = \lfloor 0 \cdot (N' - L) \rfloor$ | $N' = \left\lfloor \frac{N}{X} \right\rfloor$ |
| Configuration 10 | $\Delta t = \left\lfloor \frac{1}{2} \cdot (N' - L) \right\rfloor$ | $N' = \left\lfloor \frac{N}{X} \right\rfloor$ |
| Configuration 11 | $\Delta t = \lfloor 1 \cdot (N' - L) \rfloor$ | $N' = \left\lfloor \frac{N}{X} \right\rfloor$ |

Optionally, in an embodiment, S1102 is further included, where the terminal device determines the resource locations of the chunks based on the configuration information. In an optional embodiment, the resource location is a time-domain location. In another embodiment, the resource location is a frequency-domain location, and in this case, all DFT-s-OFDM symbols may be understood as OFDM symbols. In still another embodiment, the resource location is a time-domain location and a frequency-domain location. Optionally, in another embodiment, before S1101, the network device may further determine the configuration information. In this way, the network device and/or the terminal device configure/configures the time-domain locations of the chunks, to adapt to a scenario requirement and improve performance.

Figure 12:
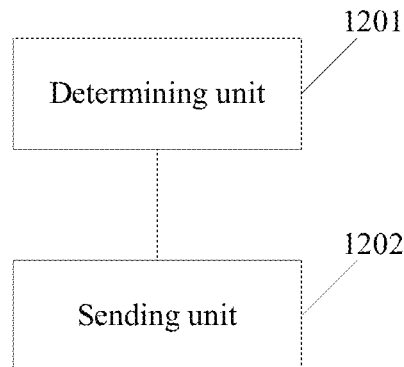
FIG. 12 is a schematic block diagram of a network device according to an embodiment of the present application.

FIG. 12 shows another apparatus embodiment of the present application. The apparatus may be a network device. Optionally, the apparatus may be a base station. The apparatus includes a determining unit 1201, configured to perform the step as described in S1101, and further includes a sending unit 1202, configured to perform the step of sending the configuration information to the terminal as described in S1101. The determining unit and the sending unit may perform, but not limited to performing, embodiments shown in FIG. 11.

Figure 13:
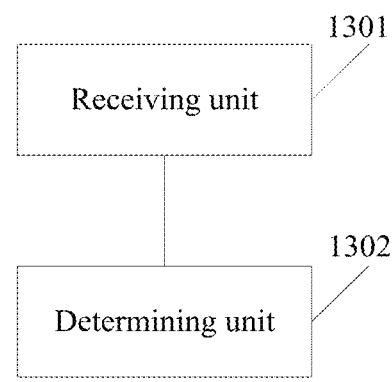
FIG. 13 is a schematic block diagram of a terminal according to an embodiment of the present application.

FIG. 13 shows another apparatus embodiment of the present application. The apparatus may be a terminal device. The terminal apparatus includes: a receiving unit 1301, configured to perform the step of receiving the configuration information as described in S1101; and a determining unit 1302, configured to perform a function of determining the resource locations of the chunks based on the configuration information as described in S1102. The determining unit and the receiving unit may perform, but not limited to performing, embodiments shown in FIG. 11.

Figure 14:
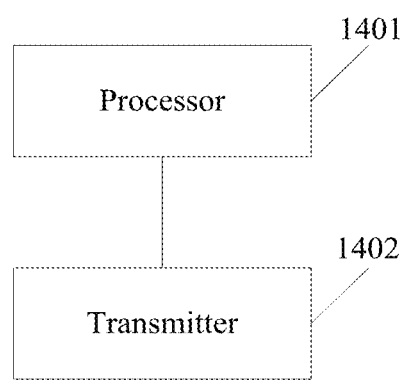
FIG. 14 is a schematic block diagram of a network device according to an embodiment of the present application.

FIG. 14 shows another apparatus embodiment of the present application. The apparatus may be a network device. Optionally, the apparatus may be a base station. The apparatus includes a processor 1401, configured to perform the step as described in S1101, and further includes a transmitter 1402, configured to perform the step of sending the configuration information to the terminal as described in S1101. The processor 1401 and the transmitter 1402 may perform, but not limited to performing, embodiments shown in FIG. 11.

Figure 15:
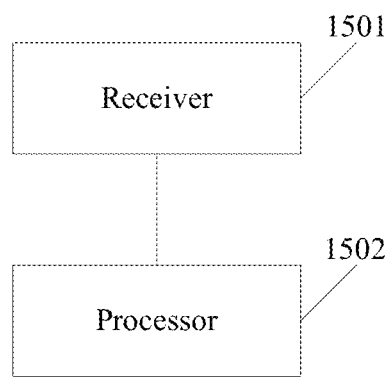
FIG. 15 is a schematic block diagram of a terminal according to an embodiment of the present application.

FIG. 15 shows another apparatus embodiment of the present application. The apparatus may be a terminal device. The terminal apparatus includes: a receiver 1501, configured to perform the step of receiving the configuration information as described in S1101; and a processor 1502, configured to perform a function of determining the resource locations of the chunks based on the configuration information as described in S1102. The processor 1502 and the receiver 1501 may perform, but not limited to performing, embodiments shown in FIG. 11.

When the apparatus in FIG. 12 to FIG. 15 is a chip, the chip includes a transceiver unit and a processing unit. The transceiver unit may be an input/output circuit or a communications interface. The processing unit is a processor, microprocessor, or integrated circuit integrated in the chip.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, all or some of the procedures or functions according to the embodiments of this application are generated. The computer may be a general purpose computer, a special purpose computer, a computer network, or another programmable apparatus. The computer instruction may be stored in a computer readable storage medium or may be transmitted from a computer readable storage medium to another computer readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

Although this application is described with reference to the embodiments, in a process of implementing the embodiments of this application that claims protection, a person skilled in the art may understand and implement another variation of the disclosed embodiments.

An embodiment of the present application further provides a chip. The chip includes a communications interface and a processor. The processor is configured to control the communications interface to receive or send a signal, and is configured to process a signal received over the communications interface or generate a signal to be sent on the communications interface.

For example, the processor is configured to perform a process or step on a terminal side in the PTRS processing method 300 provided in the foregoing method embodiment; or the processor is configured to perform a process or step on a terminal side in the PTRS processing method 300 provided in the foregoing method embodiment; or the processor is configured to perform a process or step on a network device side in the PTRS processing method 300 provided in the foregoing method embodiment; or the processor is configured to perform a process or step on a terminal side in the PTRS processing method 600 provided in the foregoing method embodiment; or the processor is configured to perform a process or step on a network device side in the PTRS processing method 600 provided in the foregoing method embodiment; or the processor is configured to perform a process or step on a terminal side in the PTRS processing method 700 provided in the foregoing method embodiment; or the processor is configured to perform a process or step on a network device side in the PTRS processing method 700 provided in the foregoing method embodiment; or the processor is configured to perform a process or step on a terminal side in the PTRS processing method 800 provided in the foregoing method embodiment; or the processor is configured to perform a process or step on a network device side in the PTRS processing method 800 provided in the foregoing method embodiment.

Optionally, the chip further includes a storage module, where the storage module stores an instruction. The processing module performs a related operation by reading the instruction stored in the storage module, and controls the communications interface to perform related sending and receiving operations.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of the present application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, reference may be made to a corresponding process in the foregoing method embodiments, and details are not described herein again.

In the several embodiments provided in this application, it should be understood that the disclosed systems, apparatuses, and methods may be implemented in other manners. For example, the described apparatus embodiment is merely an example. For example, the unit division is merely logical function division and there may be another division manner in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each unit may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, comprising:
   one or more memories configured to store instructions; and
   one or more processors coupled to the one or more memories and configured to execute the instructions, wherein execution of the instructions cause the apparatus to:
   receive first indication information and second indication information from a network device,
   wherein the first indication information indicates a quantity of phase tracking reference signal (PTRS) chunks mapped to one discrete Fourier transform-spread-orthogonal frequency division multiplexing (DFT-s-OFDM) symbol, and
   the second indication information is used for determining an orthogonal cover code (OCC) for performing code division multiplexing (CDM) on the PTRS chunks,
   wherein the OCC is one of the following codes: {1,1,1,1}, {1,1,−1,−1}, {1,−1,1,−1} and {1,−1,−1,1};
   perform CDM on the PTRS chunks and map the PTRS chunks to one or more DFT-s-OFDM symbols; and
   output the one or more DFT-s-OFDM symbols.

2. The apparatus according to claim 1, wherein the first indication information is a scheduled bandwidth of a terminal comprising the apparatus.

3. The apparatus according to claim 1, wherein correspondence information identifying a correspondence between scheduled bandwidth and quantity of PTRS chunks is stored on the one or more memories.

4. The apparatus according to claim 1, wherein the second indication information is an identifier of a terminal comprising the apparatus.

5. The apparatus according to claim 4, wherein the identifier of the terminal is a radio network temporary identity (RNTI).

6. The apparatus according to claim 1, wherein the quantity of PTRS chunks mapped to one DFT-s-OFDM symbol is 4, and a quantity of samples in a PTRS chunk is 2.

7. The apparatus according to claim 1, wherein the quantity of PTRS chunks mapped to one DFT-s-OFDM symbol is 2, 4 or 8.

8. A method, comprising:
   receiving, by an apparatus, first indication information and second indication information from a network device,
   wherein the first indication information indicates a quantity of phase tracking reference signal (PTRS) chunks mapped to one discrete Fourier transform-spread-orthogonal frequency division multiplexing (DFT-s-OFDM) symbol, and
   the second indication information is used for determining an orthogonal cover code (OCC) for performing code division multiplexing (CDM) on the PTRS chunks,
   wherein the OCC is one of the following codes: {1,1,1,1}, {1,1,−1,−1}, {1,−1,1,−1} and {1,−1,−1,1};
   performing, by the apparatus, CDM on the PTRS chunks and mapping the PTRS chunks to one or more DFT-s-OFDM symbols; and
   outputting the one or more DFT-s-OFDM symbols.

9. The method according to claim 8, wherein the first indication information is scheduled bandwidth of a terminal comprising the apparatus.

10. The method according to claim 8, further comprising:
    pre-storing correspondence information identifying a correspondence between scheduled bandwidth and quantity of PTRS chunks.

11. The method according to claim 8, wherein the second indication information is an identifier of a terminal comprising the apparatus.

12. The method according to claim 11, wherein the identifier of the terminal is a radio network temporary identity (RNTI).

13. The method according to claim 8, wherein the quantity of PTRS chunks mapped to one DFT-s-OFDM symbol is 4, and a quantity of samples in a PTRS chunk is 2.

14. The method according to claim 8, wherein the quantity of PTRS chunks mapped to one DFT-s-OFDM symbol is 2, 4 or 8.

15. A non-transitory computer readable medium, having stored thereon computer executable instructions that when executed by a processor of a computer control the computer to:
receive first indication information and second indication information from a network device,
wherein the first indication information indicates a quantity of phase tracking reference signal (PTRS) chunks mapped to one discrete Fourier transform-spread-orthogonal frequency division multiplexing (DFT-s-OFDM) symbol, and
the second indication information is used for determining an orthogonal cover code (OCC) for performing code division multiplexing (CDM) on the PTRS chunks,
wherein the OCC is one of the following codes: {1,1,1,1}, {1,1,−1,−1}, {1,−1,1,−1} and {1,−1,−1,1};
perform CDM on the PTRS chunks and map the PTRS chunks to one or more DFT-s-OFDM symbols; and
output the one or more DFT-s-OFDM symbols.

16. The non-transitory computer readable medium according to claim 15, wherein the first indication information is a scheduled bandwidth of a terminal.

17. The non-transitory computer readable medium according to claim 15, wherein the quantity of PTRS chunks mapped to one DFT-s-OFDM symbol is 2, 4 or 8.

18. The non-transitory computer readable medium according to claim 15, wherein the second indication information is an identifier of a terminal.

19. The non-transitory computer readable medium according to claim 18, wherein the identifier of the terminal is a radio network temporary identity (RNTI).

20. The non-transitory computer readable medium according to claim 15, wherein the quantity of PTRS chunks mapped to one DFT-s-OFDM symbol is 4, and a quantity of samples in a PTRS chunk is 2.

* * * * *

UNITED STATES PATENT AND TRADEMARK OFFICE
CERTIFICATE OF CORRECTION

PATENT NO. : 11,108,605 B2
APPLICATION NO. : 16/659310
DATED : August 31, 2021
INVENTOR(S) : Zhang et al.

Page 1 of 1

It is certified that error appears in the above-identified patent and that said Letters Patent is hereby corrected as shown below:

In the Claims

Claim 9: Column 66, Line 56: "indication information is scheduled bandwidth of a terminal" should read -- indication information is a scheduled bandwidth of a terminal --.

Signed and Sealed this
Fifth Day of July, 2022

Katherine Kelly Vidal
*Director of the United States Patent and Trademark Office*